United States Patent
Cook et al.

(10) Patent No.: US 10,872,714 B1
(45) Date of Patent: Dec. 22, 2020

(54) TWISTED PAIR COMMUNICATION CABLES HAVING LIMITED COLORANT

(71) Applicant: Superior Essex International LP, Atlanta, GA (US)

(72) Inventors: Thomas Christopher Cook, Woodstock, GA (US); Amir Sekhavat, Marietta, GA (US)

(73) Assignee: Superior Essex International LP, Atlanta, GA (US)

( * ) Notice: Subject to any disclaimer, the term of this patent is extended or adjusted under 35 U.S.C. 154(b) by 0 days.

(21) Appl. No.: 16/683,864

(22) Filed: Nov. 14, 2019

(51) Int. Cl.
| | |
|---|---|
| *H01B 11/02* | (2006.01) |
| *H01B 11/08* | (2006.01) |
| *H01B 7/36* | (2006.01) |
| *H01R 13/6463* | (2011.01) |
| *G02B 6/44* | (2006.01) |

(52) U.S. Cl.
CPC ............ *H01B 11/08* (2013.01); *H01B 7/36* (2013.01); *H01R 13/6463* (2013.01); *G02B 6/4479* (2013.01); *G02B 6/4495* (2013.01)

(58) Field of Classification Search
CPC ... H01B 7/02; H01B 7/04; H01B 7/06; H01B 7/36; H01B 11/02; H01B 11/04; H01B 11/06; H01B 11/08
USPC .......... 174/110 R–110 N, 112, 113 R, 113 C, 174/115, 116 R
See application file for complete search history.

(56) References Cited

U.S. PATENT DOCUMENTS

| | | | |
|---|---|---|---|
| 1,830,411 A | 11/1931 | Schork, Jr. | |
| 2,516,751 A * | 7/1950 | Brown | H01B 7/361 174/112 |
| 3,020,335 A | 2/1962 | Gillis | |
| 3,020,355 A * | 2/1962 | Ikuro | G11B 5/54 360/83 |
| 3,102,160 A * | 8/1963 | Cook | H01B 7/361 174/105 R |
| 5,281,764 A * | 1/1994 | King | H01B 7/361 174/112 |
| 5,401,908 A * | 3/1995 | Rodeghero | H01B 7/361 174/112 |
| 6,437,248 B1 * | 8/2002 | Giebel | G02B 6/4482 174/110 R |
| 6,498,301 B1 * | 12/2002 | Pieper | H01B 7/365 174/112 |

(Continued)

OTHER PUBLICATIONS

Office Action for U.S. Appl. No. 16/683,873, dated May 28, 2020.
(Continued)

*Primary Examiner* — William H. Mayo, III

(57) ABSTRACT

Twisted pair communication cables that include reduced or minimal use of colorant may include a plurality of twisted pairs of individually insulated conductors, and the respective insulation formed around each conductor included in the plurality of twisted pairs may not be blended or compounded with any colorant. Physical indicia may be selectively formed on respective outer surfaces of the insulation of at least two of the plurality of twisted pairs. The physical indicia may include colorant that occupies less than 5.0% of a surface area of the insulation on which it is formed, and the physical indicia facilitate identification of the plurality of twisted pairs. A jacket may formed around the plurality of twisted pairs.

21 Claims, 30 Drawing Sheets

(56) References Cited

U.S. PATENT DOCUMENTS

| | | | |
|---|---|---|---|
| 7,193,155 B2* | 3/2007 | McMillan | H01B 7/361 |
| | | | 174/112 |
| 7,696,437 B2 | 4/2010 | Clark et al. | |
| 9,343,200 B2* | 5/2016 | Perez-Sanchez | H01B 7/1855 |
| 9,424,964 B1 | 8/2016 | Kithuka et al. | |
| 10,121,571 B1 | 11/2018 | McNutt et al. | |
| 2002/0017393 A1* | 2/2002 | Hanna-Myrick | H01B 11/20 |
| | | | 174/113 R |
| 2006/0048961 A1 | 3/2006 | Pfeiler et al. | |
| 2009/0114418 A1* | 5/2009 | Smith | H01B 7/361 |
| | | | 174/112 |
| 2009/0200060 A1 | 8/2009 | Smith et al. | |
| 2009/0236120 A1* | 9/2009 | Wiebelhaus | H01B 11/06 |
| | | | 174/113 AS |
| 2013/0008684 A1 | 1/2013 | Weitzel et al. | |
| 2013/0014972 A1 | 1/2013 | Wiebelhaus et al. | |
| 2014/0014391 A1* | 1/2014 | Magner | H01B 7/18 |
| | | | 174/102 R |
| 2014/0238721 A1 | 8/2014 | Wessels, Jr. et al. | |

OTHER PUBLICATIONS

Office Action for U.S. Appl. No. 16/683,881, dated May 28, 2020.
Office Action for U.S. Appl. No. 16/683,852, dated May 29, 2020.
Office Action for U.S. Appl. No. 16/683,842, dated May 14, 2020.

\* cited by examiner

TWISTED PAIR COMMUNICATION CABLES HAVING LIMITED COLORANT

CROSS-REFERENCE TO RELATED APPLICATIONS

The present application is related to U.S. patent application Ser. No. 16/683,842 filed on Nov. 14, 2019 and entitled "Twisted Pair Communication Cables Substantially Free of Colorant"; U.S. patent application Ser. No. 16/683,852 filed on Nov. 14, 2019 and entitled "Twisted Pair Communication Cables Having Separators That Identify Pairs"; U.S. patent application Ser. No. 16/683,873 filed on Nov. 14, 2019 and entitled "Twisted Pair Communication Cables Having Shields That Identify Pairs"; and U.S. patent application Ser. No. 16/683,881 filed on Nov. 14, 2019 and entitled "Twisted Pair Communication Cables Having Dielectric Separators That Identify Pairs". Each of these applications is incorporated by reference herein in its entirety.

TECHNICAL FIELD

Embodiments of the disclosure relate generally to twisted pair communication cables and, more particularly, to twisted pair communication cables that include minimal or reduced amounts of colorant relative to conventional cables.

BACKGROUND

Communication cables are utilized in a wide variety of different applications to transmit a variety of data signals and, in some cases, both data and power signals. Certain communication cables are formed with a multitude of metallic conductors (e.g., copper conductors), such as conductors formed into a plurality of individually insulated twisted pairs. Conventionally, the various conductors of a twisted pair cable are color-coded in order to facilitate identification of both pairs and the individual conductors. For example, the insulation for a first conductor in each twisted pair may be formed with a respective solid color while the second conductor in each twisted pair may be band-marked or striped with the same color as the corresponding first conductor. As another example, a plurality of twisted pairs may each include two conductors having insulation formed with different shades of a respective color, and each of the plurality of pairs may utilize a different color. Proper identification of the twisted pairs and individual conductors is desirable for proper installation of the cables.

However, the use of color additives in communication cables increases the cost of the cables and enhances the environmental impact of the cable. There have been recent customer demands to reduce or eliminate chemicals and materials within cables that have negative or harmful environmental impact. Minimizing or reducing color additives will therefor result in cables having higher environmental sustainability. Accordingly, there is an opportunity for improved twisted pair communication cables that reduce or eliminate colorant while still permitting proper identification of twisted pairs and/or individual conductors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
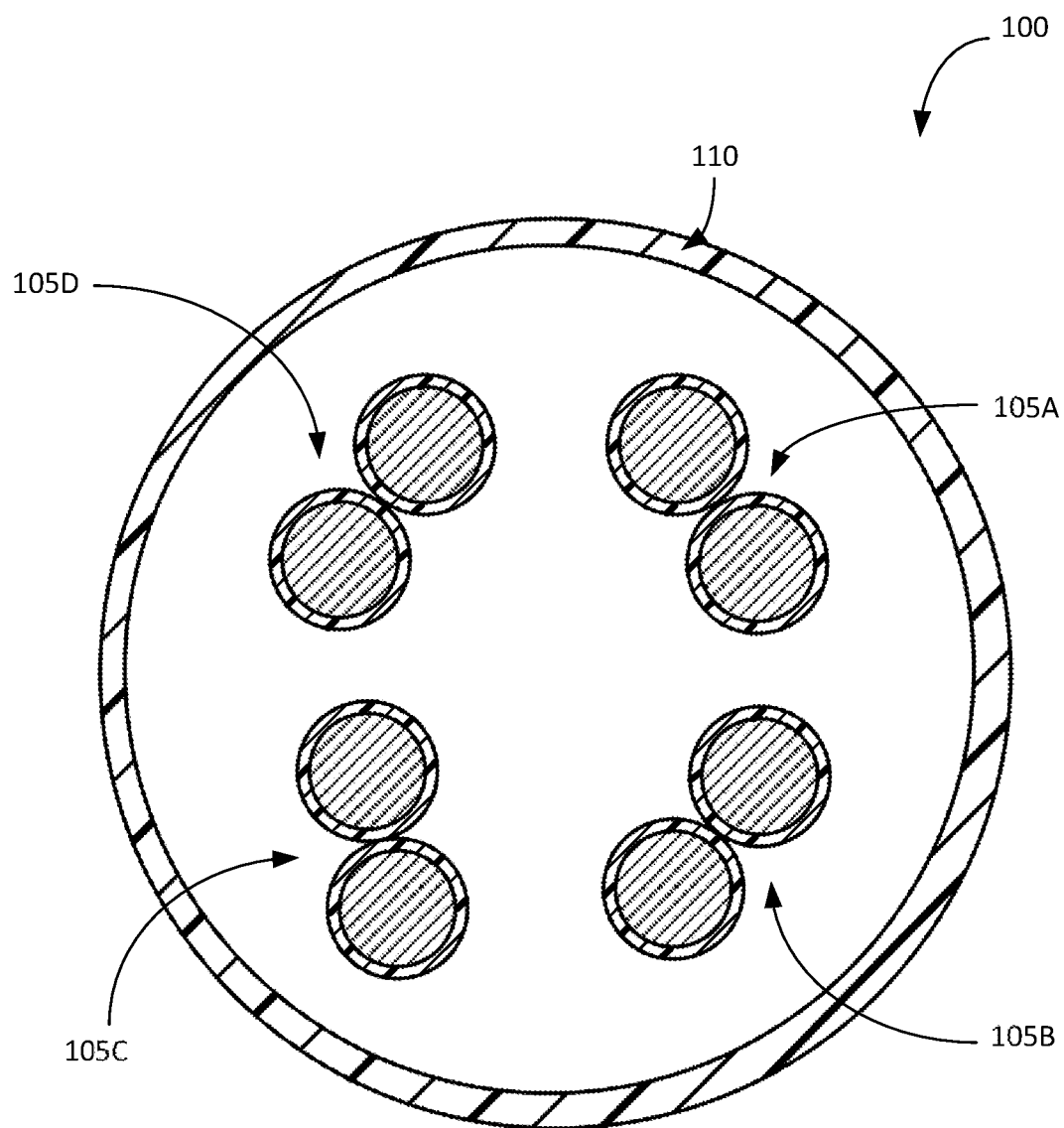
FIGS. 1-4 are cross-sectional views of example cables that may be formed with reduced or minimal colorant, according to illustrative embodiments of the disclosure.

Various embodiments of the present disclosure are directed to twisted pair communication cables that include minimal or reduced amounts of colorant relative to conventional cables. A cable may include a plurality of twisted pairs of individually insulated conductors. The respective insulation formed around each conductor included in the plurality of twisted pairs may be formed from one or more polymeric materials that are not blended or compounded with any colorants. Additionally, the twisted pair conductor insulation may have no colorant or limited colorant formed on its outer surface. As desired, the cable may optionally include a separator positioned between two or more of the twisted pairs, one or more shield layers, one or more dielectric separators positioned between the individual conductors of respective twisted pairs, and/or other suitable internal cable components. A jacket may be formed around the plurality of twisted pairs and/or other internal cable components, and the jacket may be formed from one or more polymeric materials that are not blended or compounded with any colorant. Additionally, the cable may include physical indicia selectively formed on one or more cable components to facilitate identification of the plurality of twisted pairs and, in certain embodiments, identification of the individual conductors within each of the plurality of twisted pairs. Physical indicia may be formed on a wide variety of different cable components as desired in various embodiments, such as the twisted pair insulation, a separator, one or more shield layers, one or more dielectric separators, etc.

For purposes of this disclosure, the term "colorant" means any substance that is added or applied to a cable component in order to change the color of the cable component or the color on a surface of the cable component. Examples of suitable colorants include, but are not limited to, dyes, pigments, color additives, paints, inks, etc. In conventional cables, a colorant may be blended, compounded, or otherwise mixed with a base material before a cable component is formed. For example, a colorant (e.g., a dye, a color additive, etc.) may be mixed with one or more polymeric materials prior to twisted pair insulation, a separator, a cable jacket, or a layer of a cable component (e.g., an insulation layer, etc.) being extruded or otherwise formed. Other colorants (e.g., paints, inks, etc.) may be formed on a surface of a cable component.

Embodiments of the present disclosure may include cables and/or cable components that are free of colorant or that include limited colorant. A cable component that is "free of colorant" may include materials formed with their natural or virgin color and no colorants are applied to the surface of the cable component. In other words, the materials utilized to form the cable component (e.g., one or more polymeric materials utilized to form twisted pair insulation, etc.) and/or any layers of a multi-layer cable component (e.g., insulation having a foamed layer surrounded by a skin layer, etc.) are not blended, compounded, or otherwise mixed with any colorants. Additionally, no colorants (e.g., inks, paints, etc.) are applied to or formed on an outer surface of the cable component.

A cable component that includes "limited colorant" may be formed from materials having their natural or virgin color. Much like components that are "free of colorant", the materials utilized to form the cable component and/or any layers of a multi-layer cable component are not blended, compounded, or otherwise mixed with any colorants. However, a relatively small or limited amount of colorant may be applied to or formed on an outer surface of the cable component to facilitate identification of cable components, product identification, standards compliance, etc. For example, limited amounts of colorant may be formed on one or more internal cable components (e.g., twisted pair insulation, a separator, etc.) to facilitate identification of the twisted pairs and/or identification of the individual conductors within one or more twisted pairs. As another example, limited amounts of colorant (e.g., a print string, etc.) may be formed on a cable jacket to provide a customer reasonable required identification information for the cable, such as a product name and/or compliance information for one or more applicable cable standards. For purposes of this disclosure, a cable component that includes "limited colorant" may have colorant formed or applied to five percent (5.0%) or less of the surface area of an outer surface of the cable component. In this regard, valuable identification information may be provided while limiting an amount of relatively harmful and/or environmentally impactful materials incorporated into the cable. In other embodiments, a cable component that includes "limited colorant" may have colorant formed or applied to ten percent (10.0%) or less, fifteen percent (15.0%) or less, of twenty percent (20.0%) or less of the surface area of an outer surface of the cable component.

For purposes of this disclosure, the term "physical indicia" means any suitable surface variations or other suitable identifiers utilized to visually and/or tactilely identify or distinguish between a plurality of twisted pairs incorporated into a cable and/or to identify or distinguish between the individual conductors of one or more of the plurality of twisted pairs. According to an aspect of the disclosure, the physical indicia may be formed or incorporated into a cable without the use of colorant or with only limited colorant. Additionally, the physical indicia allow twisted pairs and/or individual twisted pair conductors to be identified without the conventional use of colored insulation (i.e., insulation that is compounded with a colorant or coated with a colorant). As a result, cables may be formed that have reduced colorant or that include approximately zero colorant. These cables may have reduced environmental impact and potentially lower cost relative to conventional cables while still permitting proper identification of twisted pairs and/or individual conductors.

According to an aspect of the disclosure, physical indicia may be provided in order to facilitate identification of each of the plurality of twisted pairs in a cable. In certain embodiments, separate physical indicia corresponding to each of a plurality of twisted pairs may be provided. In other embodiments, physical indicia for a subset of the plurality of twisted pairs may be provided so long as identification of the remaining twisted pairs (i.e., the twisted pairs that do not have associated physical indicia) can be determined or derived. As an example, with a cable having four twisted pairs, physical indicia may be provided for at least two of the four twisted pairs. Identification of two pairs will permit a technician or installer to identify the remaining two twisted pairs based on their positions relative to the two pairs having associated physical indicia.

A wide variety of suitable types of physical indicia may be incorporated into a cable. These physical indicia may be formed on a wide variety of suitable cable components. Examples of suitable physical indicia that may be incorporated into a cable component include, but are not limited to: (i) surface variations formed on an outer surface of the cable component, such as raised portions (e.g., bumps, ridges, raised alphanumeric characters, raised symbols, embossing, etc.), indentions or indented portions (e.g., divots, grooves, indented alphanumeric characters, indented symbols, impressions, etc.), and/or texturing; (ii) removed portions from a surface of a cable component, such as gaps or holes formed through a cable component or portion of a cable component; and/or (iii) indicia that include limited colorant formed on an outer surface of a cable component. In the event that physical indicia includes the use of limited colorant, the physical indicia may be formed from either a single colorant or from a plurality of different colorants. Additionally, physical indicia may be formed or positioned on any suitable components or combination of components within a cable. In various embodiments, physical indicia may be formed on the insulation of two or more twisted pairs, on a separator positioned between two or more twisted pairs, on one or more shield layers (e.g., individual shield layers formed around twisted pairs, etc.), and/or on dielectric separators positioned between the individual conductors of twisted pairs. Non-limited examples of various physical indicia are discussed in greater detail below in conjunction with example cable components on which the physical indicia may be formed.

A wide variety of suitable methods or techniques may be utilized to form physical indicia as desired in various embodiments. In certain embodiments, physical indicia may be formed via extrusion when a cable component (e.g., twisted pair insulation, a separator, etc.) is formed. In other embodiments, physical indicia may be formed by modifying a surface of a cable component. For example, a surface of a cable component may be punched, stamped, impressed, or cut in order to form one or more physical indicia. In yet other embodiments, physical indicia may be formed by applying limited amounts of one or more colorants to a cable component via any suitable techniques, such as printing, spraying, etc.

In certain embodiments, a twisted pair communication cable may include a plurality of twisted pairs of individually insulated conductors that are formed without colorant. Additionally, physical indicia may be selectively formed on the respective insulation of at least two of the plurality of twisted pairs, and the physical indicia may facilitate identification of the plurality of twisted pairs. For example, surface variations (e.g., raised portions, indentions, texturing, etc.) may be formed on the respective insulation of at least two of the plurality of twisted pairs. A jacket may then be formed around the plurality of twisted pairs. In certain embodiments, the jacket may be formed from one or more polymeric materials that are not blended or compounded with any colorant. For example, the jacket may be formed without colorant or may be formed with limited colorant.

In other embodiments, a twisted pair communication cable may include a plurality of twisted pairs of individually insulated conductors and physical indicia may be formed with limited colorant on at least two of the plurality of twisted pairs. In other words, the respective insulation formed around each conductor included in the plurality of twisted pairs may be formed from polymeric materials that are not blended or compounded within any colorant. Physical indicia may be formed on an outer surface of the respective insulation of at least two twisted pairs, and the physical indicia may include colorant that occupies less than five percent (5.0%) of the surface area of the insulation on which it is formed. A jacket may then be formed around the plurality of twisted pairs.

In other embodiments, a twisted pair communication cable may include a plurality of twisted pairs of individually insulated conductors that are formed without colorant or with limited colorant. A separator may be positioned between at least two of the plurality of twisted pairs. One or more physical indicia may be formed on the separator that facilitate identification of the plurality of twisted pairs. In certain embodiments, the physical indicia may be formed without colorant. For example, the physical indicia may include surface variations (e.g., raised portions, indentions, texturing, etc.) or removed portions (e.g., removed portions formed through one or more prongs or other elements of a separator, removed portions formed through electrically conductive or other shielding material incorporated into a separator, etc.) corresponding to two or more of the plurality of twisted pairs to be identified. In other embodiments, the physical indicia may be formed with limited colorant (i.e., the physical indicia may include colorant that occupies less than five percent of the surface area of the separator). A jacket may then be formed around the plurality of twisted pairs and the separator.

In other embodiments, a twisted pair communication cable may include a plurality of twisted pairs of individually insulated conductors that are formed without colorant or with limited colorant. Respective shield layers may be formed around at least two of the plurality of twisted pairs. For example, individual shield layers may be formed around each of the plurality of twisted pairs. Physical indicia may selectively be formed on at least two of the shield layers to facilitate identification of the plurality of twisted pairs. The physical indicia may include surface variations, removed portions (e.g., gaps or holes formed through shielding material or through the entire shield layer, etc.), or limited colorant. A jacket may then be formed around the plurality of twisted pairs and the shield layers.

In yet other embodiments, a twisted pair communication cable may include a plurality of twisted pairs of individually insulated conductors that are formed without colorant or with limited colorant. Additionally, respective dielectric separators may be positioned between the individual conductors of at least two of the plurality of twisted pairs. For example, respective dielectric separators may be positioned between the individual conductors of each of the plurality of twisted pairs. Physical indicia may selectively be formed on at least two of the dielectric separators to facilitate identification of the plurality of twisted pairs. The physical indicia may include surface variations, removed portions (e.g., gaps or holes formed through the dielectric separator, etc.), or limited colorant. A jacket may then be formed around the plurality of twisted pairs and the dielectric separators.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1-4 are cross-sectional views of example cables 100, 200, 300, 400 that may be formed with reduced or minimal colorant, according to illustrative embodiments of the disclosure. The illustrated example cables 100, 200, 300, 400 have different combinations of internal components. For example, various twisted pair communication cables may include a separator, any number of suitable shield layers (e.g., individual shield layers, an overall shield, etc.), dielectric separators, positioned between the individual conductors of one or more twisted pairs, etc. A wide variety of other suitable cable constructions having other combinations of internal components may be formed in addition to the illustrated example cables. Further, according to an aspect of the disclosure, any number of internal cable components may include physical indicia that facilitate identification of the twisted pairs incorporated into a cable and/or the individual conductors of the twisted pairs while allowing colorant in the cable to be eliminated, reduced, or minimized.

Further, the example cables 100, 200, 300, 400 are illustrated as twisted pair communication cables. However, other types of cables may be formed having reduced colorant and physical indicia to facilitate identification of transmission media. These cables may include any suitable transmission media including but not limited to, one or more optical fibers, one or more coaxial cables, one or more power conductors, one or more electrical conductors, etc. Additionally, in certain embodiments, a cable may be formed as a hybrid cable that includes a plurality of different types of transmission media. For example, a cable may include a combination of twisted pairs and other transmission media (e.g., optical fibers, etc.). Additionally, cables formed in accordance with the present disclosure may be utilized in a wide variety of suitable operating environments. For example, embodiments of the disclosure may be utilized in association with horizontal cables, vertical cables, flexible cables, equipment cords, cross-connect cords, plenum cables, riser cables, or any other appropriate types of cables.

Turning now to FIG. 1, a cross-section of a first example cable 100 that may be formed with reduced or minimal colorant is illustrated. The cable 100 may include a plurality of twisted pairs of individually insulated conductors 105A-D, and an outer jacket 110 may be formed around the plurality of twisted pairs 105A-D. As desired in various embodiments, the cable 100 may additionally include a separator positioned between two or more of the plurality of twisted pairs 105A-D, one or more suitable shield layers, and/or any other suitable internal components.

Any number of twisted pairs may be utilized as desired in the cable 100. As shown in FIG. 1, the cable 100 may include four twisted pairs 105A, 105B, 105C, 105D. Each twisted pair (referred to generally as twisted pair 105) may include two electrical conductors, each covered with respective insulation. The electrical conductors of a twisted pair 105 may be formed from any suitable electrically conductive material, such as copper, aluminum, silver, annealed copper, gold, a conductive alloy, etc. In certain embodiments, one or more electrical conductors may also be coated with another material (e.g., tinned copper, etc.) Additionally, the electrical conductors may have any suitable diameter, gauge, and/or other dimensions. Further, each of the electrical conductors may be formed as either a solid conductor or as a conductor that includes a plurality of conductive strands that are twisted together.

The twisted pair insulation may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins, a low smoke zero halogen ("LSZH") material, etc.), nylon, polyurethane, neoprene, cholorosulphonated polyethylene, flame retardant PVC, low temperature oil resistant PVC, flame retardant polyurethane, flexible PVC, or a combination of any of the above materials. In various embodiments, twisted pair insulation may be formed from one or multiple layers of insulation material. A layer of insulation may be formed as solid insulation, unfoamed insulation, foamed insulation, or other suitable insulation. As desired, combinations of different types of insulation may be utilized. For example, a foamed insulation layer may be covered with a solid foam skin layer. As desired with foamed insulation, different foaming levels may be utilized for different twisted pairs in accordance with twist lay length to assist in balancing propagation delays between the twisted pairs. Additionally, the insulation may be formed with any suitable thickness, inner diameter, outer diameter, and/or other dimensions. As desired in certain embodiments, insulation may additionally include a wide variety of other materials, such as filler materials, smoke suppressant materials, flame retardant materials, etc.

According to an aspect of the disclosure, the twisted pair insulation may be extruded, foamed, or otherwise formed around the conductors without any colorant being blended, compounded, or otherwise mixed with the one or more polymeric materials utilized to form the insulation and/or any layers of the insulation. In other words, one or more polymeric materials may be extruded or otherwise formed around the conductors with their natural color. Additionally, in certain embodiments, the twisted pair insulation may be "free of colorant" with no colorant formed on an outer surface of the insulation. In other embodiments, the twisted pair insulation may be formed with "limited colorant" on its outer surface.

In certain embodiments, the insulation utilized in each of the twisted pairs 105A-D may be formed from similar materials. For example, in a plenum cable, each of the twisted pairs 105A-D may include FEP insulation. In other embodiments, at least two of the twisted pairs 105A-D may utilize different insulation materials or combinations of materials. Additionally, in certain embodiments, the insulation utilized on the two individual conductors of a twisted pair 105 may be formed from the same material. In other embodiments, the two individual conductors that make up a twisted pair 105 may utilize different insulation materials. These different materials may include different polymeric materials or different types of the same or similar polymeric materials. In certain embodiments, a first conductor in a twisted pair 105 may be insulated with a first polymeric material, and a second conductor in the twisted pair 105 may be insulated with a second polymeric material different than the first polymeric material. For example, a first conductor may be insulated with FEP, and a second conductor may be insulated with a second polymeric material different from FEP. As another example, a first conductor may be insulated with a first FEP material, and a second conductor may be insulated with a second FEP material different than the first FEP material. In certain embodiments, even in their natural or uncolored states, the different polymeric materials utilized within a twisted pair 105 (i.e., the first and second polymeric materials) may be visually distinguishable from one another. For example, two different polymeric material or two different FEP materials may be visually distinguishable from one another. The visual differences between the two materials may facilitate identification of the individual conductors of a twisted pair 105. Additionally, to the extent that different materials are utilized as insulation for the individual conductors of a twisted pair 105, the cable design may be optimized in order to account for electrical performance differences between the different materials. For example, the different materials may be formed with different thicknesses, foam rates, or other dimensions in order to balance electrical performance.

Each twisted pair 105 can carry data or some other form of information, for example in a range of about one to ten Giga bits per second ("Gbps") or other suitable data rates, whether higher or lower. In certain embodiments, each twisted pair 105 supports data transmission of about two and one-half Gbps (e.g. nominally two and one-half Gbps), with the cable 100 supporting about ten Gbps (e.g. nominally ten Gbps). In certain embodiments, each twisted pair 105 supports data transmission of up to about ten Gbps (e.g. nominally ten Gbps), with the cable 100 supporting about forty Gbps (e.g. nominally forty Gbps).

Each twisted pair 105 may also be formed with any suitable twist lay. In certain embodiments, each of the twisted pairs 105A-D may be formed with similar or approximately equal twist lays. In other embodiments, a desired number of the twisted pairs 105A-D may be formed with different respective twist lays. For example, each of the twisted pairs 105A-D may have a different twist lay. The different twist lays may function to reduce crosstalk between the twisted pairs, and a wide variety of suitable twist lay configurations may be utilized. In certain embodiments, the respective twist lays for the twisted pairs 105A-D may be selected, calculated, or determined in order to result in a cable 100 that satisfies one or more standards and/or electrical requirements. For example, twist lays may be selected such that the cable 100 satisfies one or more electrical requirements of a Category 5, Category 5e, Category 6, Category 6A, or other suitable standard. Twist lays may also be selected in order to satisfy a wide variety of other electrical requirements as desired in various embodiments.

In certain embodiments, the differences between twist lays of twisted pairs that are circumferentially adjacent one another (for example the twisted pair 105A and the twisted pair 105B) may be greater than the differences between twist lays of twisted pairs that are diagonal from one another (for example the twisted pair 105A and the twisted pair 105C). As a result of having similar twist lays, the twisted pairs that are diagonally disposed can be more susceptible to crosstalk issues than the twisted pairs that are circumferentially adjacent; however, the additional distance between the diagonally disposed pairs may limit the crosstalk. Thus, the different twist lays and arrangements of the pairs can help reduce crosstalk among the twisted pairs 105A-D. As desired, the plurality of twisted pairs 105A-D may be twisted together with an overall twist or bunch. Any suitable overall twist lay or bunch lay may be utilized. Further, in certain embodiments, each of the twisted pairs 105A-D may be twisted in the same direction (e.g., clockwise, counter clockwise, etc.). In other embodiments, at least two of the twisted pairs 105A-D may be twisted in opposite directions. Additionally, an overall twist may be formed in any suitable direction. Indeed, a wide variety of suitable twist lays and twist directions may be utilized as desired in various embodiments.

As desired in certain embodiments, one or more suitable bindings or wraps may be wrapped or otherwise formed around the twisted pairs 105A-D once they are twisted together. Additionally, in certain embodiments, multiple grouping of twisted pairs may be incorporated into a cable. As desired, each grouping may be twisted, bundled, and/or bound together. Further, in certain embodiments, the multiple groupings may be twisted, bundled, or bound together.

In certain embodiments, physical indicia may be selectively formed on the respective outer surfaces of the insulation of two or more of the twisted pairs 105A-D. Respective physical indicia may be formed on any desired number of the twisted pairs 105A-D to facilitate identification of the twisted pairs 105A-D and/or the individual conductors of the twisted pairs 105A-D. In an example cable 100 that includes four twisted pairs 105A-D, physical indicia may be formed on two, three, or four of the twisted pairs 105A-D for identification purposes. If at least two of the twisted pairs 105A-D are identified, a technician or installer may be able to determine the identities of the remaining twisted pairs 105A-D. In the event that a cable 100 includes more or less than four twisted pairs, physical indicia may be formed on any suitable number of the twisted pairs for identification purposes. For example, in a two pair cable, physical indicia may be formed on at least one pair. As another example, in a cable with more than four pairs, physical indicia may be formed on at least two pairs. The physical indicia may facilitate, at a minimum, identification of two twisted pairs and identification of the arrangement of the twisted pairs (e.g., identification of two pairs and a direction in which the twisted pairs are arranged, etc.) such that the identities of the remaining pairs may be determined.

Within a given twisted pair 105, physical indicia may be formed on the insulation of one or both of the individual conductors of the twisted pair 105. The physical indicia may facilitate identification of the twisted pair 105 and/or identification of the individual conductors included in the twisted pair 105. Conventionally, twisted pairs incorporated into a cable are color-coded such that one conductor has a main color (e.g., blue, orange, green, brown, etc.) and the other conductor is either white, has a white stripe in combination with the main color, or is another shade of the main color (e.g., light blue, etc.). In an example four pair cable 100, physical indicia may be formed on either the conductors that correspond to conventional main color conductors or on the conductors that correspond to conventional white conductors, thereby facilitating visual (and/or tactile) identification of the two conductors. In other example embodiments, different physical indicia may be formed on both conductors of the various twisted pairs. In yet other example embodiments, physical indicia may be formed on a subset of the pairs of a cable to facilitate pair identification, and a different technique (e.g., visually distinguishable uncolored insulation materials, etc.) may be utilized to facilitate identification of individual conductors.

Additionally, physical indicia may be selectively formed at a wide variety of suitable locations along an outer periphery of a cable component, such as twisted pair insulation. In certain embodiments, physical indicia may be formed on an entire outer surface of a cable component. For example, a cable component (e.g., the insulation of a twisted pair conductor, etc.) may be textured on its entire outer surface. In other embodiments, physical indicia may be formed on a portion of an outer surface of a cable component. In certain embodiments, physical indicia may be continuous along a longitudinal length of a cable component. For example, a portion of a cable component (e.g., a prong or fin of a separator, etc.) may be textured continuously along a longitudinal length. As another example, one or more longitudinally continuous ridges or grooves may be formed on an outer surface of a cable component. As yet another example, lines or other physical indicia formed with limited colorant may be longitudinally continuous.

In other embodiments, physical indicia may be formed at longitudinally spaced locations along a longitudinal length of a cable component. For example, longitudinally spaced sections of an outer surface of a cable component may be textured. As another example, portions of ridges, grooves, or lines using limited colorant may be formed at longitudinally spaced locations with gaps between the spaced portions or sections. As another example, indentions, divots, alphanumeric characters, symbols, or indicia formed with limited colorant may be positioned at longitudinally spaced locations along a longitudinal length of a cable component. As yet another example, portions of a surface of a cable component may be selectively removed at longitudinally spaced locations in order to form physical indicia. Indeed, a wide variety of suitable configurations of physical indicia may be utilized.

In the event that physical indicia are formed at longitudinally spaced locations, a wide variety of suitable gaps or spacings in the longitudinal direction may be positioned between adjacent physical indicia. Examples of suitable gaps include, but are not limited to, approximately 0.01, 0.02, 0.03, 0.04, 0.05, 0.06, 0.07, 0.08, 0.09, 0.1, 0.2, 0.25, 0.3, 0.4, 0.5, 0.6, 0.7, 0.75, 0.8, 0.9, or 1.0 meters, a gap included in a range between any two of the above values, or a gap included in a range bounded on either a minimum or maximum end by one of the above values. In certain embodiments, the gaps or spacings may be selected to facilitate a technician being able to visually and/or tactilely identify the twisted pairs during cable installation without having to strip an undesirable amount of the cable. In certain embodiments, the gaps or spacings between longitudinally spaced physical indicia may have similar lengths or be arranged in accordance with a pattern. In other embodiments, the gaps or spacings may be arranged in a random or pseudo-random manner.

Additionally, the individual physical indicia or sections of physical indicia (e.g., alphanumeric characters, symbols, dots, series of surface variations, sections of ridges or lines, etc.) that are longitudinally spaced from one another may each be formed with any suitable longitudinal length. For example, physical indicia may have longitudinal lengths of approximately, 0.01, 0.02, 0.03, 0.04, 0.05, 0.06, 0.07, 0.08, 0.09, 0.1, 0.2, 0.25, 0.3, 0.4, 0.5, 0.6, 0.7, 0.75, 0.8, 0.9, 1.0, or 2.0 meters, a length included in a range between any two of the above values, or a length included in a range bounded on either a minimum or maximum end by one of the above values. In certain embodiments, a plurality of physical indicia selectively formed on a cable component may have similar longitudinal lengths, such as longitudinal lengths arranged in accordance with a pattern. In other embodiments, at least two physical indicia formed on a cable component may have different longitudinal lengths. As desired, longitudinal lengths may be arranged in a random or pseudo-random manner.

Physical indicia can occupy any suitable percentage of the surface area of a cable component's outer surface. As set forth above, certain physical indicia may occupy an entire outer surface of cable component. Other physical indicia may occupy less than the entire outer surface. For example, physical indicia may occupy approximately 1.0, 2.0, 3.0, 4.0, 5.0, 10, 15, 20, 25, 30, 40, 50, 60, 70, 75, 80, or 90 percent of the surface area of a cable component's outer surface, a percentage of an outer surface included in a range between any two of the above values, or a percentage of an outer surface included in a range bounded on either a minimum or maximum end by one of the above values. According to an aspect of the disclosure, physical indicia formed with limited colorant may occupy approximately five percent (5.0%) or less (or other suitable percentage) of the surface area of a cable component's outer surface.

As desired in various embodiments, a wide variety of suitable physical indicia may be incorporated into a cable component, such as the insulation of one or more conductors of a twisted pair 105. Examples of suitable physical indicia that may be formed on twisted pair insulation include, but are not limited to: (i) surface variations formed on an outer surface of the insulation, such as raised portions (e.g., bumps, ridges, raised alphanumeric characters, raised symbols, etc.), indentions or indented portions (e.g., divots, grooves, indented alphanumeric characters, indented symbols, etc.), and/or texturing; and/or (ii) indicia that include limited colorant formed on an outer surface of the twisted pair insulation. In the event that physical indicia includes the use of limited colorant, the physical indicia may be formed from either a single colorant or from a plurality of different colorants. A few non-limiting examples of physical indicia that may be formed on twisted pair insulation are described in greater detail below. In particular, FIGS. 5A-6E provide a few examples of twisted pairs having physical indicia formed from surface variations. FIGS. 7A-8E provide a few examples of twisted pairs having physical indicia formed from limited colorant. A wide variety of other suitable physical indicia and/or combinations of physical indicia may be formed as desired in other embodiments. For example, physical indicia may include a combination of surface variations and limited colorant.

In yet other embodiments, as explained in greater detail below with reference to the examples cables 200, 300, 400 of FIGS. 2-4, physical indicia may be selectively formed on internal components of the cable 100 other then the twisted pair insulation. For example, physical indicia may be formed on a separator, on one or more shield layers, and/or on one or more dielectric separators positioned between the individual conductors of any number of the twisted pairs 105A-D. In yet other embodiments, physical indicia may be selectively formed on a combination of the twisted pair insulation and one or more other internal components of the cable 100. For example, physical indicia formed on twisted pair insulation (e.g., texturing, etc.) may identify the individual conductors within a twisted pair while physical indicia formed on another cable component (e.g., a separator, a shield, etc.) may be utilized to identify the twisted pairs 105A-D of a cable 100. Indeed, physical indicia may be formed on a wide variety of cable components and/or combinations of components.

With continued reference to FIG. 1, the jacket 110 may enclose the internal components of the cable 100, seal the cable 100 from the environment, and provide strength and structural support. The jacket 110 may be formed from a wide variety of suitable materials and/or combinations of materials, such as such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. The jacket 110 may be formed as a single layer or, alternatively, as multiple layers. In certain embodiments, the jacket 110 may be formed from one or more layers of foamed material. As desired, the jacket 110 can include flame retardant and/or smoke suppressant materials. Additionally, the jacket 110 may include a wide variety of suitable shapes and/or dimensions. For example, the jacket 110 may be formed to result in a round cable or a cable having an approximately circular cross-section; however, the jacket 110 and internal components may be formed to result in other desired shapes, such as an elliptical, oval, or rectangular shape. The jacket 110 may also have a wide variety of dimensions, such as any suitable or desirable outer diameter and/or any suitable or desirable wall thickness. In various embodiments, the jacket 110 can be characterized as an outer jacket, an outer sheath, a casing, a circumferential cover, or a shell.

An opening enclosed by the jacket 110 may be referred to as a cable core, and the twisted pairs 105A-D may be disposed within the cable core. Although a single cable core is illustrated in the cable 100 of FIG. 1, a cable may be formed to include multiple cable cores. In certain embodiments, the cable core may be filled with a gas such as air (as illustrated) or alternatively a gelatinous, solid, powder, moisture absorbing material, water-swellable substance, dry filling compound, or foam material, for example in interstitial spaces between the twisted pairs 105A-D. Other elements can be added to the cable core as desired, for example one or more optical fibers, additional electrical conductors, additional twisted pairs, water absorbing materials, and/or strength members, depending upon application goals.

In certain embodiments, the jacket 110 may be extruded, foamed, or otherwise formed without any colorant being blended, compounded, or otherwise mixed with the one or more polymeric materials utilized to form the jacket 110. In other words, one or more polymeric materials may be extruded or otherwise formed around internal cable components with their natural color. Additionally, in certain embodiments, the jacket 110 may be "free of colorant" with no colorant formed on an outer surface of the jacket 110. In other embodiments, the jacket 110 may be formed with "limited colorant" on its outer surface. For example, limited colorant may be utilized to form a print string on an outer surface of the jacket 110 that includes product identifiers, identifiers indicating compliance with applicable standards, and/or other required information.

Figure 2:
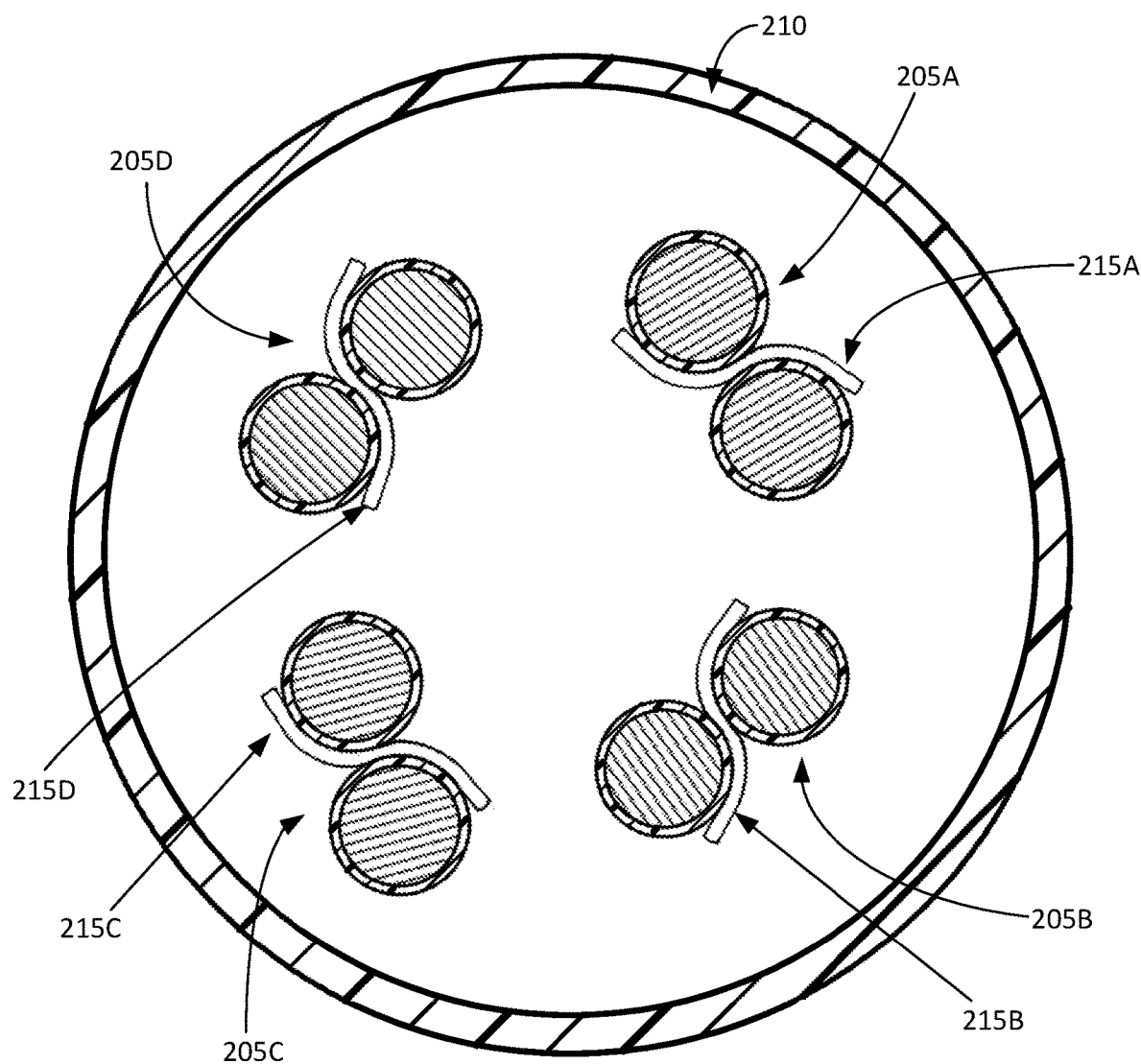

FIG. 2 illustrates a cross-section of a second example cable 200 that may be formed with reduced or minimal colorant. The cable 200 of FIG. 2 may include components that are similar to the cable 100 illustrated and described above with reference to FIG. 1. Accordingly, the cable 200 may include a plurality of twisted pairs 205A-D disposed in a cable core. Additionally, an outer jacket 210 may enclose the internal components of the cable 200. As desired, physical indicia may optionally be formed on the outer surface of the insulation of one or more twisted pairs 205A-D in a similar manner as that described above with reference to FIG. 1 and below with reference to FIGS. 5A-8E. Physical indicia may additionally or alternatively be formed on one or more other cable components, such as one or more dielectric separators.

With continued reference to FIG. 2, the cable 200 may include one or more dielectric separators 215A-D or demarcators with each dielectric separator (generally referred to as dielectric separator 215) positioned between the individual conductors of an associated twisted pair. In certain embodiments, a respective dielectric separator may be provided for each of the twisted pairs 205A-D of the cable 200. In other embodiments, only a portion of the twisted pairs 205A-D may include a dielectric separator positioned between the individual conductors.

In certain embodiments, a dielectric separator 215 may be woven helically between the individual conductors or conductive elements of a twisted pair 205. In other words, the dielectric separator may be helically twisted with the conductors of the twisted pair 205 along a longitudinal length of the cable 200. In certain embodiments, the dielectric separator 215 may maintain spacing between the individual conductors of the twisted pair 205 and/or maintain the positions of one or both of the individual conductors. A dielectric separator 215 may be formed with a wide variety of suitable configurations. As shown in FIG. 2, in certain embodiments, a dielectric separator 215 may be formed as a relatively simple film layer that is positioned between the individual conductors of a twisted pair 205. In other embodiments, a dielectric separator 215 may be formed with a cross-section (e.g., an X-shaped cross-section, an H-shaped cross-section, etc.) that assists in maintaining the position(s) of one or both the individual conductors of the twisted pair 205. In other words, the dielectric separator 215 may reduce or limit the ability of one or both of the individual conductors to shift, slide, or otherwise move in the event that certain forces, such as compressive forces, are exerted on the cable 200.

Additionally, in certain embodiments, a dielectric separator 215 may include one or more portions that extend beyond an outer circumference of a twisted pair 205. When the individual conductors of a twisted pair 205 are wrapped together, the resulting twisted pair 205 will occupy an approximately circular cross-section along a longitudinal length of the cable 200, although the cross-section of the twisted pair 205 is not circular at any given point along the longitudinal length. In certain embodiments, a dielectric separator 215 may extend beyond the outer circumference formed by the twisted pair 205. In this regard, the dielectric separator 215 may maintain a desired distance between the twisted pair 205 and a shield layer, such as an individual shield layer. Thus, when the shield layer is formed around the twisted pair 205, a circumference of the shield layer will be greater than that of the twisted pair 205. In other embodiments, a dielectric separator 215 may include portions that extend beyond a twisted pair 205 and that are wrapped around the twisted pair 205. As a result, a dielectric separator 215 may be utilized to form a shield layer (e.g., an individual shield layer, etc.) around a twisted pair 205. As desired, electrically conductive shielding material may be incorporated into the portions of a dielectric separator 215 that form a shield layer. Further, in certain embodiments, a shielding portion or section of a dielectric separator 215 may include any suitable arrangement of electrically conductive or other shielding material, such as any of the arrangements described in greater detail below with reference to FIG. 3.

As desired in various embodiments, physical indicia may be selectively formed on the respective outer surfaces of any desired number of dielectric separators 215A-D, such as two or more of the dielectric separators 215A-D. The physical indicia may facilitate identification of the twisted pairs 205A-D and/or the individual conductors of one or more of the twisted pairs 205A-D. In an example cable 200 that includes four twisted pairs 205A-D with respective dielectric separators 215A-D, physical indicia may be formed on two, three, or four of the dielectric separators 215A-D for identification purposes. In other embodiments, physical indicia may be formed on a combination of one or more dielectric separators 215A-D and other cable components, such as twisted pair insulation, a separator, etc.

A wide variety of suitable physical indicia may be formed on a dielectric separator 215. Examples of suitable physical indicia that may be formed on a dielectric separator 215 include, but are not limited to: (i) removed portions, spaces, or gaps formed through a dielectric separator 215 or at least one layer of the dielectric separator 215 (e.g., an electrically conductive layer if the dielectric separator 215 serves a shielding function, etc.), (ii) surface variations formed on an outer surface of the dielectric separator 215, such as raised portions (e.g., bumps, ridges, raised alphanumeric characters, raised symbols, etc.), indentions or indented portions (e.g., divots, grooves, indented alphanumeric characters, indented symbols, etc.), and/or texturing; and/or (iii) indicia that include limited colorant formed on an outer surface of the dielectric separator.

Figure 17A:
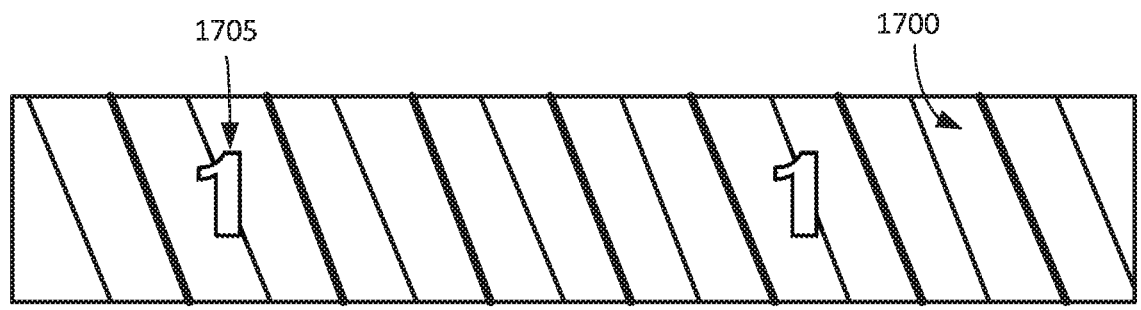
FIGS. 17A-17C illustrate top level views of example dielectric separators that may be positioned between the conductors of a twisted pair and that include different types of physical indicia, according to illustrative embodiments of the disclosure.
Figure 17B:
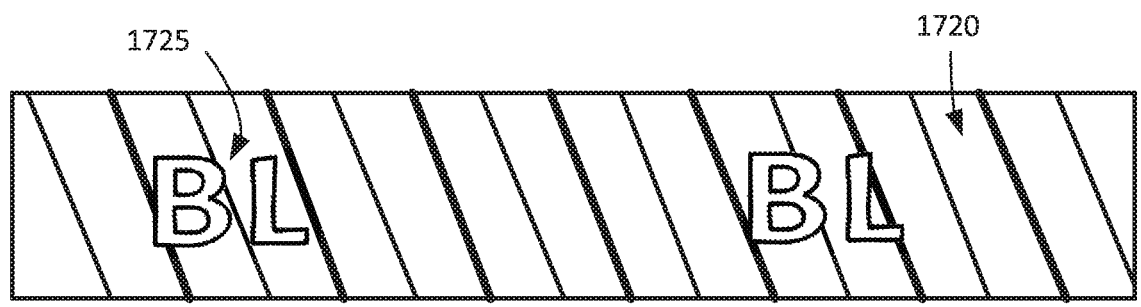
Figure 17C:
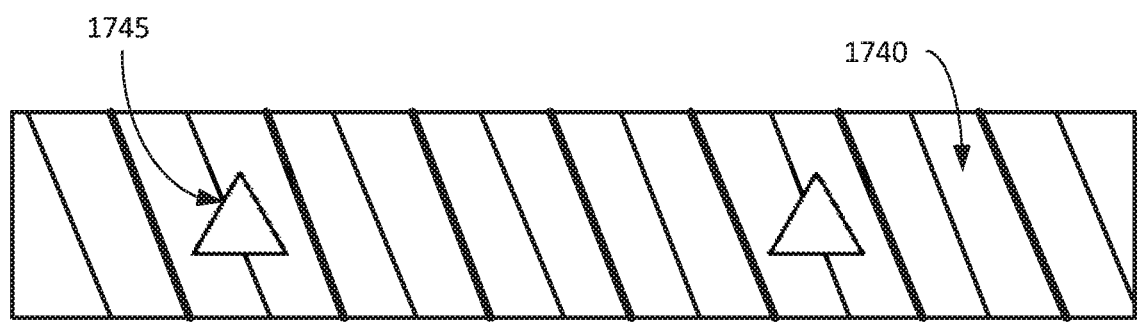

A few non-limiting examples of dielectric separators that include physical indicia formed from removed portions are described in greater detail below with reference to FIGS. 17A-17C. These removed portions may be formed through example dielectric film layers as illustrated in FIGS. 17A-17C. In embodiments in which a dielectric separator includes shielding material, removed portions may be formed through the shielding material without being formed through a base dielectric material in a similar manner as that described below with reference to FIGS. 3, 14, and 15A-15D. With respect to physical indicia that include surface variations and/or limited colorant, it will be appreciated that the example physical indicia described herein for twisted pair insulation and/or separators are equally applicable to certain dielectric separators. For example, a dielectric separator that forms channels into which twisted pair conductors are positioned (e.g., an H-shaped dielectric separator, etc.) may include surface variations as physical indicia to facilitate visual and/or tactile identification of a twisted pair. As another example, limited colorant may be formed on a surface of a dielectric separator for twisted pair and/or individual conductor identification purposes.

Additionally, as explained in greater detail above with reference to FIG. 1, physical indicia may be selectively formed at a wide variety of suitable locations along a dielectric separator 215 or an outer periphery of the dielectric separator 215. For example, physical indicia may be formed on an entire outer surface of a dielectric separator 215 or may be formed on only a portion of the outer periphery of the dielectric separator 215. As desired, physical indicia may be continuous along a longitudinal length of the dielectric separator 215 or may be formed at longitudinally spaced locations along a longitudinal length. For example, removed portions may be formed at spaced longitudinal locations. Any suitable gaps may be positioned between physical indicia formed at longitudinally spaced locations, and each physical indicia or sections of physical indicia may have any suitable longitudinal length and/or other dimensions. Physical indicia may also be spaced in accordance with a pattern or, alternatively, in a random or pseudo-random manner.

Figure 3:
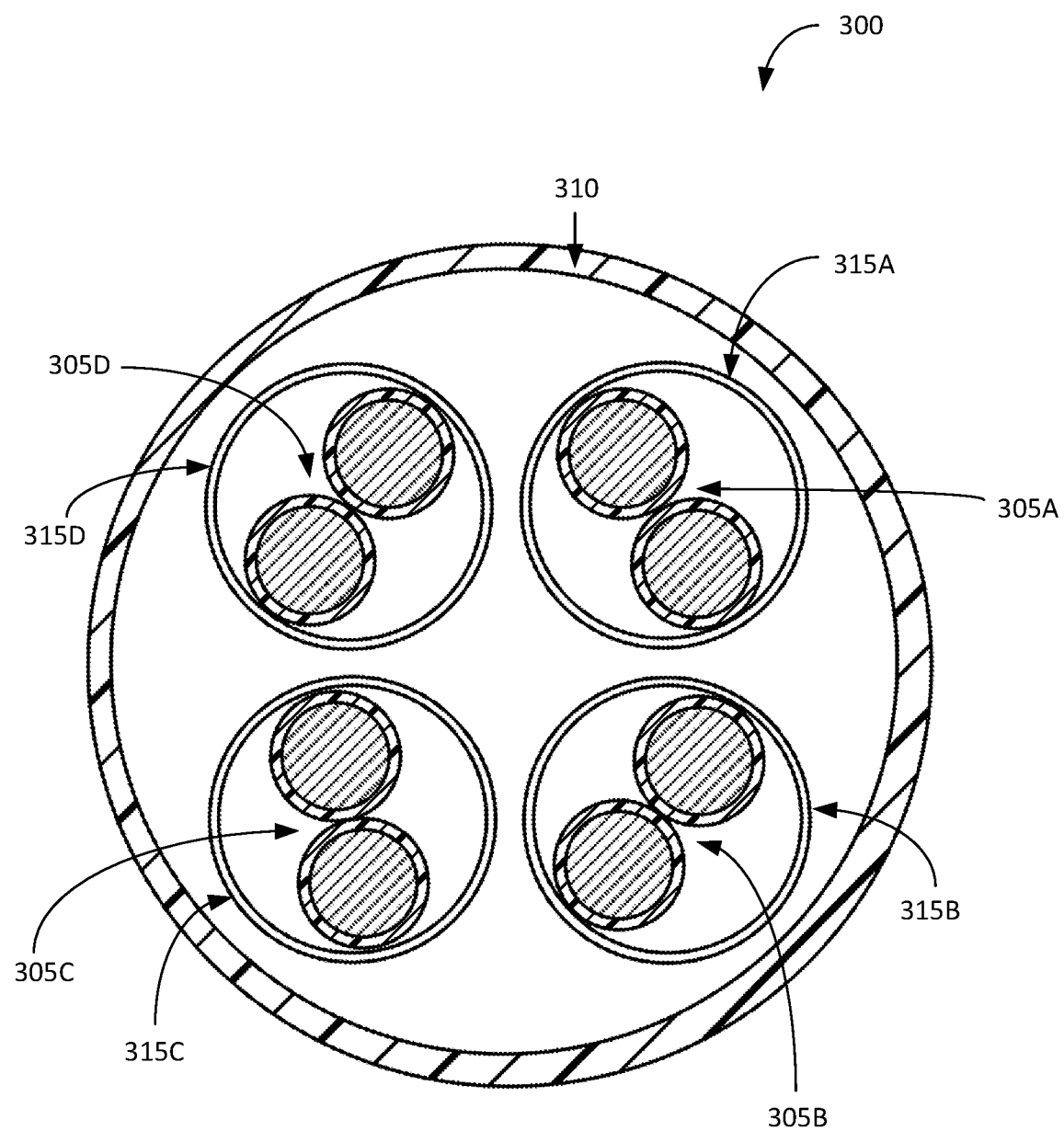

FIG. 3 illustrates a cross-section of a third example cable 300 that may be formed with reduced or minimal colorant. The cable 300 of FIG. 3 may include components that are similar to the cable 100 illustrated and described above with reference to FIG. 1. Accordingly, the cable 300 may include a plurality of twisted pairs 305A-D disposed in a cable core. Additionally, an outer jacket 310 may enclose the internal components of the cable 300. As desired, physical indicia may optionally be formed on the outer surface of the insulation of one or more twisted pairs 305A-D in a similar manner as that described above with reference to FIG. 1 and below with reference to FIGS. 5A-8E. Physical indicia may additionally or alternatively be formed on one or more other cable components, such as one or more shield layers.

With continued reference to FIG. 3, in certain embodiments, one or more shield layers can be disposed between the jacket 310 and one or more twisted pairs 305A-D and/or other cable components. For example, as illustrated in FIG. 3, individual shields 315A-D may be respectively provided for each of the twisted pairs 305A-D. As another example, individual shields may be provided for a portion of the twisted pairs 305A-D. As another example, as shown in FIG. 4, an external shield or an overall shield may be formed around all of the twisted pairs 305A-D. As yet another example, shield layers may be provided for any desired groupings of twisted pairs 305A-D. In other embodiments, a shield layer (or shielding material) may be incorporated into or embedded into the jacket 310 or placed on the outside of the jacket 310. In yet other embodiments, a combination of different types of shield layers may be incorporated into a cable 300. For example, a cable 300 may include a combination of individual shields 315A-D and an overall shield. Indeed, a wide variety of suitable shield layers and/or combinations of shield layers may be utilized.

A shield layer, such as an individual twisted pair shield (herein referred to as shield 315), may be formed from a wide variety of suitable materials and/or utilizing a wide variety of suitable techniques. In certain embodiments, a shield layer 315 may be formed with a plurality of layers. For example, electrically conductive material may be formed on a dielectric substrate to form a shield layer 315. The electrically conductive material may be either continuous along a longitudinal length of the shield layer or, alternatively, arranged into a plurality of longitudinally spaced segments. Adjacent longitudinally spaced segments of electrically conductive material may have isolation gaps or spaces between them. The isolation gaps may prevent an electrically current from propagating along a longitudinal length of the shield 315. As desired, one or more adjacent sets or pairs of segments may be electrically connected to one another by one or more fusible elements. A fusible element may be configured to fuse or break down in the event that a threshold current is present on, transmitted through, or introduced to the fusible element. Once the one or more fusible elements spanning between a set of adjacent spaced segments have fused or broken down, the electrical continuity between the segments may be severed, thereby preventing an electrical current from propagating longitudinally along the shield layer. As a result, the fusible elements may function as a safety mechanism for equipment connected to the cable 300 and/or may reduce or limit the shock hazard of the shielding element As explained in greater detail below with reference to FIG. 4, a cable may optionally include a separator positioned between two or more of the twisted pairs incorporated into the cable. As desired, a separator may include electrically conductive or other shielding material similar to that described herein for the shield layers 315A-D. A component of a cable that includes shielding material may be referred to as a shielding element, and a wide variety of different types of shielding elements and/or combinations of shielding elements may be incorporated into a cable, such as any of the cables 100, 200, 300, 400 of FIGS. 1-4. The shielding elements incorporated into a cable may utilize a wide variety of different materials and/or have a wide variety of suitable configurations. For example, a wide variety of suitable electrically conductive materials or combinations of materials may be utilized in a shielding element including, but not limited to, metallic material (e.g., silver, copper, annealed copper, gold, aluminum, etc.), metallic alloys, conductive composite materials, etc. Other suitable shielding materials may be utilized as desired in addition to or as an alternative to electrically conductive materials. The shielding materials may provide electromagnetic interference ("EMI") shielding for one or more twisted pairs encompassed by or adjacent to a shielding element.

A wide variety of suitable techniques and/or processes may be utilized to form a shielding element. In certain embodiments, a shielding element, such as a shield layer (e.g., an external shield layer, an individual twisted pair shield 305, etc.) or a separator, may be formed as a tape that includes both a dielectric layer and electrically conductive material (e.g., copper, aluminum, silver, an alloy, etc.) or other suitable shielding material formed on or otherwise attached (e.g., adhered, etc.) to the dielectric layer. For example, longitudinally spaced segments of electrically conductive material may be formed on or attached to the dielectric layer. In the event that an adhesive is utilized to join a dielectric layer and electrically conductive material, a wide variety of suitable adhesives can be used. In other embodiments, electrically conductive material may be formed on a dielectric layer via any number of suitable techniques, such as the application of metallic ink or paint, liquid metal deposition, vapor deposition, welding, heat fusion, adherence of patches to the dielectric, etc. In certain embodiments, a dielectric layer and electrically conductive may be over-coated with a second dielectric layer. For example, a separate or second dielectric layer may be formed over a first dielectric layer on which electrically conductive material is formed. In yet other embodiments, a shield layer may be formed whole from longitudinally continuous electrically conductive or other shielding material (e.g., a metallic foil shield, etc.). Indeed, any number of suitable layers of material may be utilized to form a tape which may be used as a shielding element.

A base dielectric layer incorporated into a shielding element may be formed from a wide variety of suitable materials and/or combinations of materials. Examples of suitable materials include, but are not limited to, paper, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, polytetrafluoroethylene, ethylene tetrafluoroethylene ("ETFE"), ethylene chlorotrifluoroethylene ("ECTFE"), etc.), one or more polyesters, polyimide, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or any other suitable material or combination of materials. As desired, one or more foamed materials may be utilized to form a base dielectric layer. Indeed, a base dielectric layer may be filled, unfilled, foamed, un-foamed, homogeneous, or inhomogeneous and may or may not include one or more additives (e.g., flame retardant and/or smoke suppressant materials).

The base dielectric layer may also be formed with a wide variety of suitable dimensions. For example, the base dielectric layer may have any suitable width. In certain embodiments, the width may be determined based at least in part upon a desired cable component (e.g., a shield layer, a separator, etc.) to be formed from a shielding element. In other embodiments, the width may be determined based at least in part upon a desired number of twisted pairs and/or other components to be encompassed by a shielding element. In certain example embodiments, the base dielectric layer may have a width W between approximately five (5) mm and approximately thirty (30) mm. For example, the base dielectric layer may have a width of approximately 5, 10, 15, 20, 25, or 30 mm, a width included in a range between two of the above values, or a width included in a range that is bounded at either a minimum or maximum end by one of the above values. Additionally, the base dielectric layer may be formed with any suitable thickness. For example, a base dielectric layer may have a thickness of about 0.025 mm (about 1 mil or thousandths of an inch) to about 0.12 mm (about 5 mils) or a thickness of about 10 to about 125 microns.

As another example technique for forming a shielding element, a base dielectric layer may be extruded, pultruded or otherwise formed, and electrically conductive material may then be applied on, adhered to, or otherwise formed on the base layer. As desired, a base layer of a shielding element may have a substantially uniform composition and/or may be made of a wide range of materials, such as any of the materials discussed above. Additionally, the base layer may be fabricated in any number of manufacturing passes. Further, the base layer may be foamed, may be a composite, and/or may include one or more strength members, fibers, threads, or yarns. As desired, flame retardant material, smoke suppressants, and/or other desired substances may be blended or incorporated into the base layer. Additionally, as desired, the base layer may be hollow to provide a cavity that may be filled with air or some other gas, gel, fluid, moisture absorbent, water-swellable substance, dry filling compound, powder, one or more optical fibers, one or more metallic conductors (e.g., a drain wire, etc.), shielding, or some other appropriate material or element. The base layer may also be formed with a wide variety of suitable dimensions.

The electrically conductive material incorporated into a shielding element may have a wide variety of suitable configurations. For example, in certain embodiments, a shielding element may include longitudinally continuous electrically conductive material (or other shielding material). In other embodiments, a shielding element may include a plurality of longitudinally spaced segments of electrically conductive material (or other shielding material), either separate by isolation gaps or connected via one or more fusible elements. Any suitable number of longitudinally spaced segments of shielding material may be incorporated into a shielding element. Further, each segment may include a wide variety of suitable dimensions, for example, any suitable lengths in the longitudinal direction, any suitable widths across the base dielectric layer, and/or any suitable thicknesses. In certain embodiments, the longitudinally spaced segments may be formed in accordance with a pattern having a repeating step. For example, the segments may have lengths and/or spacings between segments that are arranged in a pattern. In other embodiments, the longitudinally spaced segments may be formed or arranged in a random or pseudo-random manner. As desired, the dimensions of the segments can be selected to provide EMI shielding over a specific band of electromagnetic frequencies or above or below a designated frequency threshold.

In certain embodiments, each of the segments of shielding material incorporated into a shielding element may have equal or approximately equal lengths. In other embodiments, at least two segments may have different longitudinal lengths. In various embodiments, the segments may have longitudinal lengths of about 0.01, 0.02 0.03, 0.05, 0.1, 0.3, 0.5, 0.75, 1.0, 1.5, 2.0, 2.5, 3.0, 3.5, 4.0, 4.5, or 5.0 meters or in a range between any two of these values. Other lengths may be utilized as desired. Additionally, each of the segments may have any suitable width. In certain embodiments, each segment may have equal or approximately equal widths. In other embodiments, at least two segments may have different widths. Further, in certain embodiments, one or more segments may have widths that span across or approximately across (e.g., with a narrow space of dielectric material present on one or both sides) the width of an underlying base layer. In other words, the longitudinally spaced segments may span across or substantially across the base layer in a widthwise direction or dimension perpendicular to the longitudinal direction. In other embodiments, one or more segments may have widths that are substantially smaller than that of the underlying base dielectric layer. For example, a shielding element may be formed with two or more parallel rows of segments, and the two or more rows may be spaced along a widthwise dimension of the base dielectric layer. Additionally, the segments may include shielding material having any desired thickness.

Figure 15A:
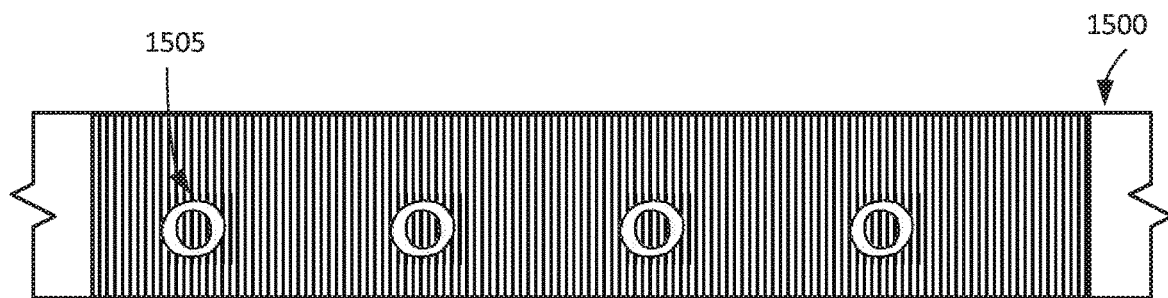
FIGS. 15A-15D illustrate top level views of example shield layers that include different types of physical indicia, according to illustrative embodiments of the disclosure.
Figure 15B:
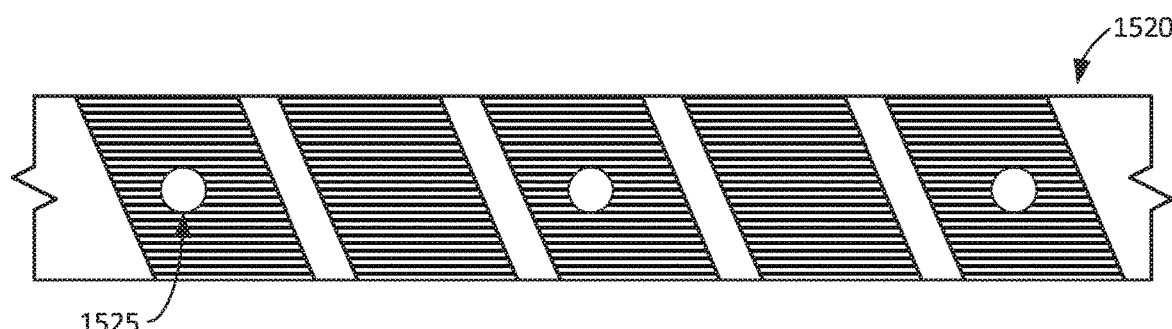
Figure 15C:
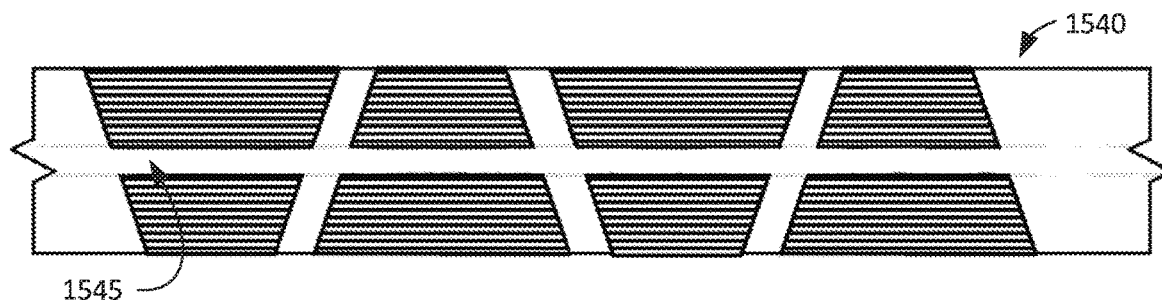
Figure 15D:
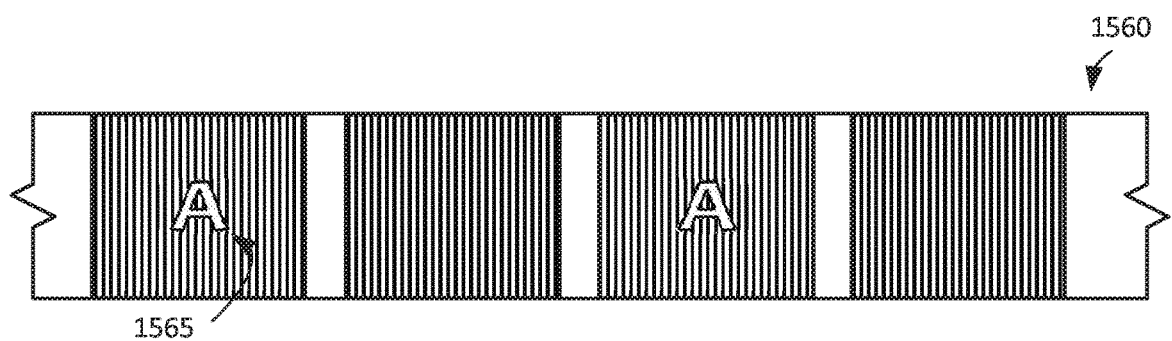

Segments of shielding material may also be formed with any suitable shapes as desired in various embodiments. Examples of suitable shapes include, but are not limited to, rectangles, squares, trapezoids, parallelograms, shapes with angled edges, and/or other suitable shapes. A few example segment shapes are illustrated in FIGS. 15A-15D. FIG. 15D illustrates an example shield layer in which spaced segments are formed with rectangular shapes. FIG. 15B illustrates an example shield layer in which spaced segments are formed with parallelogram shapes. When a shield layer is wrapped around one or more twisted pairs, the parallelogram shapes may result in the spaced segments having a spiral direction around the twisted pairs. In various embodiments, the segments may have a spiral direction opposite the twist direction of the pairs or in the same direction as the pair twist direction. FIG. 15C illustrates an example shield layer in which spaced segments may be formed with trapezoidal shapes. In other embodiments, segments may be formed with shapes that taper along a longitudinal direction. Other suitable shapes may be utilized as desired.

Regardless of the type of shielding elements incorporated into a cable, physical indicia may selectively be formed on the respective outer surface of any desired number of shielding elements. For example, physical indicia may be selectively formed on the respective outer surfaces of any of the individual shield layers 315A-D incorporated into the cable 300 of FIG. 3. The physical indicia may facilitate identification of the twisted pairs 305A-D. In an example cable 300 that includes four individual shield layers 315A-D, physical indicia may be formed on two, three, or four of the shield layers 315A-D for identification purposes. In other embodiments, physical indicia may be formed on a combination of one or more shield layers 315A-D and other cable components, such as twisted pair insulation, a separator, etc. For example, first physical indicia formed on shield layers 315A-D may facilitate identification of twisted pairs 305A-D, and second physical indicia formed on twisted pair insulation may facilitate identification of individual conductors within the twisted pairs 305A-D.

A wide variety of suitable physical indicia may be formed on a shield layer 315. Examples of suitable physical indicia that may be formed on a shield layer 315 include, but are not limited to: (i) removed portions, spaces, or gaps formed through a shield layer 315 or at least one layer of the shield layer 315 (e.g., an electrically conductive layer, etc.), (ii) surface variations formed on an outer surface of the shield layer 315, such as raised portions (e.g., bumps, ridges, raised alphanumeric characters, raised symbols, etc.), indentions or indented portions (e.g., divots, grooves, indented alphanumeric characters, indented symbols, etc.), and/or texturing; and/or (iii) indicia that include limited colorant formed on an outer surface of the shield layer.

A few non-limiting examples of shield layers that include physical indicia formed from removed portions are described in greater detail below with reference to FIGS. 14-15D. In certain embodiments, the removed portions may be formed through the electrically conductive material. For example, electrically conductive material may be formed to exclude portion corresponding to physical indicia. Alternatively, electrically conductive material may be applied to a dielectric layer and selectively removed (e.g., laser cut, etched, punched, stamped, etc.) in order to form physical indicia. In other embodiments, the removed portions may be formed through both electrically conductive material and a base dielectric layer. For example, a shield layer may be punched in order to form physical indicia. Other suitable methods or techniques may be utilized as desired to remove portions of a shield layer in order to form physical indicia. With respect to physical indicia that include surface variations and/or limited colorant, it will be appreciated that the example physical indicia described herein for twisted pair insulation and/or separators are equally applicable to certain shield layers.

Additionally, as explained in greater detail above with reference to FIG. 1, physical indicia may be selectively formed at a wide variety of suitable locations along a shield layer or an outer periphery of the shield layer. As desired, physical indicia may be continuous along a longitudinal length of the shield layer 315 (e.g., lines, etc.) or may be formed at longitudinally spaced locations along a longitudinal length. For example, removed portions may be formed at spaced longitudinal locations. Any suitable gaps may be positioned between physical indicia formed at longitudinally spaced locations, and each physical indicia or sections of physical indicia may have any suitable longitudinal length and/or other dimensions. Physical indicia may also be spaced in accordance with a pattern or, alternatively, in a random or pseudo-random manner.

Figure 4:
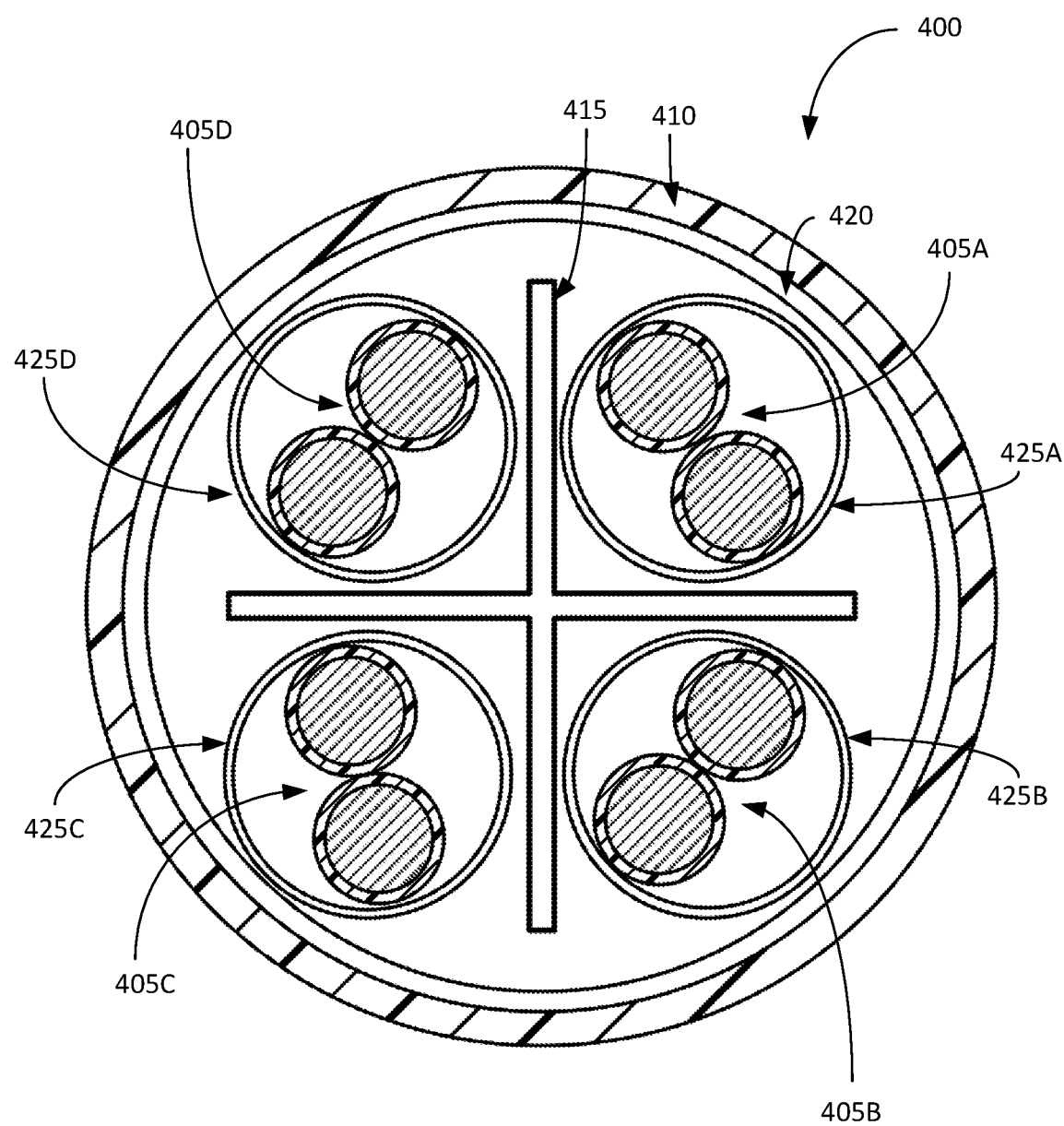

FIG. 4 illustrates a cross-section of a fourth example cable 400 that may be formed with reduced or minimal colorant. The cable 400 of FIG. 4 may include components that are similar to the cable 100 illustrated and described above with reference to FIG. 1. Accordingly, the cable 400 may include a plurality of twisted pairs 405A-D disposed in a cable core. Additionally, an outer jacket 410 may enclose the twisted pairs 405A-D and other internal components of the cable 400. One or more shield layers, such as an overall shield layer 420 and/or individual shield layers 425A-D may optionally be incorporated into the cable 400. These shield layers may be similar to the shield layers described above with reference to FIG. 3. As desired, physical indicia may optionally be formed on the outer surface of the insulation of one or more twisted pairs 405A-D and/or on one or more shield layers 420, 425A-D in a similar manner as that described above with reference to FIGS. 1 and 3. Physical indicia may additionally or alternatively be formed on one or more other cable components, such as a separator.

Figure 16:
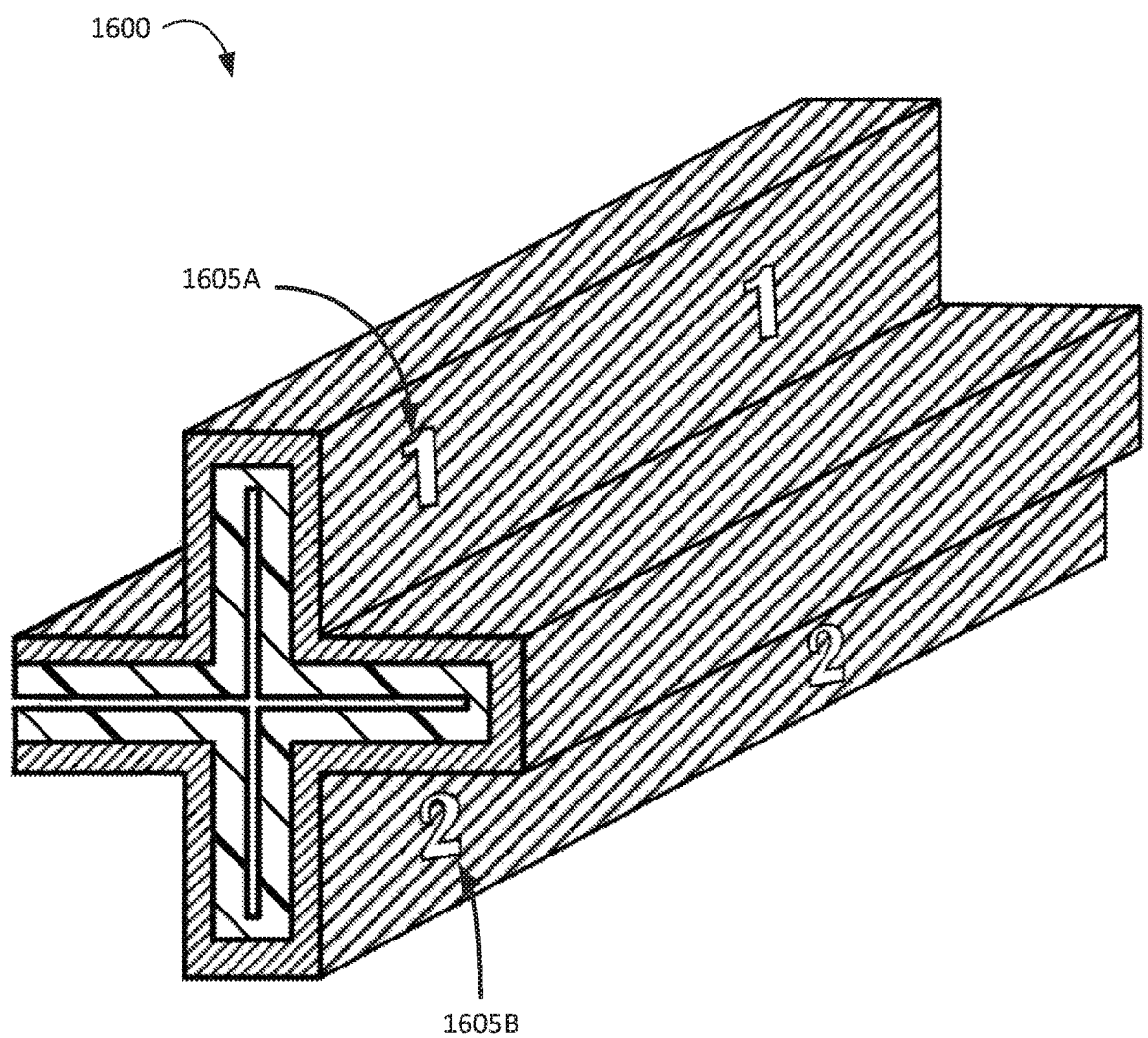
FIG. 16 illustrates a perspective view of an example separator formed from a folded tape that includes physical indicia, according to an illustrative embodiment of the disclosure.

With continued reference to FIG. 3, the cable 400 may also include a separator 415 or filler configured to orient and or position one or more of the twisted pairs 405A-D. The orientation of the twisted pairs 405A-D relative to one another may provide beneficial signal performance. As desired in various embodiments, the separator 415 may be formed in accordance with a wide variety of suitable dimensions, shapes, or designs. For example, a rod-shaped separator, a flat tape separator, a flat separator, an X-shaped or cross-shaped separator (as depicted in FIG. 3), a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, prongs, or projections, and/or a wide variety of other shapes may be utilized. In certain embodiments, material may be extruded, cast, or molded into a desired shape to form the separator 415. In other embodiments, as shown in FIG. 16, a tape may be formed into a desired shape utilizing a wide variety of folding and/or shaping techniques. For example, a relatively flat tape separator may be formed into an X-shape or cross-shape as a result of being passed through one or more dies.

In certain embodiments, the separator 415 may be continuous along a length of the cable 400. In other embodiments, the separator 415 may be non-continuous or discontinuous along a length of the cable 400. In other words, the separator 415 may be separated, segmented, or severed in a longitudinal direction such that discrete sections or portions of the separator 415 are arranged longitudinally (e.g., end to end) along a length of the cable 400. Use of a non-continuous or segmented separator may enhance the flexibility of the cable 400, reduce an amount of material incorporated into the cable 400, and/or reduce the cable cost.

The separator 415 may be formed from a wide variety of suitable materials as desired in various embodiments. For example, the separator 415 and/or various separator segments can include paper, metals, alloys, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or any other suitable material or combination of materials. As desired, the separator 110 may be filled, unfilled, foamed, un-foamed, homogeneous, or inhomogeneous and may or may not include additives (e.g., flame retardant and/or smoke suppressant materials).

In certain embodiments, electrically conductive material (or other shielding material) may be incorporated into a separator 415. For example, a separator 415 may include electrically conductive material formed on or adhered to a dielectric substrate or base (e.g., a tape that is folded into a desired separator shape, an extruded dielectric base, etc.). As another example, a separator 415 may include electrically conductive material embedded into a dielectric material or sandwiched between two dielectric layers. As a result of incorporating electrically conductive material, the separator 415 may function as a shielding element. The electrically conductive material incorporated into a separator 415 may have a wide variety of suitable configurations, dimensions, and/or shapes, such as any of the configurations, dimensions, and/or shapes discussed above with reference to FIG. 3.

In certain embodiments, both a separator 415 and an external shield 420 may be incorporated into a cable 400. For example, a separator 415 may be positioned between a multitude of twisted pairs 405A-D, and an external shield 420 may circumscribe the twisted pairs 405A-D (or a desired grouping of one or more twisted pairs). Further, both the separator 415 and the external shield 420 may include electrically conductive or other shielding material. In this regard, the separator 415 may provide for shielding between the twisted pairs 405A-D, and the external shield 420 may shield the twisted pairs from external signals. As a result of utilizing both a separator 415 and shield 420, the performance of the cable 400 may be similar to a cable in which each of the twisted pairs 405A-D is individually shielded. However, the cable 400 may be easier to terminate by a technician.

In certain embodiments, physical indicia may selectively be formed on the respective outer surface of a separator 415. The physical indicia may facilitate identification of the twisted pairs 405A-D. For a separator 415 that includes a plurality of prongs or projections that extend between adjacent sets of twisted pairs (e.g., a flat separator that bisects a cable core, a cross-filler, etc.), physical indicia may be formed on any desired number of prongs or projections to facilitate twisted pair identification. In other embodiments, physical indicia may be formed on a combination of a separator and other cable components, such as twisted pair insulation. For example, first physical indicia formed on a separator 415 may facilitate identification of twisted pairs 405A-D, and second physical indicia formed on twisted pair insulation may facilitate identification of individual conductors within the twisted pairs 405A-D.

A wide variety of suitable physical indicia may be formed on a separator 415 and/or various prongs of a separator 415. Examples of suitable physical indicia that may be formed on a separator 415 include, but are not limited to: (i) surface variations formed on an outer surface of the separator 415, such as raised portions (e.g., bumps, ridges, raised alphanumeric characters, raised symbols, etc.), indentions or indented portions (e.g., divots, grooves, indented alphanumeric characters, indented symbols, etc.), and/or texturing; (ii) indicia that include limited colorant formed on an outer surface of the separator 415, and/or (iii) removed portions, spaces, or gaps formed through one or more separator prongs or shielding material formed on a separator. A few non-limiting examples of physical indicia that may be formed on a separator 415 are described in greater detail below. In particular, FIGS. 9A-10D provide a few examples of separators having physical indicia formed from surface variations. FIGS. 11A-12E provide a few examples of separators having physical indicia formed from limited colorant. In the event that physical indicia includes the use of limited colorant, the physical indicia may be formed from either a single colorant or from a plurality of different colorants. With respect to physical indicia that include removed portions, the physical indicia may be formed in a similar manner as that described herein with respect to shield layers and dielectric separators. A wide variety of other suitable physical indicia and/or combinations of physical indicia may be formed as desired in other embodiments. For example, physical indicia may include a combination of surface variations and limited colorant.

Additionally, as explained in greater detail above with reference to FIG. 1, physical indicia may be selectively formed at a wide variety of suitable locations along a separator 415 or an outer periphery of the separator 415. As desired, physical indicia may be continuous along a longitudinal length of the separator 415 (e.g., lines, texturing, etc.) or may be formed at longitudinally spaced locations along a longitudinal length. Any suitable gaps may be positioned between physical indicia formed at longitudinally spaced locations, and each physical indicia or sections of physical indicia may have any suitable longitudinal length and/or other dimensions. Physical indicia may also be spaced in accordance with a pattern or, alternatively, in a random or pseudo-random manner.

The cables 100, 200, 300, 400 illustrated in FIGS. 1-4 are provided by way of example only. Embodiments of the disclosure contemplate a wide variety of other cables and cable constructions. These other cables may include more or less components than the cables 100, 200, 300, 400 illustrated in FIGS. 1-4. For example, other cables may include alternative shielding arrangements and/or different types of separators or fillers. Other cables may also include alternative numbers and/or configurations of dielectric films. Additionally, certain components may have different dimensions and/or materials than the components illustrated in FIGS. 1-4. Other materials and/or components may be incorporated into a cable as desired in other embodiments. For example, a cable may include any number of conductors, twisted pairs, optical fibers, and/or other transmission media. In certain embodiments, one or more tubes or other structures may be situated around various transmission media and/or groups of transmission media. Additionally, as desired, a cable may include a wide variety of strength members, swellable materials (e.g., aramid yarns, blown swellable fibers, etc.), insulating materials, dielectric materials, flame retardants, flame suppressants or extinguishants, gels, and/or other materials.

As set forth above, a wide variety of different types of physical indicia may be incorporated into a cable on a wide variety of suitable cable components. FIGS. 5A-8E illustrate a few non-limiting examples of physical indicia that may be formed on an outer surface of twisted pair insulation, such as the insulation of any of the twisted pairs of the cables illustrated in FIGS. 1-4. FIGS. 9A-12E and 16 illustrate a few non-limiting examples of physical indicia that may be formed on an outer surface of a separator, such as the separator 415 of FIG. 4. FIGS. 14-15D illustrate a few non-limiting examples of physical indicia that may be formed on one or more shield layers, such as any of the shield layers illustrated in the cables of FIGS. 3 and 4. FIGS. 17A-17C illustrate a few non-limiting examples of physical indicia that may be formed on one or more dielectric separators positioned between the conductors of a twisted pair, such as the dielectric separators 215A-D of FIG. 2. Each of these figures is described in greater detail below. It will further be appreciated that a wide variety of other suitable physical indicia may be incorporated into a cable as desired in other embodiments. Additionally, any suitable combination of two or more of the example physical indicia discussed herein may be combined within a single cable.

Figure 5A:
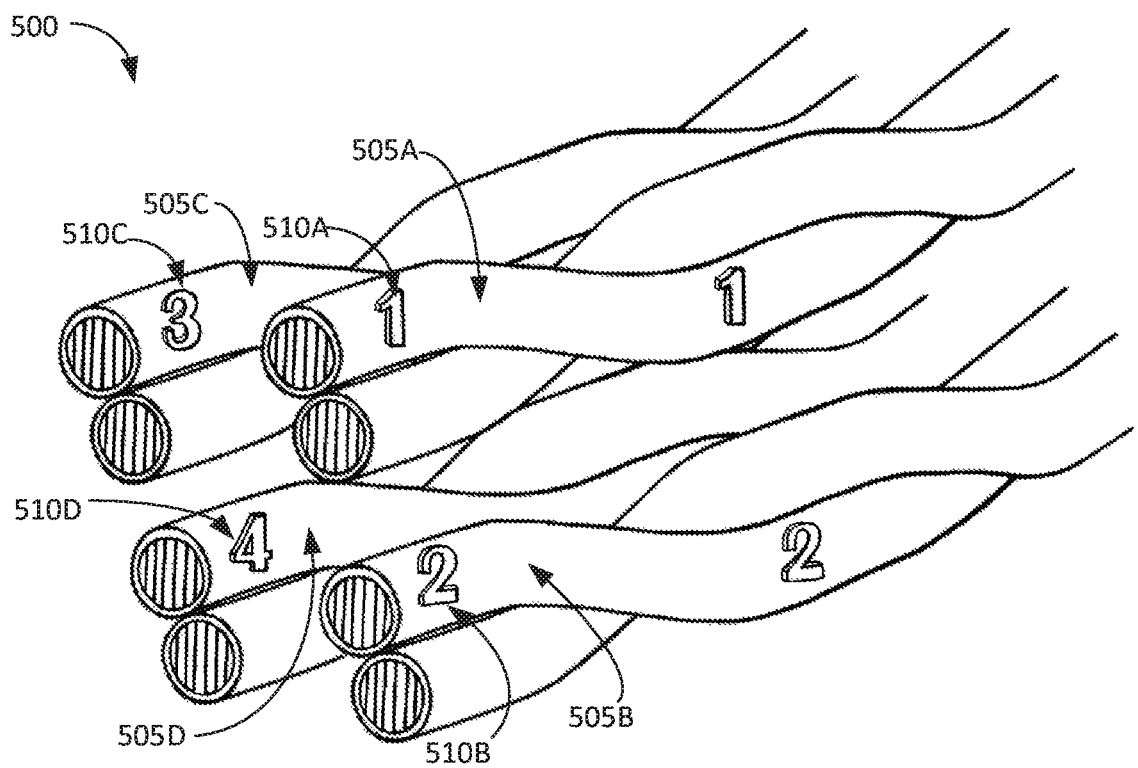
FIGS. 5A-5E are perspective views of example twisted pairs that are free of colorant and that include raised physical indicia, according to illustrative embodiments of the disclosure.

FIGS. 5A-6E are perspective views of example twisted pairs that include physical indicia formed as surface variations. In particular, FIGS. 5A-5E are perspective views of example twisted pairs that are free of colorant and that include raised physical indicia. FIGS. 6A-6E are perspective views of example twisted pairs that are free of colorant and that include indented physical indicia. Turning first to FIG. 5A, a first set 500 of twisted pairs 505A-D is illustrated. Respective physical indicia 510A-D may be formed on each of the twisted pairs 505A-D to facilitate visual and/or tactile identification of the twisted pairs 505A-D without the use of colorant. The physical indicia 510A-D are illustrated as raised numbers formed on the respective outer surfaces of each of the twisted pairs 505A-D. Each twisted pair (generally referred to as twisted pair 505) may include a plurality of longitudinally spaced raised physical indicia formed on and extending or protruding from an outer surface of the insulation of at least one twisted pair conductor.

Figure 5B:
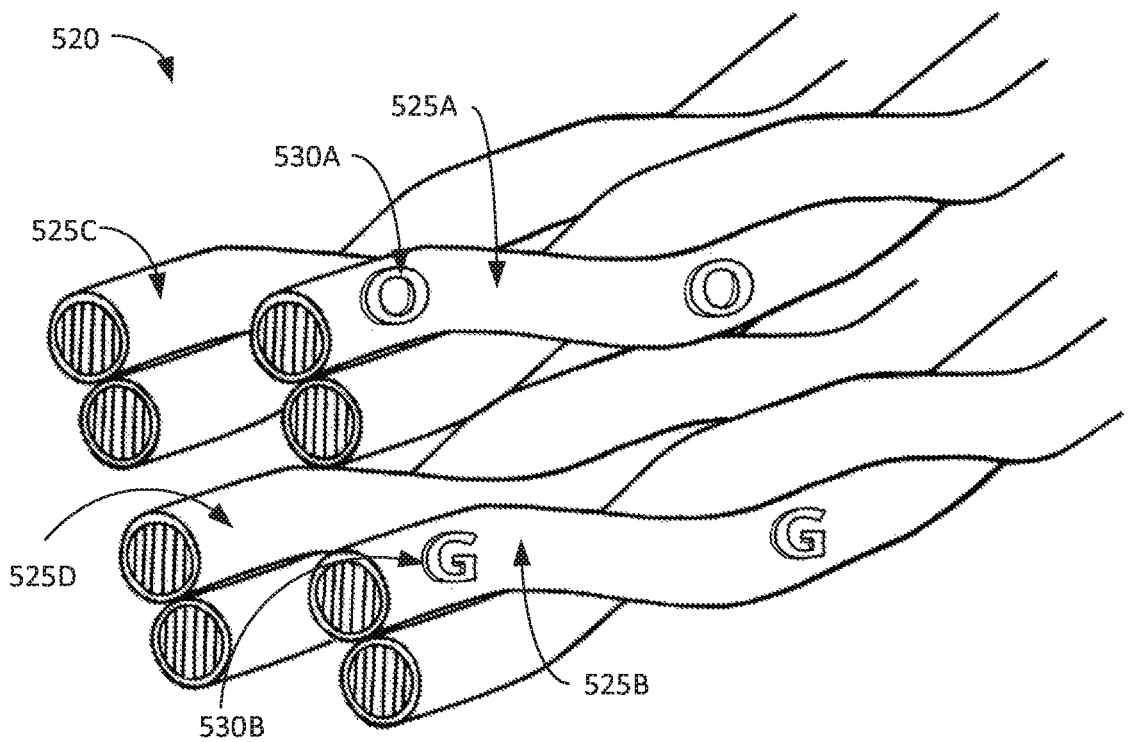
Figure 5C:
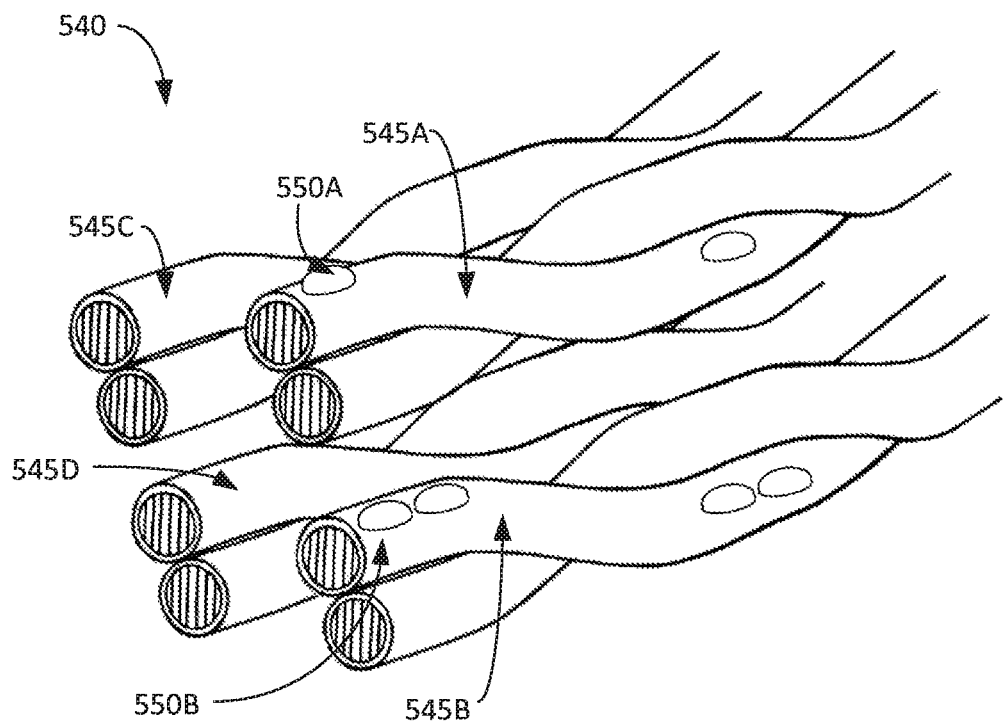
Figure 5D:
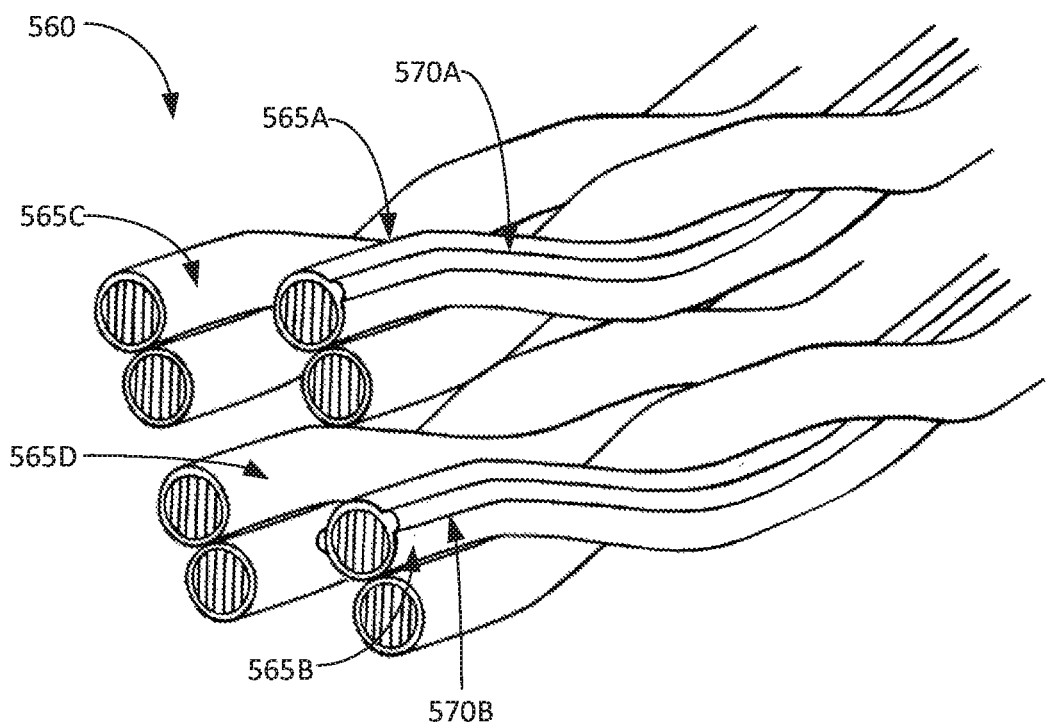

In certain embodiments, the physical indicia 510A-D may be formed on similar conductors in each twisted pair 505A-D. For example, the physical indicia 510A-D may be formed on either the conventional colored or the conventional white (or striped) conductors. In this regard, the physical indicia 510A-D may further facilitate visual and/or tactile identification of the individual twisted pair conductors without the use of colorant. In other embodiments, different physical indicia may be formed on each of the individual conductors within one or more of the twisted pairs 505A-D. Additionally, although FIG. 5A illustrates respective physical indicia 510A-D formed on each of the twisted pairs 505A-D, raised physical indicia may be formed on a subset of the twisted pairs 505A-D as illustrated in FIG. 5B-5D. For example, raised physical indicia may be formed on two of the twisted pairs 505A-D provided that a technician or installer can identify all of the various twisted pairs 505A-D using the physical indicia. Other physical indicia, such as textured surfaces (as illustrated in 5E), may be utilized to identify the individual conductors within any number of the twisted pairs 505A-D. Alternatively, the individual conductors of two or more twisted pairs may be insulated with different polymeric materials (e.g., materials formed from different polymers, materials formed from different grades of the same polymer, etc.) that are visually distinct from one another.

FIG. 5B illustrates a second set 520 of twisted pairs 525A-D that include raised physical indicia. Respective physical indicia 530A, 530B may be formed on a subset of the twisted pairs 525A-D to facilitate visual and/or tactile identification of the twisted pairs 525A-D without the use of colorant. For example, respective physical indicia 530A, 530B may be formed on two of the twisted pairs 525A, 525B. Once the two twisted pairs 525A, 525B are identified, a technician or installer may use the identities of the two pairs 525A, 525B and their orientation relative to one another to determine the identities of the other two pairs 525C, 525D. In other embodiments, respective physical indicia may be formed on each of the twisted pairs 525A-D or on three of the twisted pairs 525A-D.

The physical indicia 530A, 530B are illustrated as raised letters formed on the respective outer surfaces of two twisted pairs 525A, 525B. On each twisted pair (generally referred to as twisted pair 525), the respective physical indicia may include a plurality of longitudinally spaced raised physical indicia formed on an outer surface of the insulation of at least one twisted pair conductor. In certain embodiments, the raised letters may correspond to conventional colors used within twisted pair cabling. As shown, the raised letters may identify the conventional "orange" pair and the conventional "green" pair. Other letters, alphanumeric characters, sets of alphanumeric characters, and/or symbols (e.g., shapes as illustrated in FIG. 8D, etc.) may be utilized as desired in other embodiments. Additionally, a wide variety of suitable techniques may be utilized to identify the individual conductors within each of the twisted pairs 525A-D. For example, physical indicia may be formed on each twisted pair 525A-D and/or other physical indicia, (e.g., textured surfaces, other raised portions, etc.), may be utilized to identify individual conductors within any number of the twisted pairs 525A-D. Alternatively, the individual conductors of two or more twisted pairs may be insulated with different polymeric materials that are visually distinct from one another.

FIG. 5C illustrates a third set 540 of twisted pairs 545A-D that include raised physical indicia. Respective physical indicia 550A, 550B may be formed on a subset of the twisted pairs 545A-D to facilitate visual and/or tactile identification of the twisted pairs 545A-D without the use of colorant. For example, respective physical indicia 550A, 550B may be formed on two of the twisted pairs 545A, 545B. In other embodiments, respective physical indicia may be formed on each of the twisted pairs 545A-D or on three of the twisted pairs 545A-D. The physical indicia 550A, 550B are illustrated as raised bumps or protrusions formed on the respective outer surfaces of two twisted pairs 545A, 545B. On each twisted pair (generally referred to as twisted pair 545), the respective physical indicia may include a plurality of longitudinally spaced raised physical indicia formed on an outer surface of the insulation of at least one twisted pair conductor. As shown, different configurations of raised bumps may be utilized on different twisted pairs to facilitate identification. For example, single bumps may be utilized as physical indicia 550A on a first pair 545A, and sets of double bumps may be utilized as physical indicia 550B on a second pair 545B. Other numbers and/or arrangements of bumps may be utilized as desired. Bumps may also have any suitable shape, such as a round, oval, rectangular, or other shape. In certain embodiments, bumps having different shapes may be utilized on different twisted pairs. Additionally, as described in greater detail above, a wide variety of suitable techniques may be utilized to identify the individual conductors within each of the twisted pairs 545A-D.

FIG. 5D illustrates a fourth set 560 of twisted pairs 565A-D that include raised physical indicia. Respective physical indicia 570A, 570B may be formed on a subset of the twisted pairs 565A-D to facilitate visual and/or tactile identification of the twisted pairs 565A-D without the use of colorant. For example, respective physical indicia 570A, 570B may be formed on two of the twisted pairs 565A, 565B. In other embodiments, respective physical indicia may be formed on each of the twisted pairs 565A-D or on three of the twisted pairs 565A-D. The physical indicia 570A, 570B are illustrated as raised ridges formed on the respective outer surfaces of two twisted pairs 565A, 565B. As shown, different configurations of raised ridges may be utilized on different twisted pairs to facilitate identification. For example, a single ridge may be utilized as physical indicia 570A on a first pair 565A, and two ridges (e.g., two ridges formed on opposite sides of twisted pair insulation, etc.) may be utilized as physical indicia 570B on a second pair 565B. Other numbers of ridges may be utilized as desired. As shown, in certain embodiments, one or more ridges may be formed as longitudinally continuous ridges. In other embodiments, a ridge may include a plurality of longitudinally spaced sections such that the ridge resembles a dotted line ridge. Additionally, a ridge may either extend in a parallel direction to that of the conductor on which it is formed, may spiral around a conductor, or may have any other suitable configuration. Various combinations of ridges may be utilized to identify different twisted pairs. For example, a single longitudinally continuous ridge may be formed on a first pair, and a dotted line ridge may be formed on a second pair. As described in greater detail above, a wide variety of suitable techniques may also be utilized to identify the individual conductors within each of the twisted pairs 565A-D.

Figure 5E:
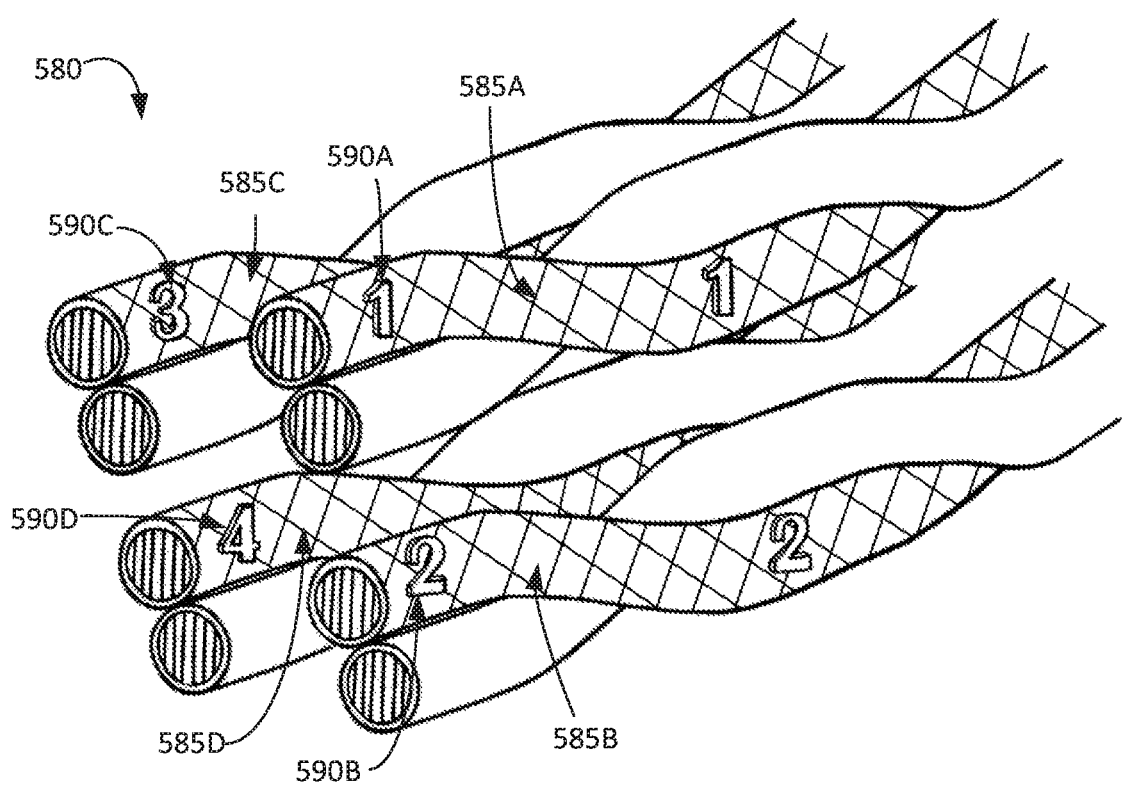

FIG. 5E illustrates a fifth set 580 of twisted pairs 585A-D that include raised physical indicia. Similar to FIG. 5A, respective physical indicia 590A-D embodied as raised numbers may be formed on each of the twisted pairs 585A-D. In other embodiments, physical indicia may be formed on a subset of the twisted pairs 585A-D. A wide variety of different types of raised and/or other physical indicia may also be utilized in addition to or as an alternative to numbers. Additionally, FIG. 5E illustrates the use of texturing as physical indicia in order to facilitate identification of the individual conductors within any desired number of the twisted pairs 585A-D. For example, an outer surface of the insulation on one of the two conductors of a twisted pair (generally referred to as twisted pair 585) may include a modified or textured surface to distinguish the conductor from the other conductor. A wide variety of suitable texturing may be utilized as desired. For example, insulation may have a roughened or otherwise modified surface. As desired, texturing can be longitudinally continuous or may include a plurality of longitudinally spaced sections of texturing with any suitable lengths for the various sections and/or any suitable gaps between sections. Similarly, texturing can be circumferentially continuous around a conductor or may include a plurality of sections of texturing. A wide variety of different texturing patterns and/or configurations may also be utilized. As an alternative to including raised physical indicia, in other embodiments, a set of twisted pairs may include pairs that utilize different textures (e.g., different patterns, different spacings between textured sections, different lengths of textured sections, etc.) in order to facilitate twisted pair identification and/or individual conductor identification.

Figure 6A:
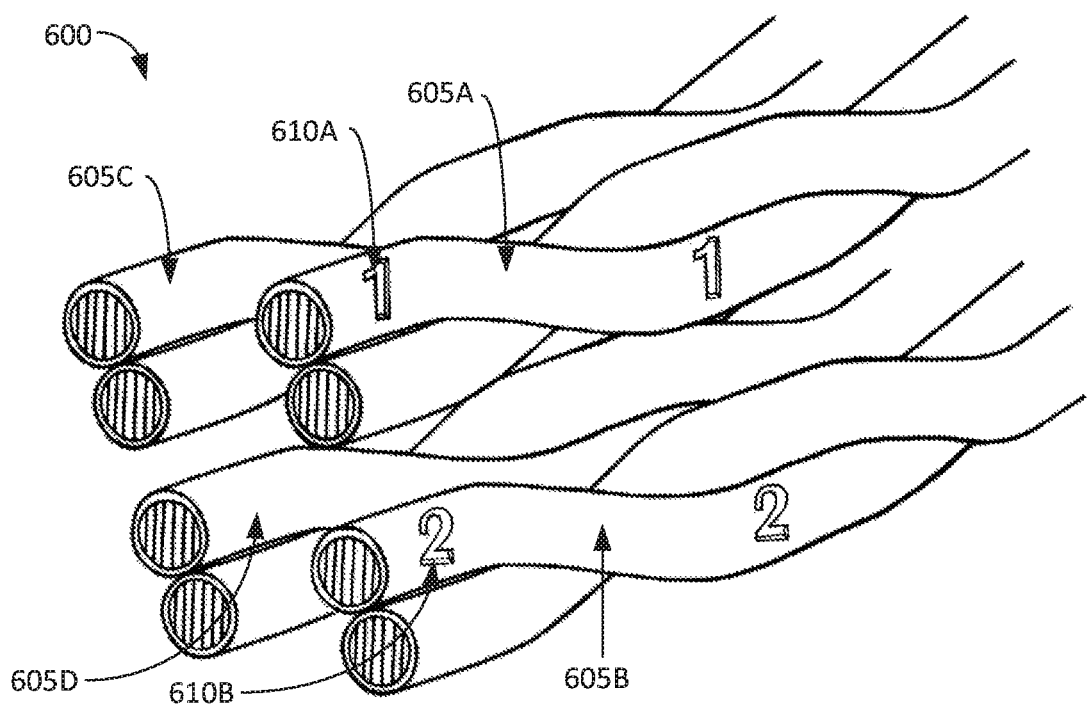
FIGS. 6A-6E are perspective views of example twisted pairs that are free of colorant and that include indented physical indicia, according to illustrative embodiments of the disclosure.

FIG. 6A illustrates a first set 600 of twisted pairs 605A-D that includes indented physical indicia. Physical indicia may be formed on any number of the twisted pairs 605A-D to facilitate visual and/or tactile identification of the twisted pairs 605A-D without the use of colorant. As illustrated, respective physical indicia 610A, 610B may be formed on two of the twisted pairs 605A, 605B. In other embodiments, respective physical indicia may be formed on each of the twisted pairs 605A-D or on three of the twisted pairs 605A-D. The physical indicia 610A, 610B are illustrated as indented numbers formed on the respective outer surfaces of each of the twisted pairs 605A, 605B. A twisted pair (generally referred to as twisted pair 605) may include a plurality of longitudinally spaced indented physical indicia formed in and/or impressed into an outer surface of the insulation of at least one twisted pair conductor.

In certain embodiments, the physical indicia (e.g., physical indicia 610A, 610B, etc.) may be formed on similar conductors of the various twisted pairs 605A-D, for example, the conventional colored or the conventional white (or striped) conductors. In this regard, the physical indicia may further facilitate visual and/or tactile identification of individual twisted pair conductors without the use of colorant. For example, when respective physical indicia are formed on each of the twisted pairs 605A-D, the physical indicia may facilitate identification of individual conductors. In other embodiments, different physical indicia may be formed on each of the individual conductors within one or more of the twisted pairs 605A-D. As described in greater detail above with respect to the example raised physical indicia, a wide variety of other suitable techniques (e.g., texturing, different polymeric materials, etc.) may be utilized to identify the individual conductors within each of the twisted pairs 605A-D.

Figure 6B:
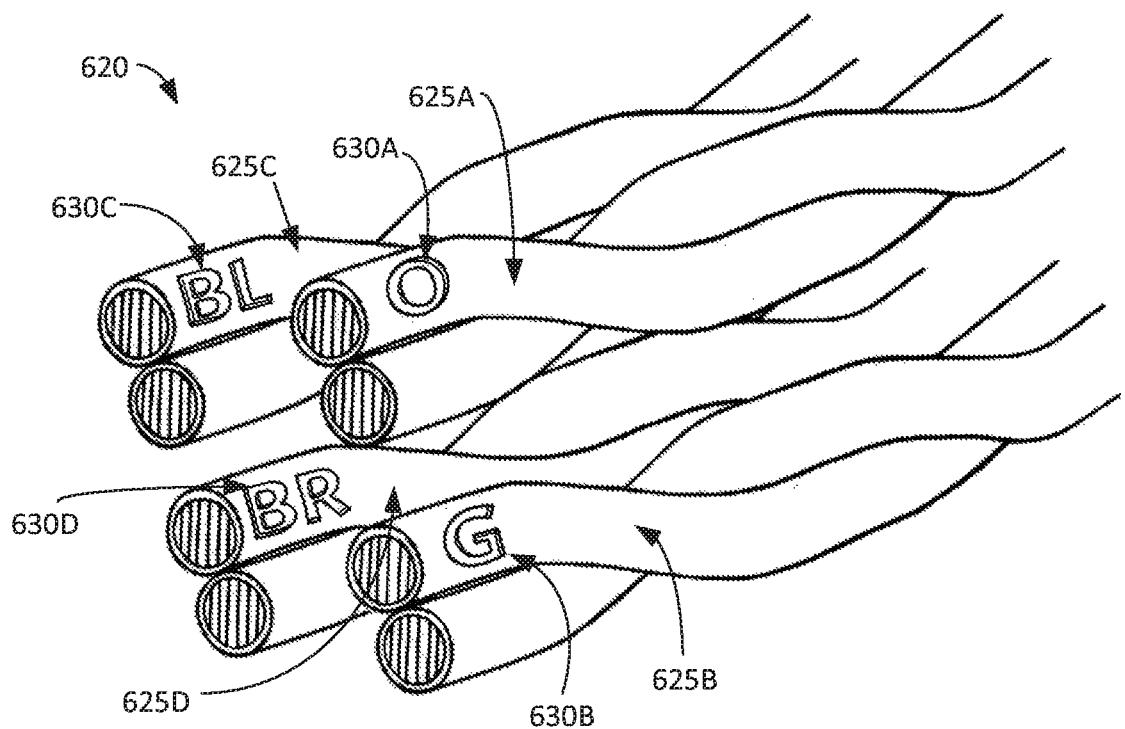

FIG. 6B illustrates a second set 620 of twisted pairs 625A-D that include indented physical indicia. Respective physical indicia 630A-D are illustrated as being formed on each of the twisted pairs 625A-D to facilitate visual and/or tactile identification of the twisted pairs 625A-D and/or the individual conductors of each twisted pair 625A-D without the use of colorant. In other embodiments, respective physical indicia may be formed on a subset of the twisted pairs 625A-D. The physical indicia 630A-D are illustrated as indented letters formed on the respective outer surfaces of the twisted pairs 625A, 625B. On each twisted pair (generally referred to as twisted pair 625), the respective physical indicia 630 may include a plurality of longitudinally spaced physical indicia formed into or on an outer surface of the insulation of at least one twisted pair conductor. In certain embodiments, the indented letters (or applicable groups of letters) may correspond to conventional colors used within twisted pair cabling. As shown, the indented letters may identify the conventional "orange", "green", "blue", and "brown" pairs. Other letters, alphanumeric characters, sets of alphanumeric characters, and/or symbols (e.g., shapes as illustrated in FIG. 8D), etc.) may be utilized as desired in other embodiments. Additionally, as described in greater detail above, a wide variety of suitable techniques may be utilized to identify individual twisted pair conductors in the event that lettering or other indented physical indicia are not formed on each of the twisted pairs.

Figure 6C:
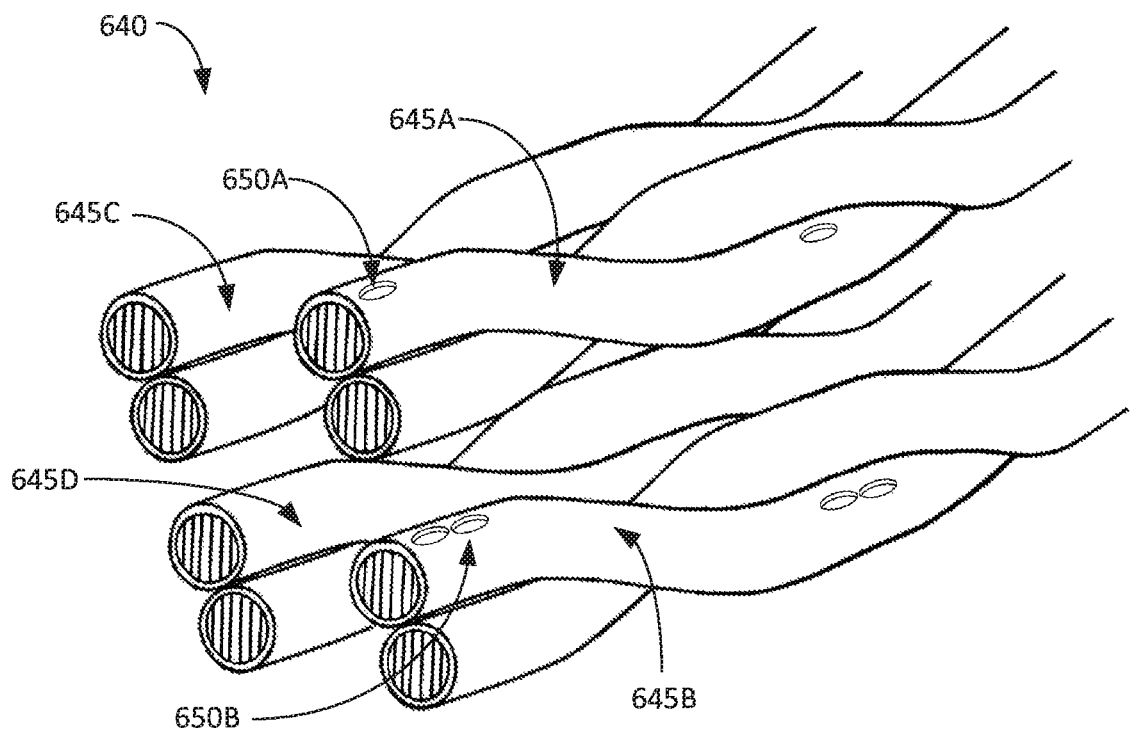

FIG. 6C illustrates a third set 640 of twisted pairs 645A-D that include indented physical indicia. Respective physical indicia (e.g., physical indicia 650A, 650B, etc.) may be formed on all or a subset of the twisted pairs 645A-D to facilitate visual and/or tactile identification of the twisted pairs 645A-D without the use of colorant. The physical indicia 650A, 650B are illustrated as divots, dimples, or other suitable indentions formed on the respective outer surfaces of two twisted pairs 645A, 645B. On each twisted pair (generally referred to as twisted pair 645), the respective physical indicia may include a plurality of longitudinally spaced indented physical indicia formed on an outer surface of the insulation of at least one twisted pair conductor. As shown, different configurations of divots or dimples bumps may be utilized on different twisted pairs to facilitate identification. For example, single divots may be utilized as physical indicia 650A on a first pair 645A, and sets of double divots may be utilized as physical indicia 650B on a second pair 645B. Other numbers and/or arrangements of divots may be utilized as desired. Divots may also have any suitable shape, such as a round, oval, rectangular, or other shape. In certain embodiments, divots having different shapes may be utilized on different twisted pairs. Additionally, as described in greater detail above, a wide variety of suitable techniques may be utilized to identify the individual conductors within each of the twisted pairs 645A-D.

Figure 6D:
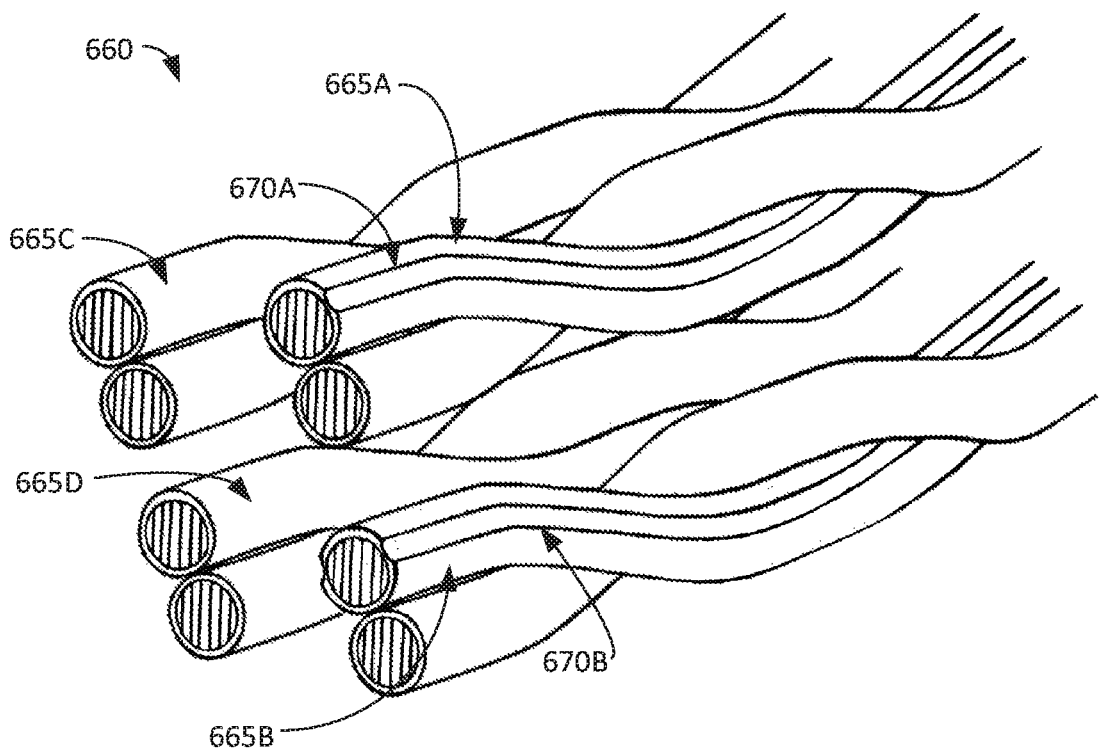

FIG. 6D illustrates a fourth set 660 of twisted pairs 665A-D that include indented physical indicia. Respective physical indicia (e.g., physical indicia 670A, 670B, etc.) may be formed on all or a subset of the twisted pairs 665A-D to facilitate visual and/or tactile identification of the twisted pairs 665A-D without the use of colorant. The physical indicia 670A, 670B are illustrated as grooves or channels formed on the respective outer surfaces of two twisted pairs 665A, 665B. As shown, different configurations of grooves may be utilized on different twisted pairs to facilitate identification. For example, a single groove may be utilized as physical indicia 670A on a first pair 665A, and two grooves (e.g., two grooves formed on opposite sides of twisted pair insulation, etc.) may be utilized as physical indicia 670B on a second pair 665B. Other numbers of grooves may be utilized as desired. As shown, in certain embodiments, one or more grooves may be formed as longitudinally continuous grooves. In other embodiments, a groove may include a plurality of longitudinally spaced sections such that the groove resembles a dotted line groove. Additionally, a groove may either extend in a parallel direction to that of the conductor on which it is formed, may spiral around a conductor, or may have any other suitable configuration. Various combinations of grooves may be utilized to identify different twisted pairs. For example, a single longitudinally continuous groove may be formed on a first pair, and a dotted line groove may be formed on a second pair. As described in greater detail above, a wide variety of suitable techniques may also be utilized to identify the individual conductors within each of the twisted pairs 665A-D.

Figure 6E:
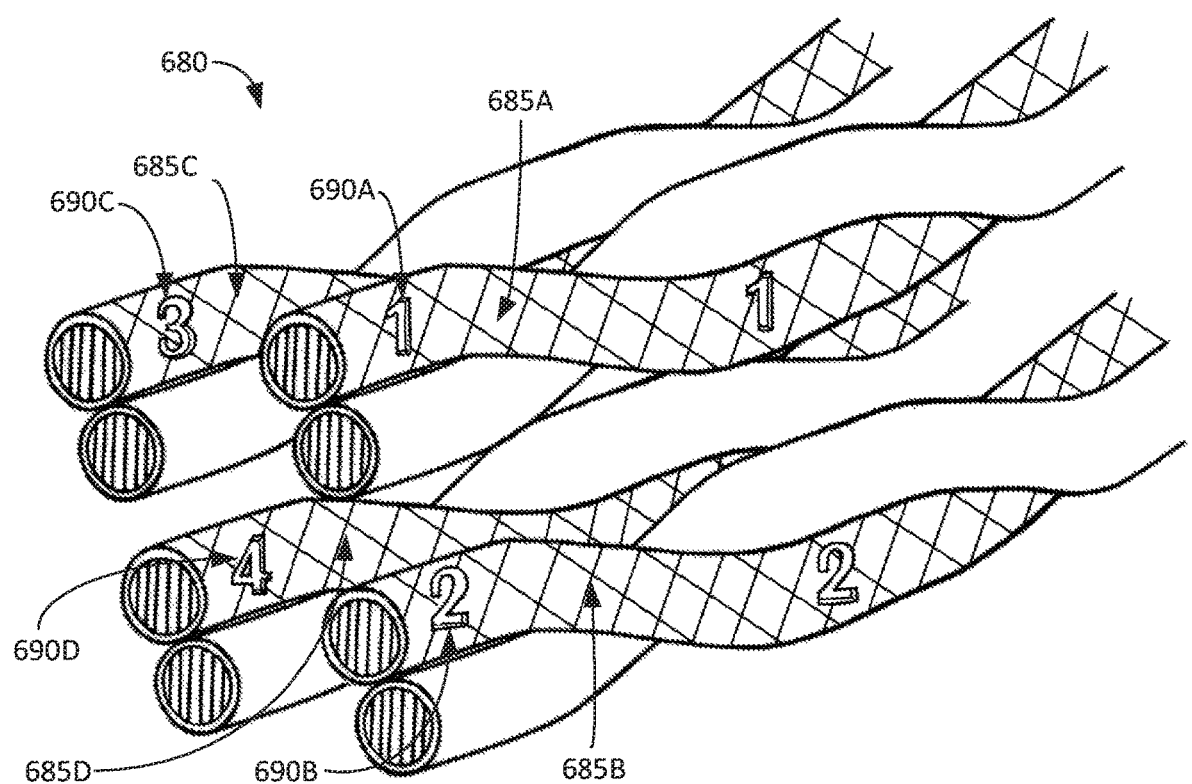

FIG. 6E illustrates a fifth set 680 of twisted pairs 685A-D that include indented physical indicia. Similar to FIG. 6A, respective physical indicia 690A-D embodied as indented numbers may be formed on any number of the twisted pairs 685A-D. While FIG. 6A illustrated indented numbers formed on two of the twisted pairs 605A, 605B, FIG. 6E illustrates respective numbers formed on each of the twisted pairs 685A-D. A wide variety of different types of indented and/or other physical indicia may also be utilized in addition to or as an alternative to numbers. Additionally, FIG. 6E illustrates the use of texturing as physical indicia in order to facilitate identification of the individual conductors within any desired number of the twisted pairs 685A-D. As explained in greater detail above with reference to FIG. 5E, a wide variety of different types and/or configurations of texturing may be utilized.

Figure 7A:
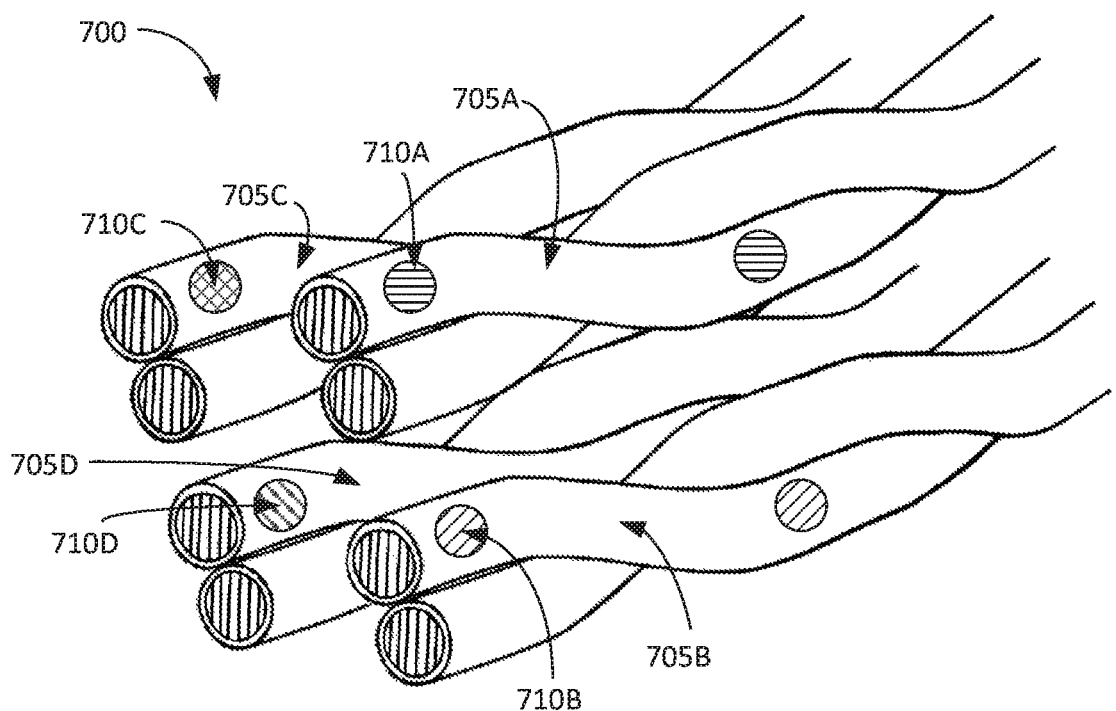
FIGS. 7A-7E are perspective views of example twisted pairs that include limited colorant with physical indicia formed from two or more colors, according to illustrative embodiments of the disclosure.

In certain embodiments, physical indicia may be formed on twisted pair insulation utilizing limited colorant. The limited colorant may include multiple colors or a single color as desired in various embodiments. FIGS. 7A-7E are perspective views of example twisted pairs that include limited colorant with physical indicia formed from two or more colors, according to illustrative embodiments of the disclosure. Turning first to FIG. 7A, a first set 700 of twisted pairs 705A-D that include multi-colored physical indicia is illustrated. Physical indicia may be formed on any number of the twisted pairs 705A-D to facilitate visual identification of the twisted pairs 705A-D. As illustrated, respective physical indicia 710A-D are formed on each of the twisted pairs 705A-D. The physical indicia 710A-D may be relatively small sections or areas of different colors. Any suitable colors can be utilized as desired. As shown, blue physical indicia 710A may be formed on a first pair 705A; brown physical indicia 710B may be formed on a second pair 705B, orange physical indicia 710C may be formed on a third pair 705C, and green physical indicia 710D may be formed on a fourth pair 705D. Additionally, on each twisted pair (generally referred to as twisted pair 705), the respective physical indicia (generally referred to as physical indicia 710) may be formed at a plurality of longitudinally spaced locations. A wide variety of suitable gaps or spaces may be positioned between longitudinally spaced physical indicia. Additionally, each physical indicia 710 may be formed with a wide variety of suitable dimensions, such as any suitable cross-sectional shape (e.g., circular, elliptical, rectangular, etc.), diameter, longitudinal length, cross-sectional size, etc. In other embodiments, the physical indicia 710 may be formed as longitudinally spaced rings or bands with each ring spanning around a portion or all of the circumference of a conductor. Other suitable physical indicia may be utilized as desired, such as alphanumeric characters, symbols, shapes, etc.

In certain embodiments, the physical indicia 710A-D may further facilitate identification of the individual conductors within each twisted pair 705A-D. For example, the physical indicia 710A-D may be formed on either the conventional colored or the conventional white (or striped) conductors of each twisted pair 705A-D. In other embodiments, different physical indicia (e.g., limited color physical indicia, surface variations, etc.) may be formed on each of the individual conductors within one or more of the twisted pairs 705A-D. As described in greater detail above with respect to FIGS. 5A-5E, a wide variety of other suitable techniques (e.g., texturing, different polymeric materials, etc.) may be utilized to identify the individual conductors within each of the twisted pairs 705A-D.

Figure 7B:
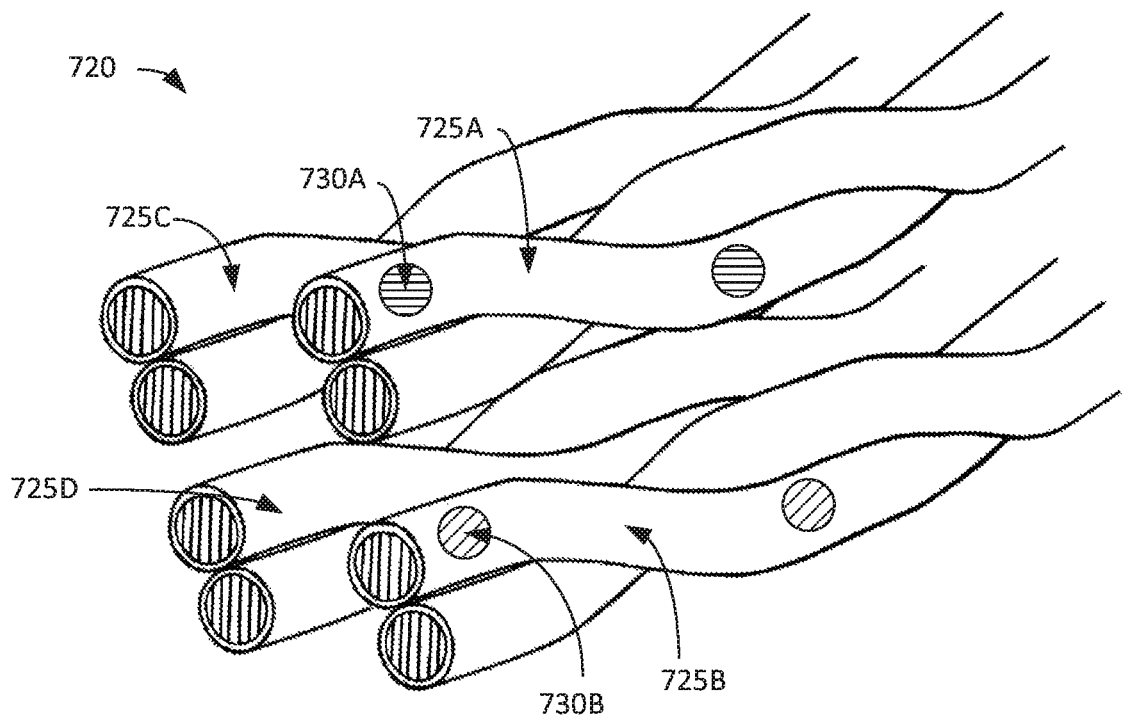
Figure 7C:
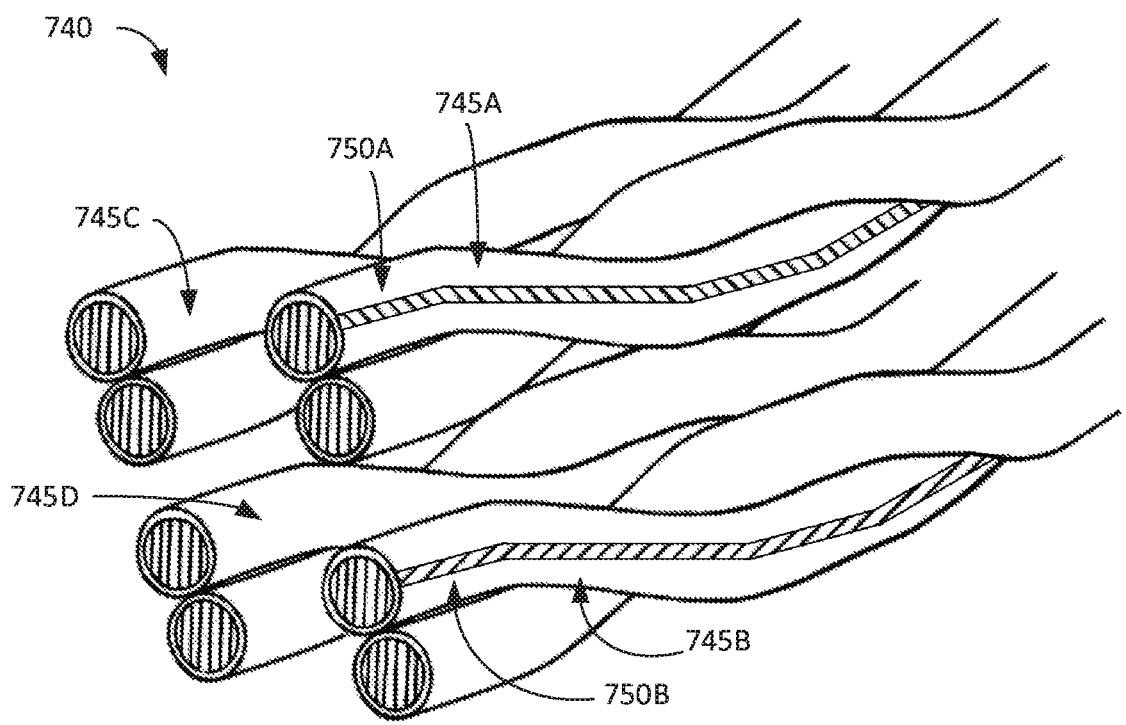
Figure 7D:
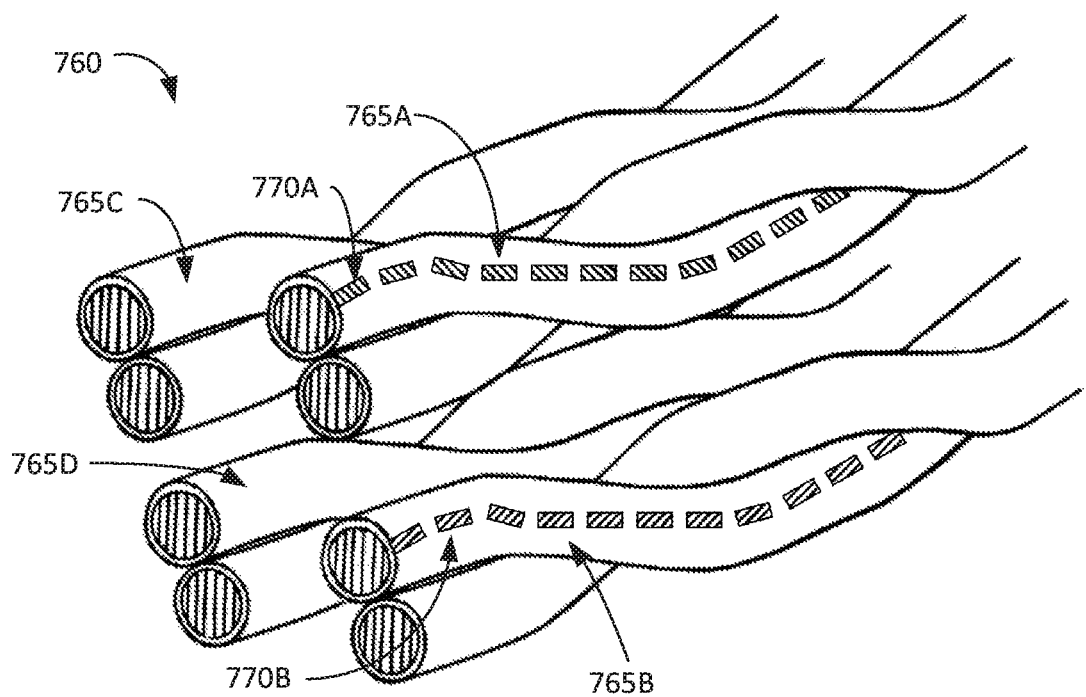

FIG. 7B illustrates a second set 720 of twisted pairs 725A-D that include multi-colored physical indicia. In contrast to FIG. 7A, FIG. 7B illustrates the formation of respective physical indicia 730A, 730B on a subset of the twisted pairs 725A, 725B. The physical indicia 730A, 730B may be relatively small sections or areas of different colors similar to the physical indicia 710A-D illustrated in FIG. 7A. FIG. 7C illustrates a third set 740 of twisted pairs 745A-D that include multi-colored physical indicia. The physical indicia 750A, 750B may be formed as different colored stripes on respective twisted pairs 745A, 745B to facilitate identification of the twisted pairs 745A-D. Similarly, FIG. 7D illustrates a fourth set 760 of twisted pairs 765A-D that include different colored stripes formed as physical indicia 770A, 770B on a desired number of twisted pairs 765A, 765B. However, FIG. 7D illustrates stripes that are formed as dashed or broken lines. Indeed, a wide variety of suitable stripe patterns (e.g., solid lines, dashed lines, lines having segments with different lengths, etc.) may be utilized as desired. In other embodiments, multiple stripes may be utilized on a twisted pair. Regardless of the type and/or number of stripes utilized, the stripes formed on a conductor may occupy a relatively small surface area of the conductor's insulation, such as less than 5.0% of the surface area. As desired, a stripe may be parallel to the longitudinal length of the conductor on which it is formed or, alternatively, may spiral or twist around the conductor.

Figure 7E:
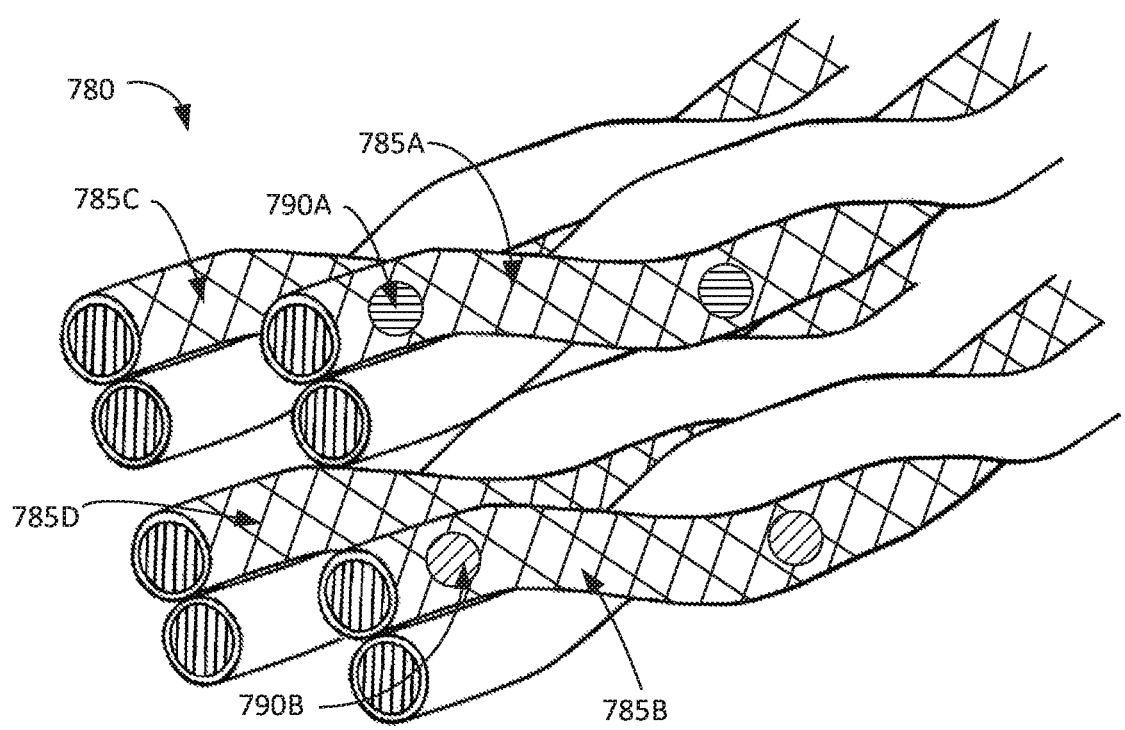

As shown in FIGS. 7C-7D, physical indicia may be formed on a subset of the twisted pairs. In other embodiments, respective physical indicia may be formed on all of the twisted pairs. In the event that physical indicia are formed on a subset of the twisted pairs, such as illustrated in FIGS. 7B-7D, a wide variety of suitable techniques (e.g., texturing, different polymeric materials, etc.) may be utilized to identify the individual conductors within each of the twisted pairs. These techniques are described in greater detail above. As one example of utilizing texturing, FIG. 7E illustrates a fifth set 780 of twisted pairs 785A-D that include multi-colored physical indicia. Similar to FIG. 7A, relatively small sections of different colors are utilized to form physical indicia 790A, 790B on a desired number of twisted pairs 785A, 785B. Additionally, texturing may be utilized to facilitate identification of the individual conductors within any number of the twisted pairs 785A-D.

Figure 8A:
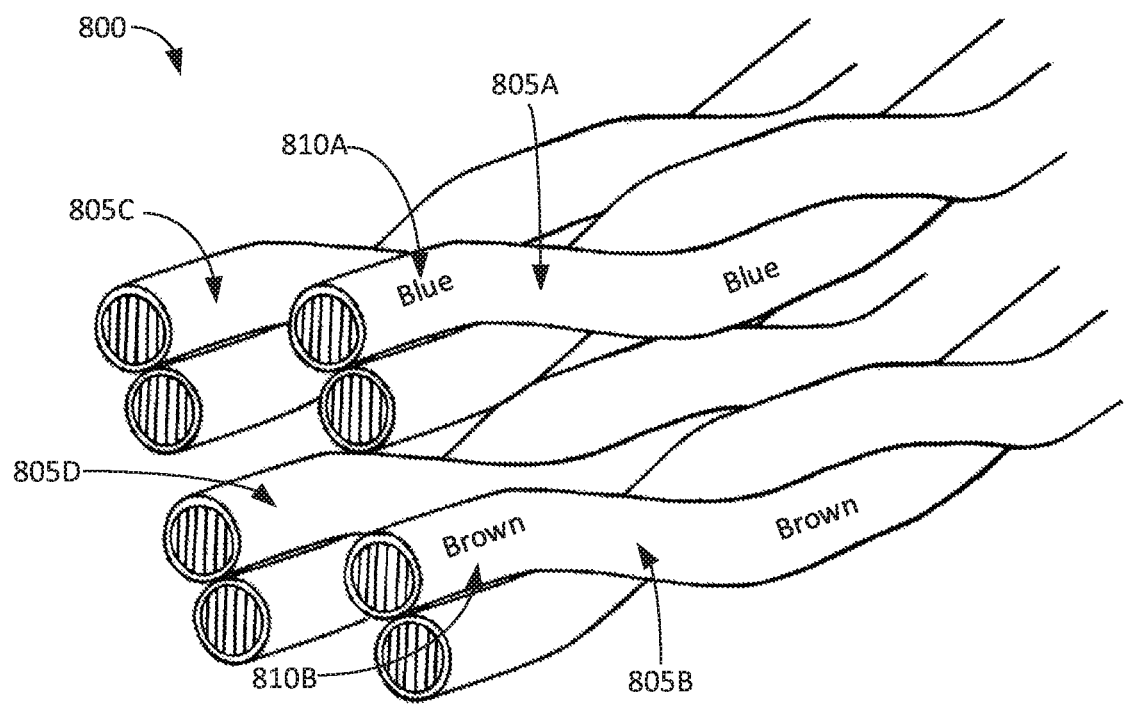
FIGS. 8A-8E are perspective views of example twisted pairs that include limited colorant with physical indicia formed from a single color, according to illustrative embodiments of the disclosure.
Figure 8B:
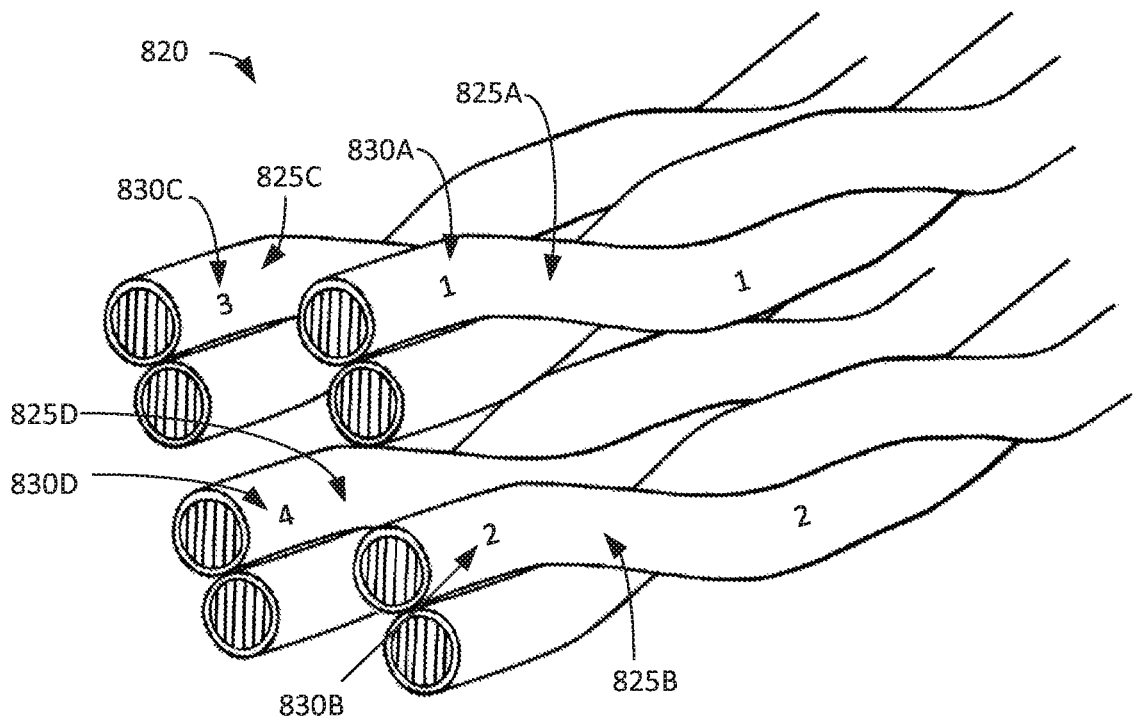
Figure 8C:
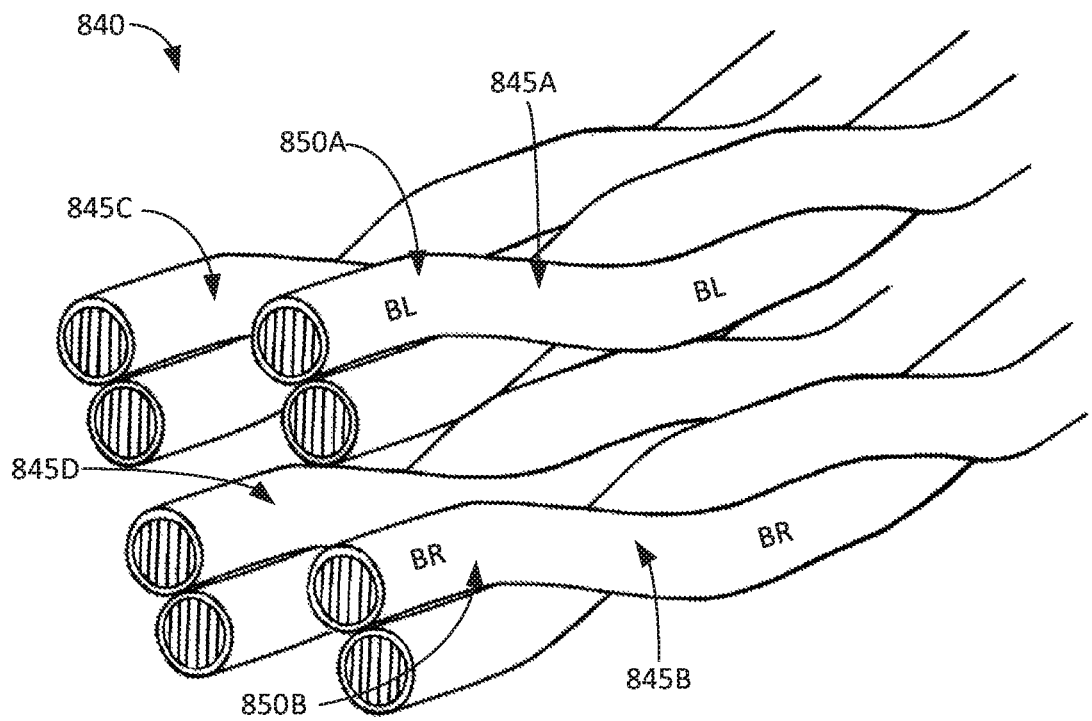
Figure 8D:
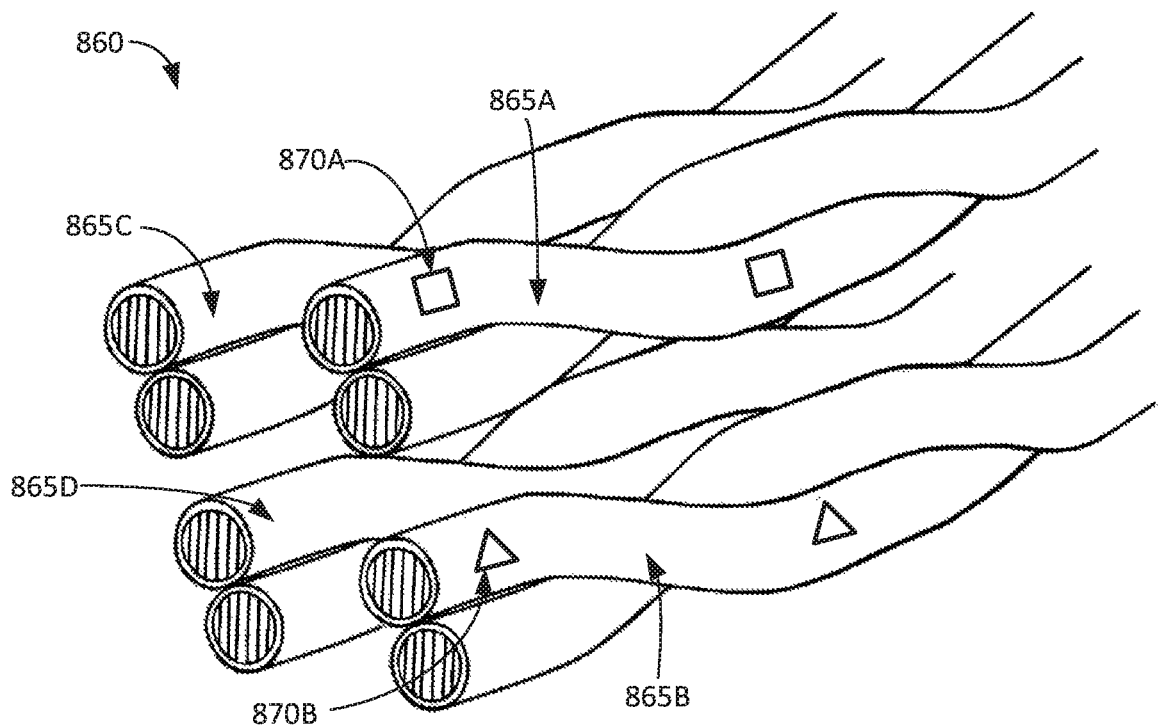
Figure 8E:
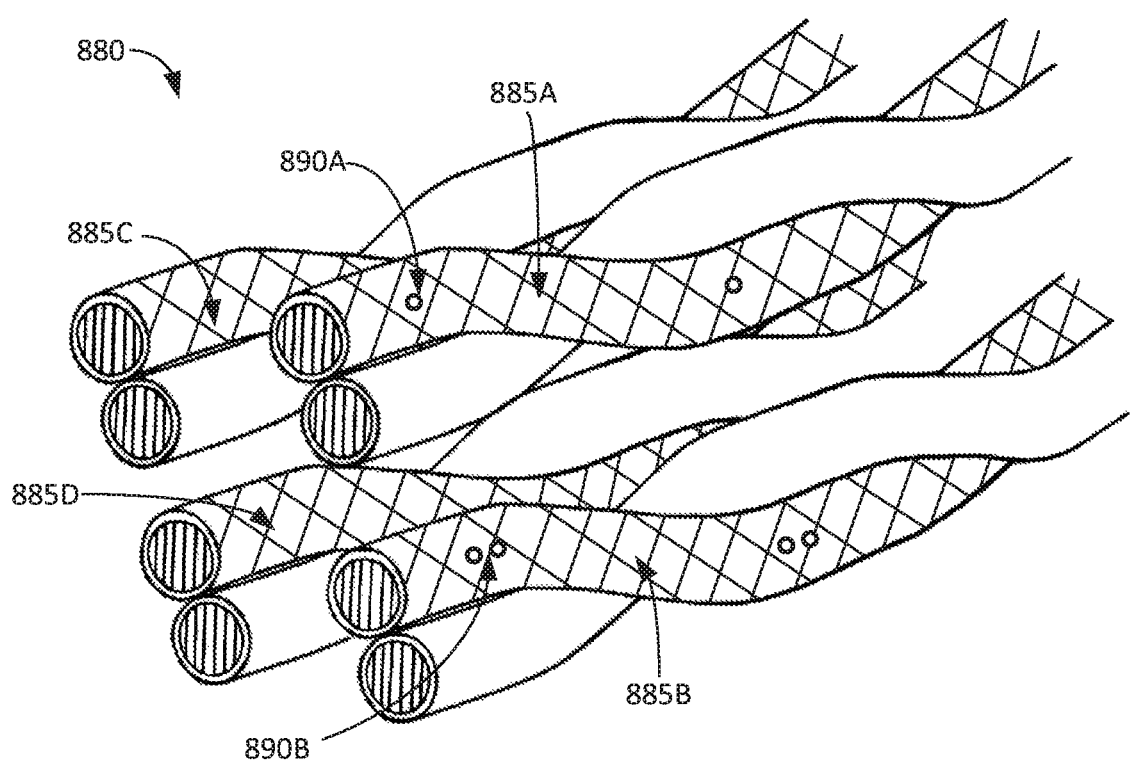

FIGS. 8A-8E are perspective views of example twisted pairs that include limited colorant with physical indicia formed from a single color, according to illustrative embodiments of the disclosure. Any single color or colorant can be utilized as desired, such as black or a colorant having the lowest environmental impact. Turning first to FIG. 8A, a first set 800 of twisted pairs 805A-D that include single colored physical indicia 810A, 810B is illustrated. The physical indicia 810A, 810 may include text that identifies the conventional color of a desired number of the twisted pairs 805A-D. FIG. 8B illustrates a second set 820 of twisted pairs 825A-D in which numbers are utilized as physical indicia 830A-D to identify various twisted pairs 825A-D. FIG. 8C illustrates a third set 840 of twisted pairs 845A-D in which alphanumeric characters are utilized as physical indicia 850A, 850B to identify a desired number of the twisted pairs 845A-D. For example, the characters "BL" may be utilized to identify the conventional blue pair and the characters "BR" may be utilized to identify the conventional brown pair. Any suitable alphanumeric characters, letters, words, etc. may be utilized to identify twisted pairs as desired in various embodiments. FIG. 8D illustrates a fourth set 860 of twisted pairs 865A-D in which symbols are utilized as physical indicia 870A, 870B to identify a desired number of the twisted pairs 865A-D. As shown, different shapes may be associated with different twisted pairs. A wide variety of other suitable symbols may be utilized as desired in other embodiments. FIG. 8E illustrates a fifth set 880 of twisted pairs 885A-D in which series of dots (or other shapes or symbols) are utilized as physical indicia 890A, 890B to identify a desired number of the twisted pairs 885A-D. For example, spaced sections of single dots may be utilized to identify a first pair 885A and spaced sections of double dots may be utilized to identify a second pair 885B.

A wide variety of other suitable single color or single colorant physical indicia may be utilized as desired in other embodiments. Examples of other physical indicia that may be utilized include, but are not limited to, sets of rings or bands (e.g., single bands for a first pair, double bands for a second pair, and so on.; different band patterns or designs for different pairs such as solid and dashed bands; etc.), the use of stripes (e.g., a single stripe for a first pair, double stripe for a second pair, and so on; different stripe patterns or designs for different pairs, etc.), and/or other suitable indicia formed with a single colorant. Regardless of the type of physical indicia utilized, respective physical indicia may be formed on any suitable or desired number of twisted pairs. For example, FIG. 8B illustrates a set 820 of twisted pairs 825A-D in which respective physical indicia 830A-D is formed on each twisted pair 825A-D. FIGS. 8A, 8C, and 8D illustrate the use of physical indicia on a subset of the twisted pairs. In the event that physical indicia are formed on a subset of the twisted pairs, a wide variety of suitable techniques may be utilized to facilitate identification of the individual conductors within a twisted pair. A few of these techniques (e.g., texturing, different polymeric materials, etc.) are described in greater detail above. Indeed, FIG. 8E illustrates a set 880 of twisted pairs 885A-D in which texturing is utilized to identify the individual conductors within each pair 885A-D.

In other embodiments, physical indicia may be formed on a separator that is incorporated into a cable, such as the example cable 400 illustrated in FIG. 4. Much like the example twisted pairs described above with reference to FIGS. 5A-8E, a wide variety of different types of physical indicia may be incorporated into a separator including, but not limited to, surface variations (e.g., raised portions, indented portions, texturing, etc.), physical indicia formed with limited colorant (e.g., multiple colors, a single color, etc.), and/or physical indicia formed by removing sections of a separator or a separator layer (e.g., electromagnetic or other shielding material, etc.). A few non-limiting example separators having different types of physical indicia are described in greater detail below with reference to FIGS. 9A-12E. A wide variety of other types of physical indicia may be utilized as desired.

Further, the example separators are illustrated as cross-fillers in which respective prongs extend between each adjacent set of twisted pairs in a cable. A wide variety of other suitable separator designs may be utilized as desired in other embodiments. For example, a flat separator that bisects a cable core may be utilized. As another example, a T-shaped or L-shaped, separator shape may be utilized. Indeed, any suitable separator shape may be utilized provided that physical indicia formed on an outer surface of the separator can be associated with adjacent twisted pairs to facilitate identification of the pairs.

Figure 9A:
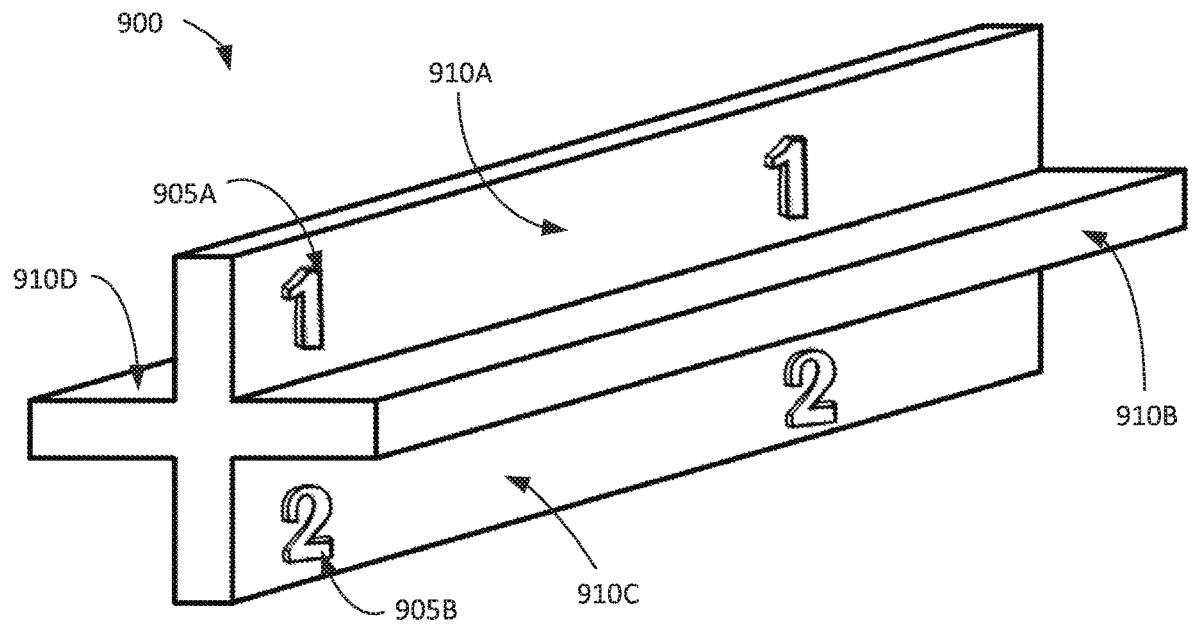
FIGS. 9A-9D are perspective views of example separators that are free of colorant and that include raised physical indicia, according to illustrative embodiments of the disclosure.

FIGS. 9A-9D are perspective views of example separators that are free of colorant and that include raised physical indicia, according to illustrative embodiments of the disclosure. FIG. 9A illustrates a first example separator 900 that includes physical indicia (e.g., physical indicia 905A, 905B, etc.) formed as raised numbers. Physical indicia may be formed on any number of fins or prongs 910A-D of the separator 900. In certain embodiments, physical indicia (generally referred to as physical indicia 905) may be formed on a prong (generally referred to as prong 910) such that the physical indicia 905 is in a channel associated with a corresponding twisted pair to be identified by the physical indicia 905. For example, if a first twisted pair is positioned in a first channel defined by a first and second prong 910A, 910B of the separator 900, then physical indicia 905A associated with the first pair may be positioned on either the first or second prong 910A, 910B such that the physical indicia 905A faces the first twisted pair. Similarly, other suitable physical indicia may be positioned on other prongs 910A-D. Additionally, the physical indicia 905A, 905B may be similar to those discussed above with reference to FIG. 5A.

Figure 9B:
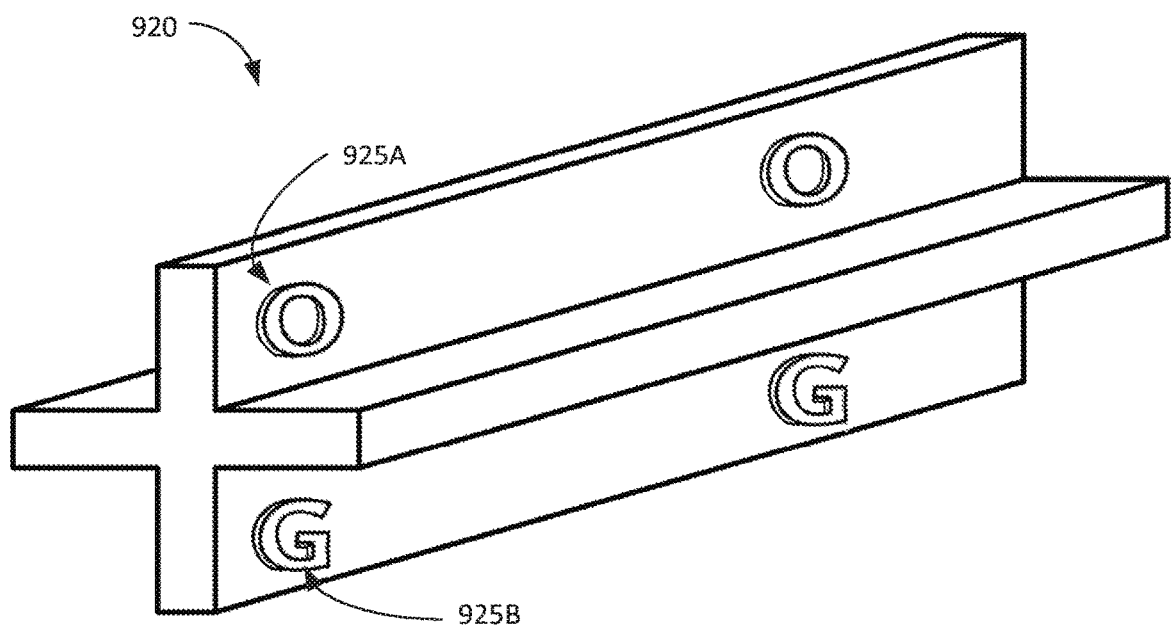
Figure 9C:
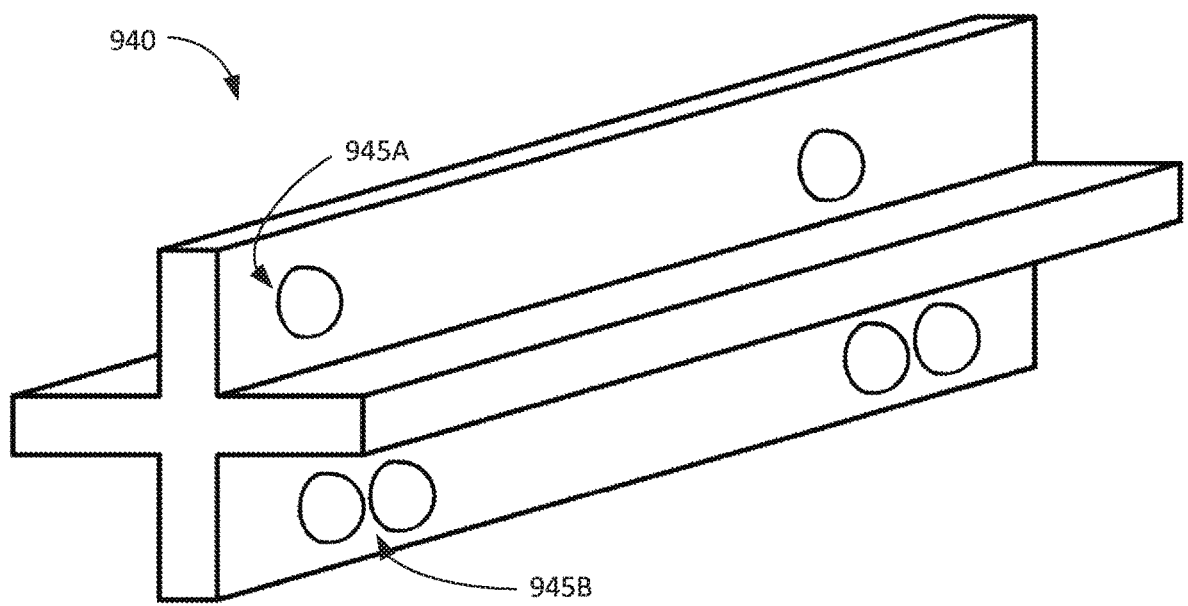
Figure 9D:
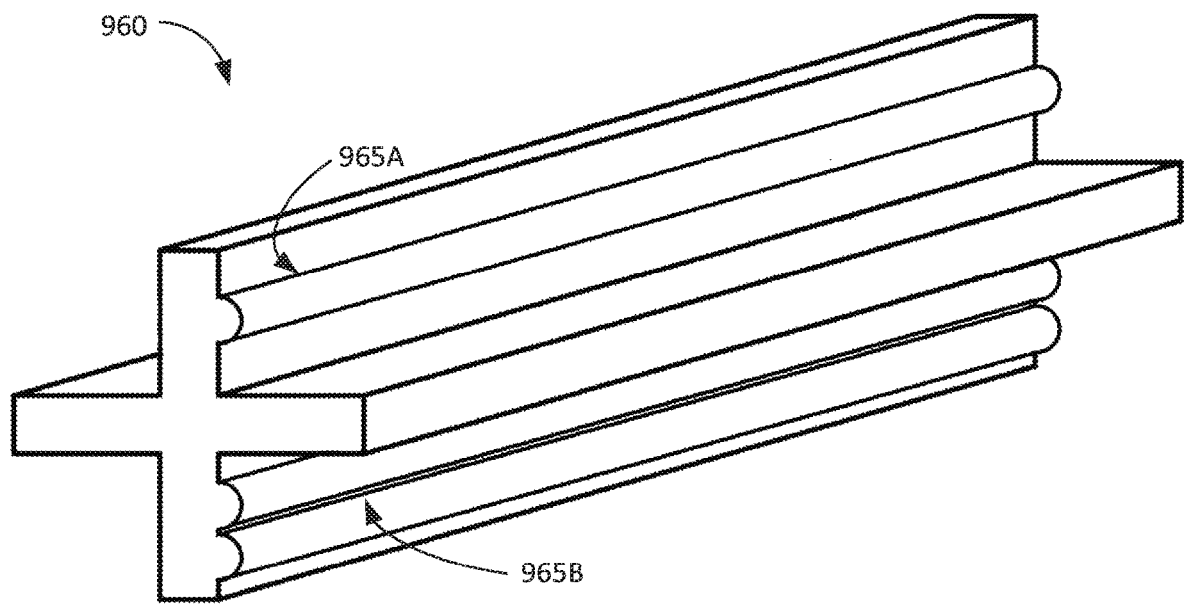

FIG. 9B illustrates a second example separator 920 that includes physical indicia (e.g., physical indicia 925A, 925B, etc.) formed as raised letters. As desired, the physical indicia 925A, 925B may correspond to conventional colors utilized in twisted pair cables, such as orange and green. Other suitable physical indicia and/or codes may be utilized as desired. FIG. 9C illustrates a third example separator 940 that includes physical indicia (e.g., physical indicia 945A, 945B, etc.) formed as raised bumps or protrusions. As desired, different numbers of protrusions (e.g., single, double, etc.) may correspond to different twisted pairs that may be positioned adjacent to the separator 940. FIG. 9D illustrates a fourth example separator 960 that includes physical indicia (e.g., physical indicia 965A, 965B, etc.) formed as ridges. As desired, different numbers of ridges (e.g., single, double, etc.) may correspond to different twisted pairs that may be positioned adjacent to the separator 960. A wide variety of suitable ridge designs may also be utilized, such as longitudinally continuous ridges, dotted or broken ridges, etc. Additionally, the physical indicia illustrated in FIGS. 9A-9D may have a wide variety of suitable dimensions and/or longitudinal spacings, such as dimensions and/or longitudinal spacings similar to those discussed above with reference to FIGS. 5A-5D.

Figure 10A:
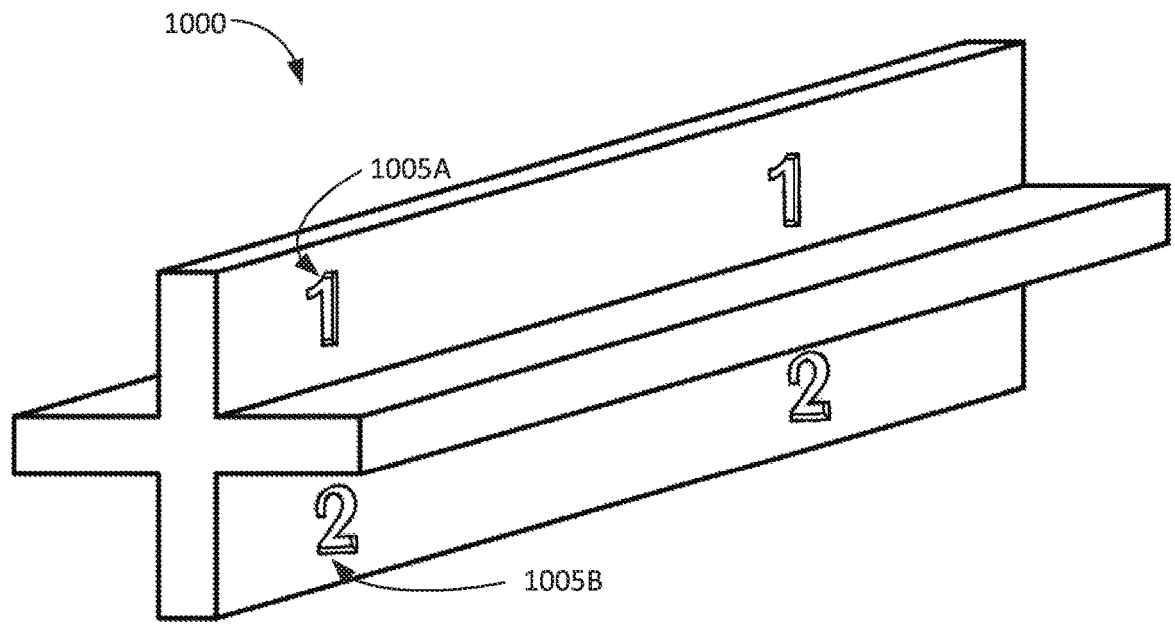
FIGS. 10A-10D are perspective views of example separators that are free of colorant and that include indented physical indicia, according to illustrative embodiments of the disclosure.
Figure 10B:
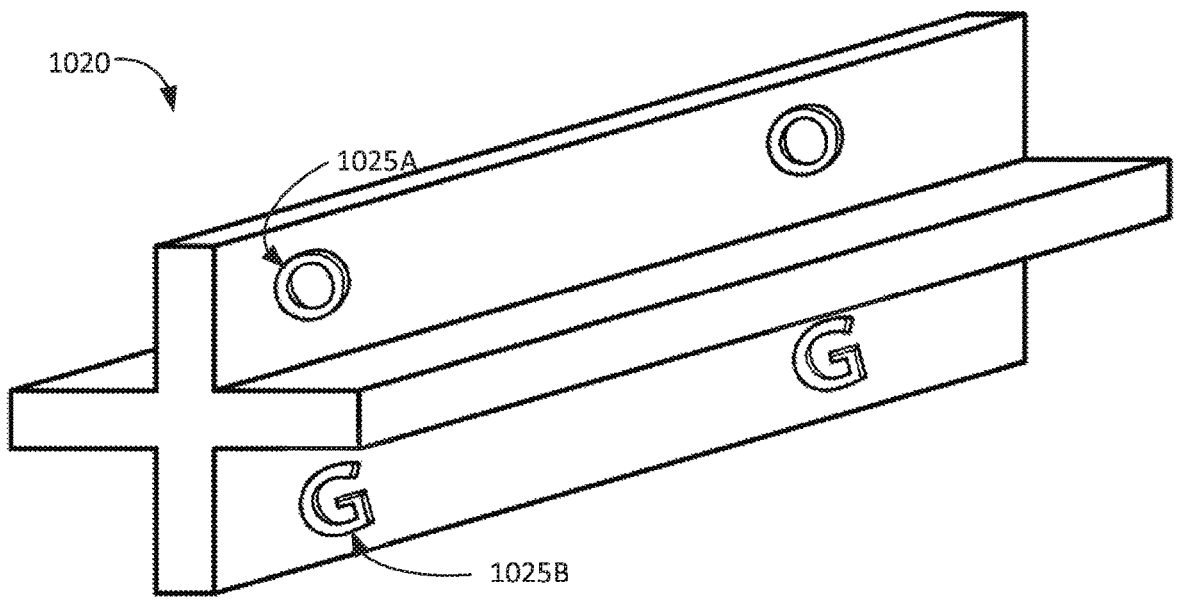
Figure 10C:
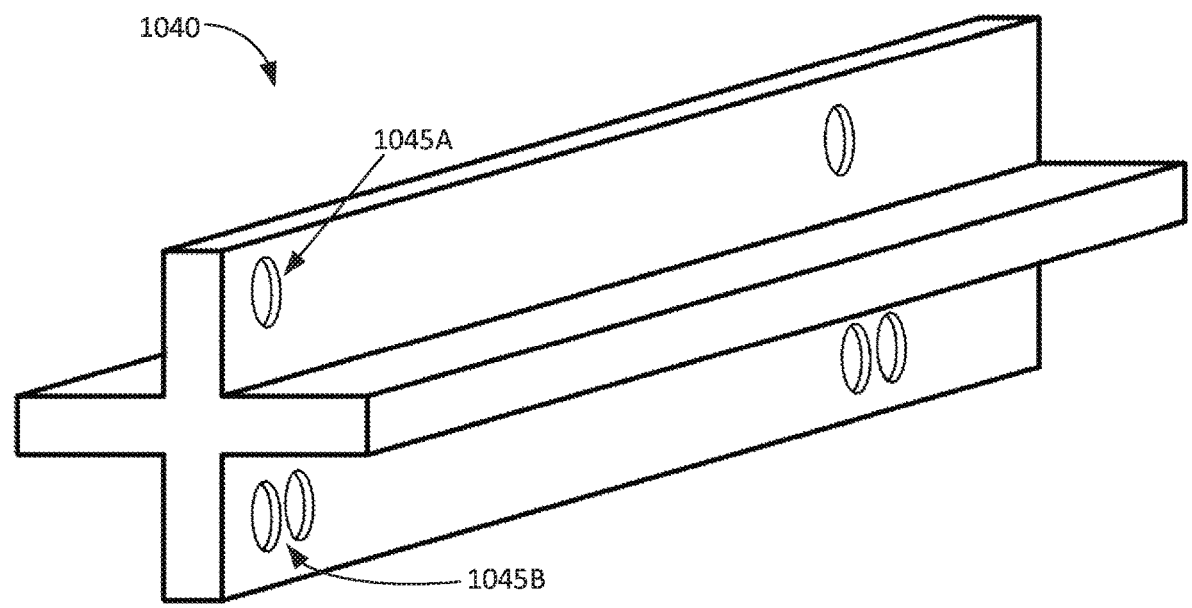
Figure 10D:
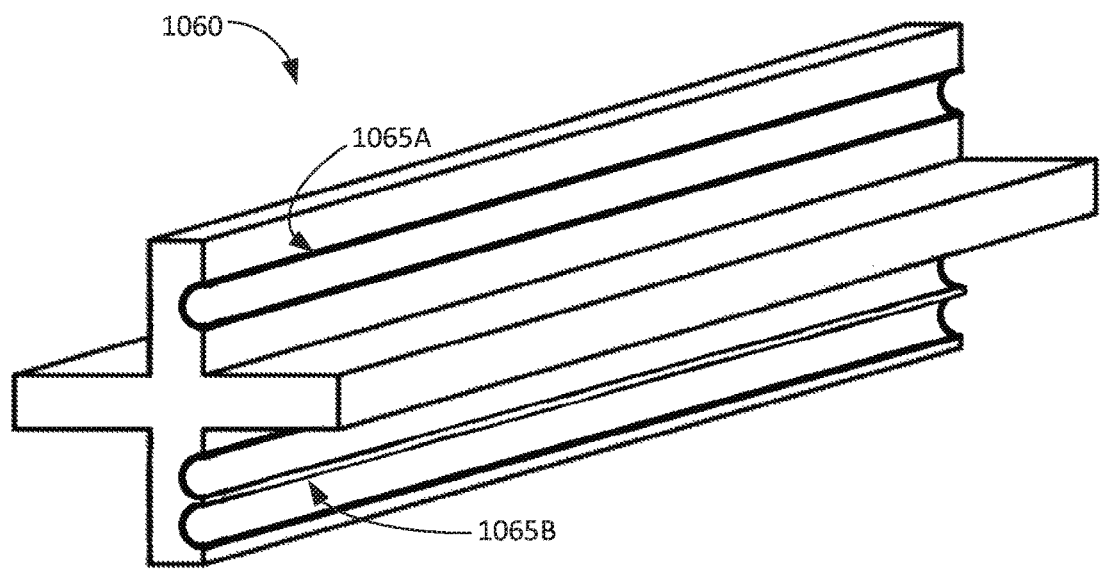

FIGS. 10A-10D are perspective views of example separators that are free of colorant and that include indented physical indicia, according to illustrative embodiments of the disclosure. FIG. 10A illustrates a first example separator 1000 that includes physical indicia (e.g., physical indicia 1005A, 1005B, etc.) formed as indented numbers. Physical indicia may be formed on any number of fins or prongs of the separator as explained in greater detail above with reference to FIG. 9A. FIG. 10B illustrates a second example separator 1020 that includes physical indicia (e.g., physical indicia 1025A, 1025B, etc.) formed as indented letters. As desired, the physical indicia 1025A, 1025B may correspond to conventional colors utilized in twisted pair cables, such as orange and green. Other suitable physical indicia and/or codes may be utilized as desired. FIG. 10C illustrates a third example separator 1040 that includes physical indicia (e.g., physical indicia 1045A, 1045B, etc.) formed as dimples, divots, or other indentions. As desired, different numbers of divots (e.g., single, double, etc.) may correspond to different twisted pairs that may be positioned adjacent to the separator 1040. FIG. 10D illustrates a fourth example separator 1060 that includes physical indicia (e.g., physical indicia 1065A, 1065B, etc.) formed as grooves or channels. As desired, different numbers of grooves (e.g., single, double, etc.) may correspond to different twisted pairs that may be positioned adjacent to the separator 1060. A wide variety of suitable groove designs may also be utilized, such as longitudinally continuous grooves, dotted or broken grooves, etc. Additionally, the physical indicia illustrated in FIGS. 10A-10D may have a wide variety of suitable dimensions and/or longitudinal spacings, such as dimensions and/or longitudinal spacings similar to those discussed above with reference to FIGS. 6A-6D.

Figure 11A:
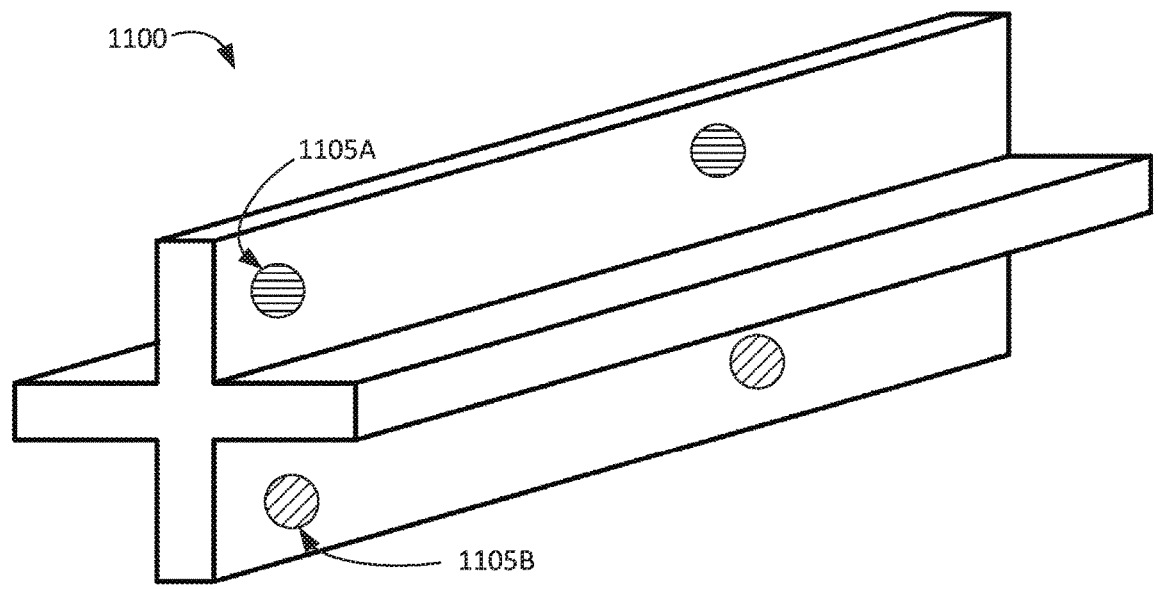
FIGS. 11A-11C are perspective views of example separators that include limited colorant with physical indicia formed from two or more colors, according to illustrative embodiments of the disclosure.
Figure 11B:
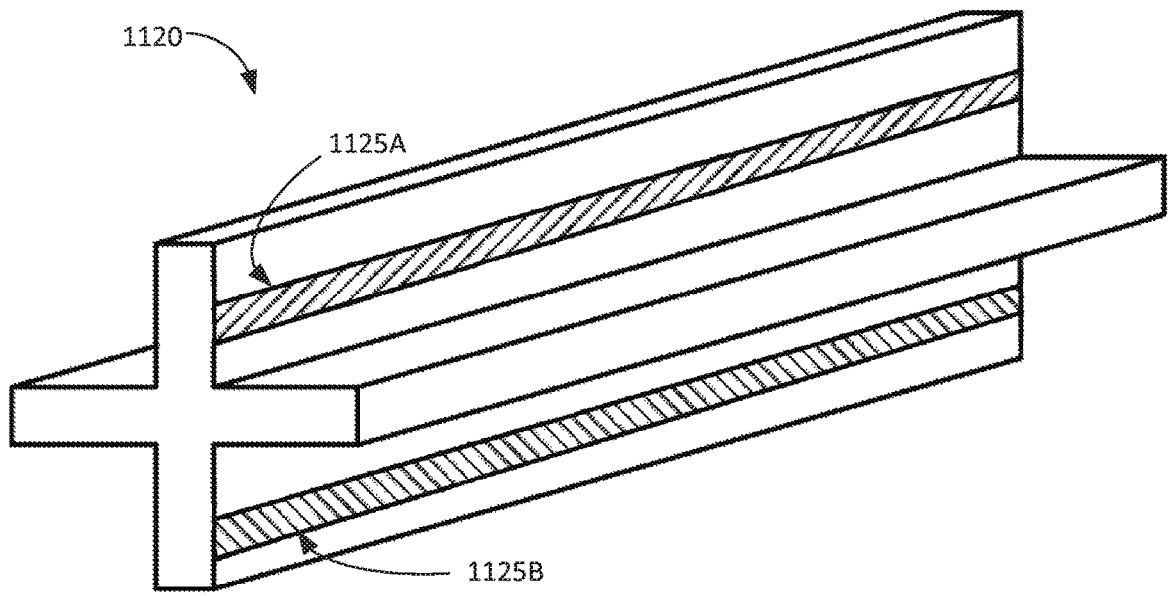
Figure 11C:
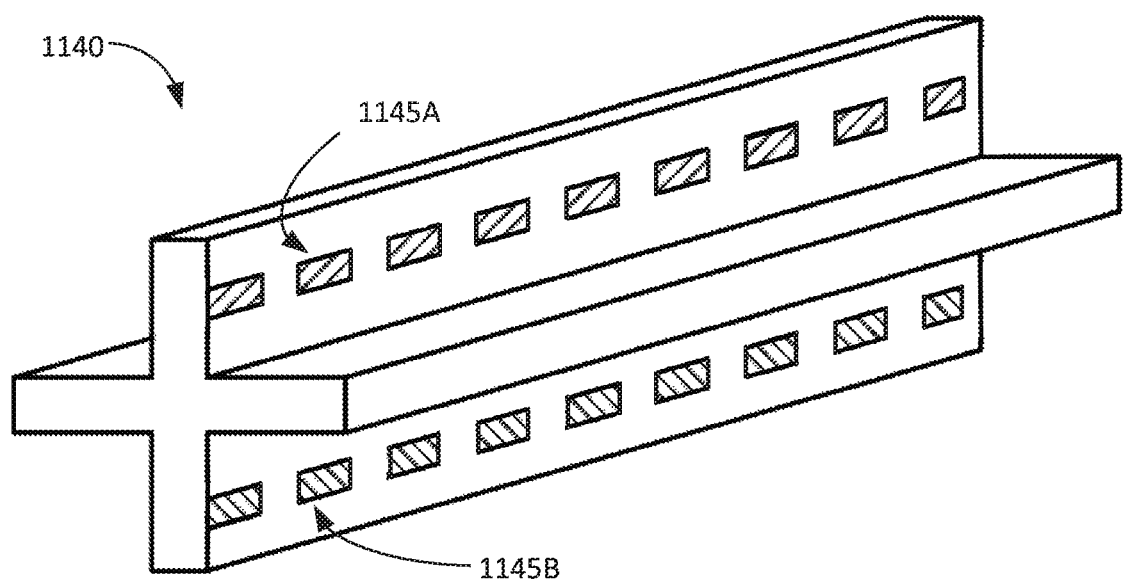

FIGS. 11A-11C are perspective views of example separators that include limited colorant with physical indicia formed from two or more colors, according to illustrative embodiments of the disclosure. FIG. 11A illustrates a first example separator 1100 that includes physical indicia (e.g., physical indicia 1105A, 1105B, etc.) formed as longitudinally spaced sections (e.g., dots, etc.) of colorant. As desired, different colors may be associated with different twisted pairs. FIG. 11B illustrates a second example separator 1120 that includes physical indicia (e.g., physical indicia 1125A, 1125B, etc.) formed as lines. As desired, different colors of lines may be associated with different twisted pairs. Additionally, lines may be formed with a wide variety of suitable patterns (e.g., solid, broken, etc.) and/or dimensions. For example, FIG. 11C illustrates a third example separator 1140 that includes physical indicia (e.g., physical indicia 1145A, 1145B, etc.) formed as broken or dashed lines. Similar to the separator 1120 of FIG. 11B, different colors of lines may be associated with different twisted pairs. A wide variety of other suitable physical indicia may be formed from two or more colors in other embodiments including, but not limited to, alphanumeric characters, symbols, shapes, etc.

Figure 12A:
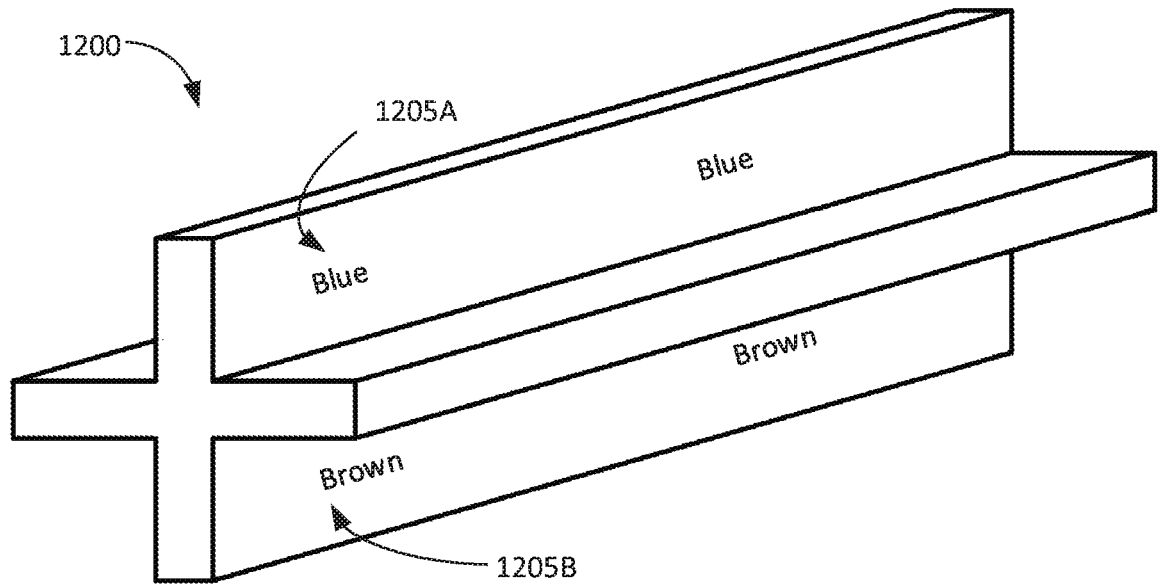
FIGS. 12A-12E are perspective views of example separators that include limited colorant with physical indicia formed from a single color, according to illustrative embodiments of the disclosure.
Figure 12B:
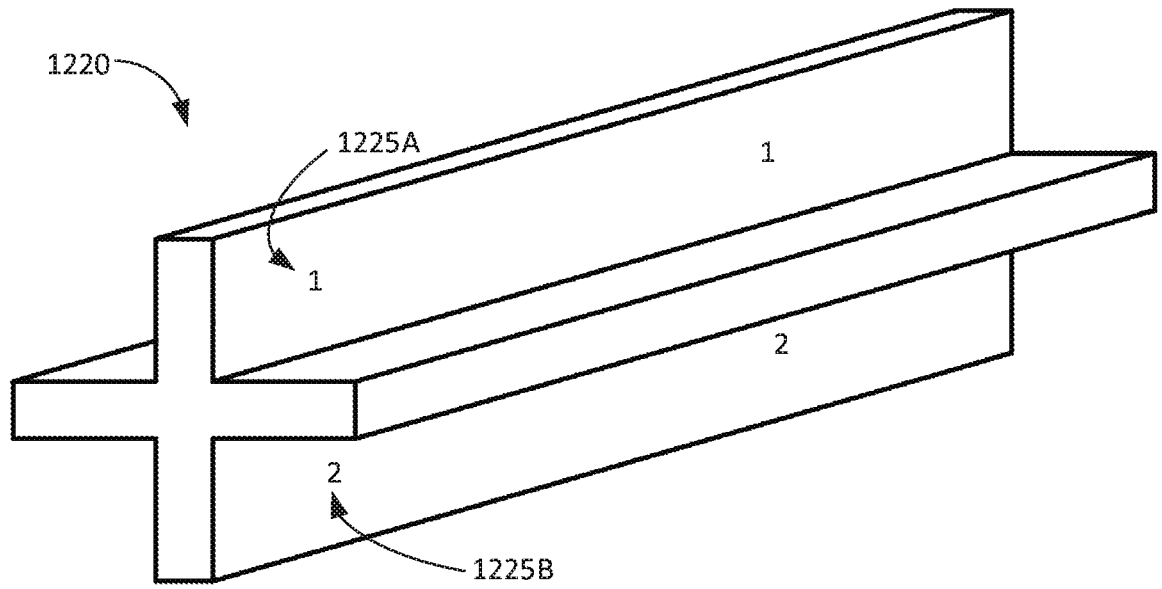
Figure 12C:
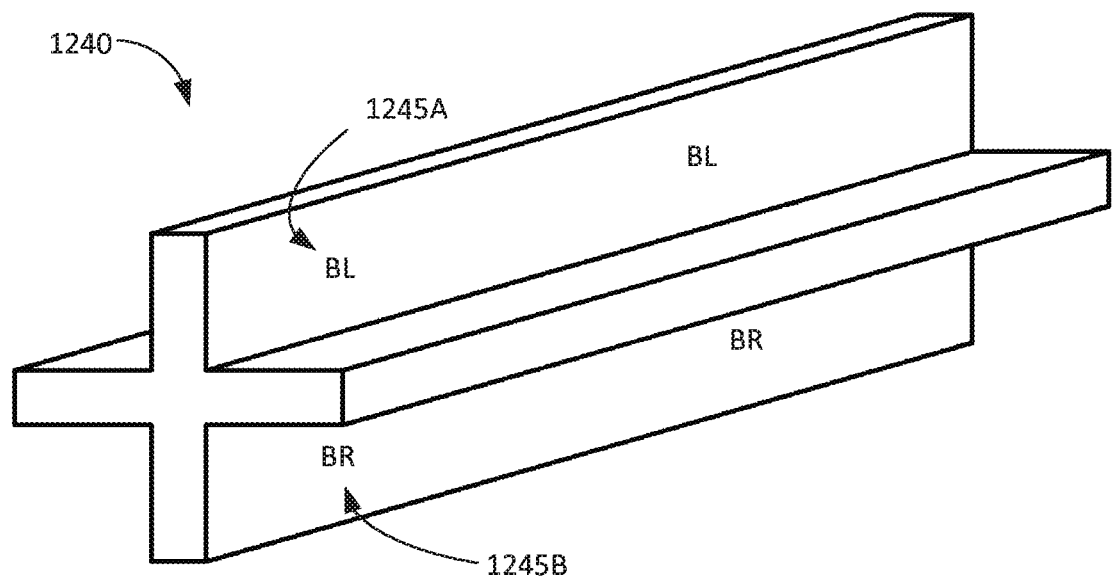
Figure 12D:
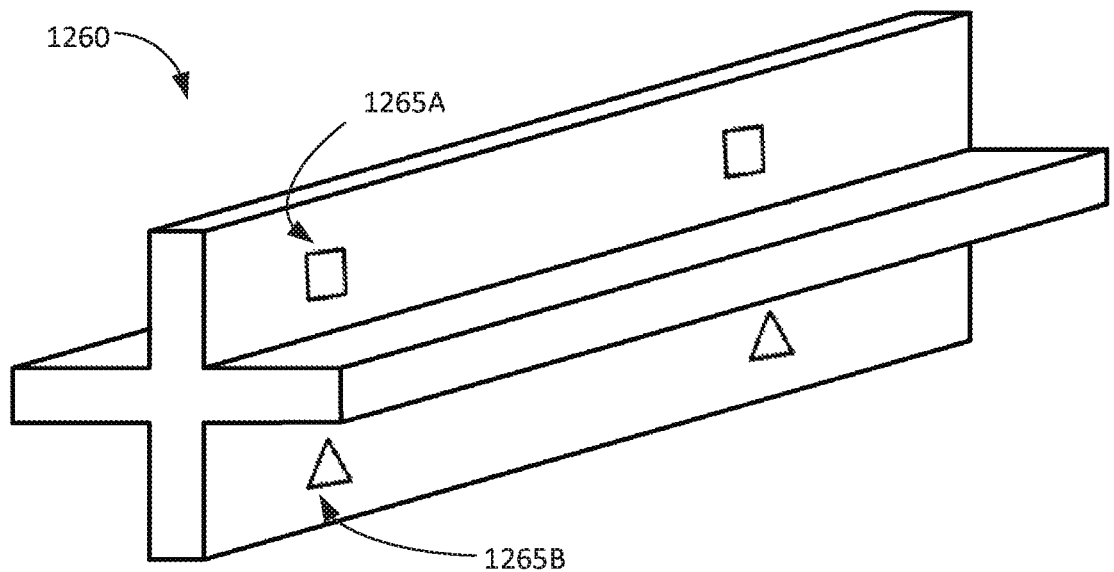
Figure 12E:
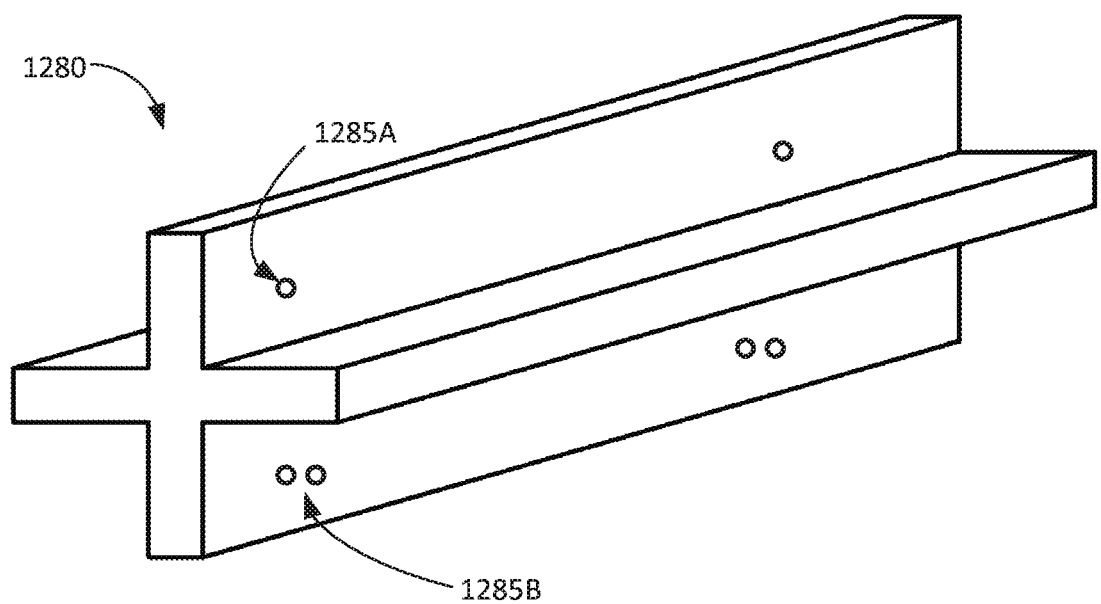

FIGS. 12A-12E are perspective views of example separators that include limited colorant with physical indicia formed from a single color, according to illustrative embodiments of the disclosure. In various embodiments, the single colorant utilized may be black or any other desired colorant, such as a colorant with the relatively lowest environmental impact. FIG. 12A illustrates a first example separator 1200 that includes physical indicia (e.g., physical indicia 1205A, 1205B, etc.) formed as words that identify various twisted pairs, such as words that identify a conventional color for a twisted pair (e.g., blue, brown, etc.). FIG. 12B illustrates a second example separator 1220 that includes physical indicia (e.g., physical indicia 1225A, 1225B, etc.) formed as numbers corresponding to associated twisted pairs. FIG. 12C illustrates a third example separator 1240 that includes physical indicia (e.g., physical indicia 1245A, 1245B, etc.) formed as alphanumeric characters corresponding to associated twisted pairs. For example, "BL" (or similarly "Bl") can be utilized to identify a conventional blue pair and "BR" (or similarly "Br") can be utilized to identify a conventional brown pair. A wide variety of other suitable letters, numbers, and/or alphanumeric characters can be utilized as desired. FIG. 12D illustrates a fourth example separator 1260 that includes physical indicia (e.g., physical indicia 1265A, 1265B, etc.) formed as symbols corresponding to associated twisted pairs. Although shapes (e.g., squares, triangles, etc.) are illustrated in FIG. 12D, a wide variety of other suitable symbols may be utilized. FIG. 12E illustrates a fifth example separator 1280 that includes physical indicia (e.g., physical indicia 1285A, 1285B, etc.) formed as sections of dots corresponding to associated twisted pairs. For example, spaced sections of single dots may be utilized to identify a first pair and spaced sections of double dots may be utilized to identify a second pair. A wide variety of other suitable single color or single colorant physical indicia may be utilized as desired in other embodiments. Examples of other physical indicia that may be utilized include, but are not limited to, sets of spaced lines or markers formed on one or more prongs of a separator in a circumferential direction perpendicular to a longitudinal direction (single lines for a first pair, double lines for a second pair, and so on.; different line patterns or designs for different pairs such as solid and dashed bands; etc.), the use of longitudinal stripes (e.g., a single stripe for a first pair, double stripe for a second pair, and so on; different stripe patterns or designs for different pairs, etc.), and/or other suitable indicia formed with a single colorant. Additionally, in certain embodiments, the colorant formed on a separator of FIGS. 11A-12E and/or any prongs of a separator may occupy less than a given amount of the outer surface area of a separator or prong. For example, the colorant may occupy less than approximately 5.0% (or another desired value) of the outer surface area of a separator or prong on which colorant is formed.

Physical indicia may be formed at any suitable locations along an outer surface of a separator. With example cross-fillers, physical indicia may be formed on any suitable number of prongs or fins of the separator. For example, physical indicia may be formed on prongs such that the physical indicia face corresponding twisted pairs. With separators having other cross-sectional shapes, physical indicia may be formed on any suitable surfaces or portions of a separator such that the physical indicia can be associated with corresponding or associated twisted pairs. Additionally, certain physical indicia may be longitudinally continuous along a separator. Other physical indicia may be formed with a plurality of longitudinally spaced sections (e.g., spaced alphanumeric characters, etc.) along a length of a separator. A wide variety of suitable spacings or gaps may be utilized between longitudinally spaced sections. Additionally, spaced sections may be arranged in accordance with a wide variety of suitable patterns or in a random or pseudo-random fashion. Physical indicia may also be formed with a wide variety of suitable dimensions. Examples of suitable spacings and/or dimensions (e.g., longitudinal lengths, diameters, etc.) are described in greater detail above with reference to FIGS. 5A-8E and are equally applicable to physical indicia formed on separators.

Any number of suitable physical indicia may be formed on a separator as desired in various embodiments in order to facilitate visual and/or tactile identification of twisted pairs. In certain embodiment, respective physical indicia associated with each of a plurality of twisted pair may formed on a separator. In other embodiments, respective physical indicia may be formed for a subset of a plurality of twisted pairs (e.g., two or three pairs in a four pair cable, etc.). The physical indicia may be utilized to identify a desired number of twisted pairs and orientation of the pairs relative to one another, thereby facilitating identification of each of the twisted pairs.

The physical indicia described above with respect to FIGS. 9A-12E are provided by way of non-limiting example only. A wide variety of other suitable physical indicia may be incorporated into a separator as desired. For example, texturing (e.g., different textures formed on different separator prongs, different texturing patters, etc.) may be formed on separator prongs to identify twisted pairs. As another example, cut out portions or removed portions may be formed through one or more separator sections or through one or more layers of a separator (e.g., electrically conductive or other shielding material, etc.) in order to identify twisted pairs. FIG. 16 discussed in greater detail below illustrates an example separator having electrically conductive material (e.g., discontinuous patches of electrically conductive material, longitudinally continuous material, etc.) that forms a shielding function. As desired, portions of the electrically conductive material may be selectively removed, cut out, or not formed in order to serve as physical indicia that facilitates twisted pair identification. A wide variety of different types of removed portions may be formed as desired, such as any of the example removed portions described in greater detail below with reference to shield layers. In a similar manner, removed or cut out portions may be formed through sections of the separator, such as prongs or fins of the separator.

As set forth above, physical indicia formed on a separator may facilitate identification of twisted pairs within a cable. As desired, the physical indicia formed on a separator may be combined with any suitable techniques to facilitate identification of the individual conductors within one or more twisted pairs. For example, certain conductors within one or more twisted pairs may be textured in order to identify those conductors (e.g., identify the conductors as conventional colored or white/striped conductors, etc.). As another example, the individual conductors in a twisted pair may be insulated with different polymeric materials (e.g., two different polymers, different grades of the same polymer, etc.) to facilitate identification of individual conductors. As another example, first physical indicia may be formed on a separator and second physical indicia may be formed on one or more twisted pairs and/or other cable components (e.g., dielectric separators, etc.). These example individual conductor identification techniques are described in greater detail above.

Figure 13A:
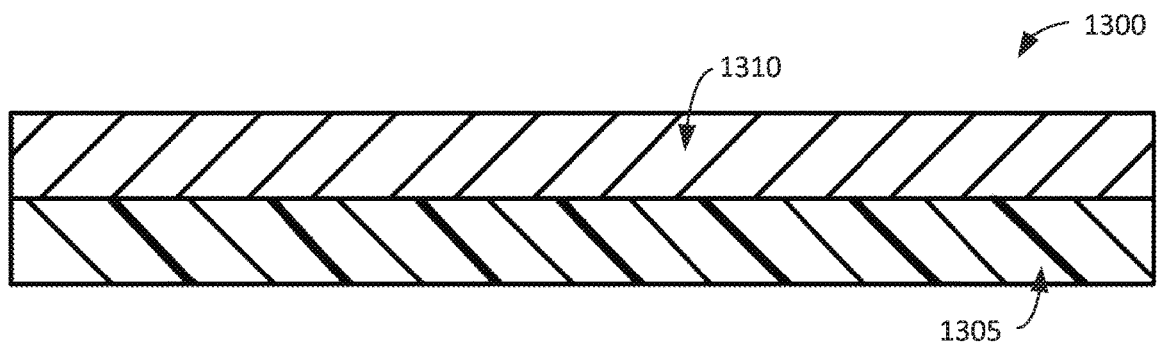
FIGS. 13A-13C illustrate example constructions that may be utilized for one or more shield layers incorporated into a twisted pair cable, according to illustrative embodiments of the disclosure.
Figure 13B:
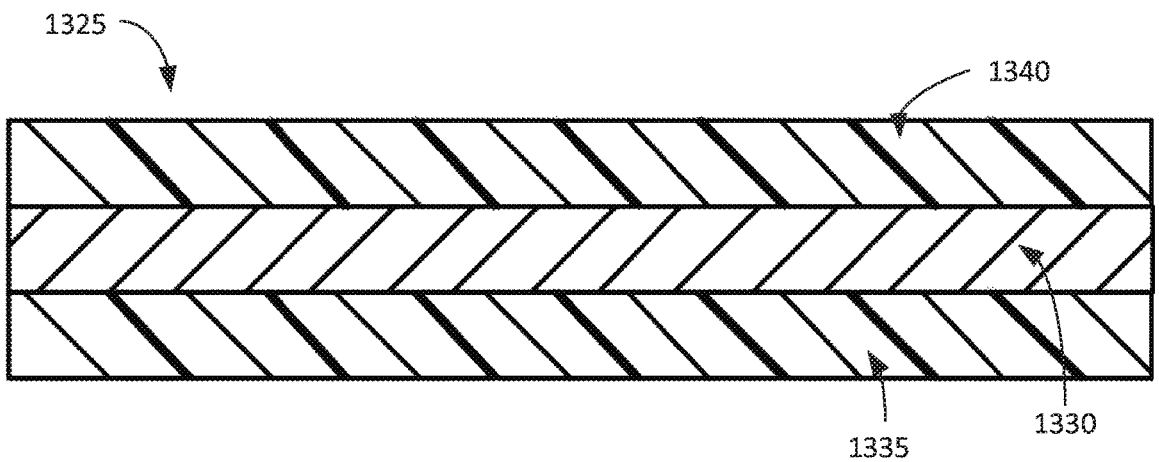
Figure 13C:
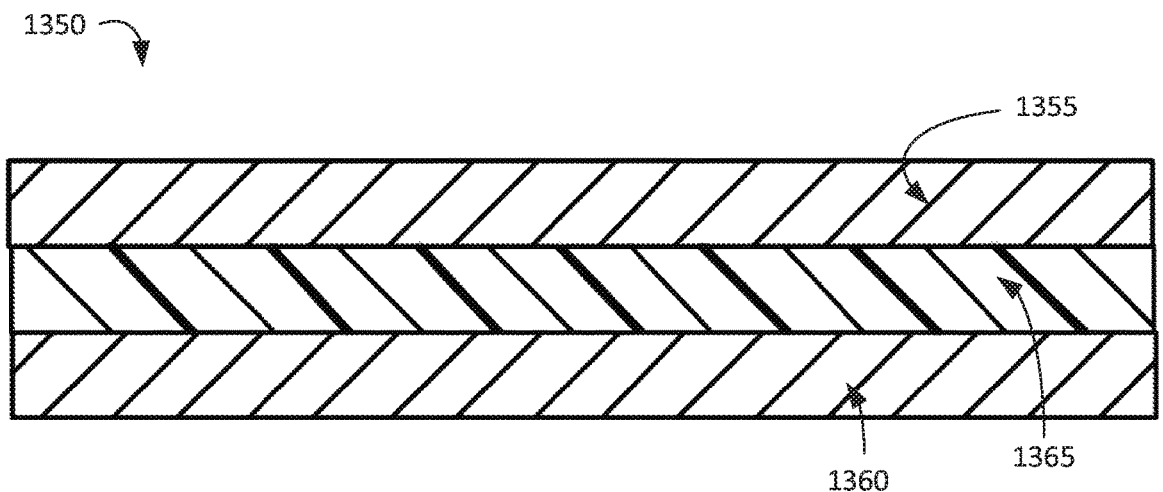

In other embodiments, physical indicia may be formed on one or more shield layers in order to facilitate identification of one or more twisted pairs in a cable. For example, physical indicia may be formed on individual shield layers that are wrapped or formed around respective twisted pairs (as shown in the example cables 300, 400 of FIGS. 3 and 4). A shield layer may be formed with a wide variety of suitable constructions that include any number of suitable layers. FIGS. 13A-13C illustrate example constructions that may be utilized for one or more shield layers incorporated into a twisted pair cable, according to illustrative embodiments of the disclosure.

FIG. 13A illustrates a cross-sectional view of a first example shield layer 1300 (or other shield element) that may be utilized in conjunction with one or more twisted pairs and/or other transmission media. In certain embodiments, the shield layer 1300 may be formed as a tape or other configuration including a substrate or carrier layer with electrically conductive material formed on the substrate. The shield layer 1300 may include a dielectric layer 1305, and electrically conductive material 1310 may be formed or disposed on one side of the dielectric layer 1305. The electrically conductive material 1310 may include any suitable configuration of material, such as longitudinally continuous material or any number of spaced segments of electrically conductive material (e.g., longitudinally spaced segments, segments spaced across a width of a shield, etc.). As desired, one or more fusible elements may span between an adjacent set or pair of spaced segments. FIG. 13B illustrates a cross-sectional view of another example shield layer 1325 in which electrically conductive material 1330 is sandwiched between two dielectric layers 1335, 1340. For example, continuous electrically conductive material 1330 or a plurality of spaced segments of electrically conductive material may be formed on a first dielectric layer 1335. A second dielectric layer 1340 may then be formed over the electrically conductive material 1330. FIG. 13C illustrates another example shield layer 1350 in which electrically conductive material 1355, 1360 may be formed on opposites sides of a dielectric layer 1365. For example, first electrically conductive material 1355 formed on a first side of a dielectric layer 1365 may include a plurality of longitudinally spaced segments of material. Second electrically conductive material 1360 may then be formed on an opposite side of the dielectric layer 1365 to cover the gaps or spacings between adjacent segments of the first electrically conductive material, thereby improving shielding efficiency. A wide variety of other suitable shield layer constructions may be utilized as desired. These constructions may include any suitable number of dielectric layers and/or layers of shielding material. For example, a shield may be formed solely from electrically conductive material.

Regardless of the construction of a shield layer, a wide variety of suitable types of physical indicia may be incorporated into a shield layer in order to identify one or more twisted pairs. In cables that utilize individual shields, respective physical indicia may be incorporated into any suitable number of shield layers (e.g., two shield layers, a shield layer for each twisted pair, etc.) in order to facilitate twisted pair identification. Additionally, as explained in greater detail above, shield layers may be utilized in conjunction with any other suitable techniques (e.g., texturing, insulation formed from different materials, etc.) to facilitate both identification of twisted pairs and identification of individual conductors within the twisted pairs.

Figure 14:
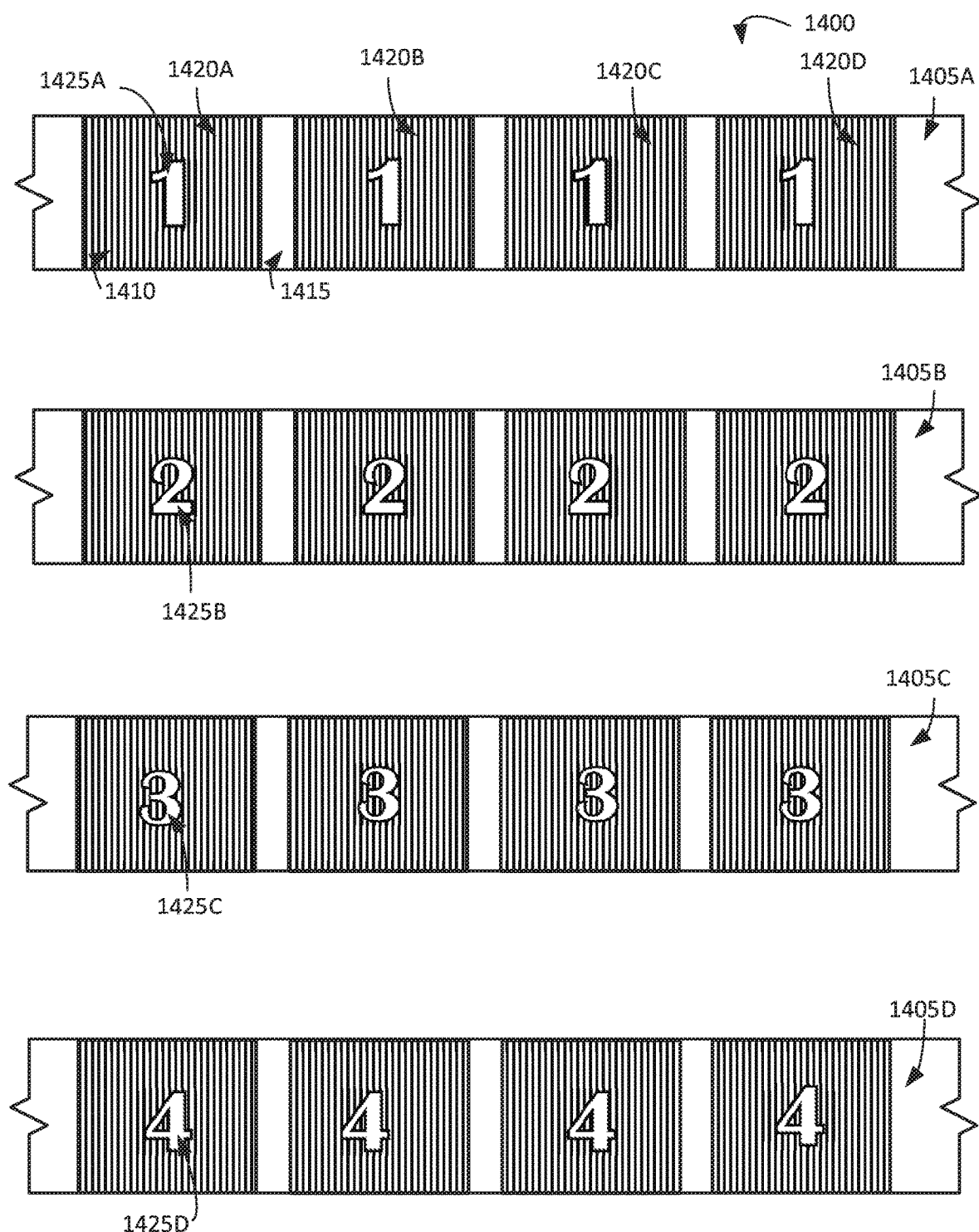
FIG. 14 illustrates top level views of example individual shield layers that include physical indicia and that may be incorporated into a twisted pair cable, according to an illustrative embodiment of the disclosure.

FIG. 14 illustrates top level views of a set 1400 of example individual shield layers that include physical indicia and that may be incorporated into a twisted pair cable, according to an illustrative embodiment of the disclosure. As shown, individual shield layers 1405A-D may be provided for each of a plurality of twisted pairs. Each shield layer (e.g., generally referred to as shield layer 1405) may be curled or wrapped around a twisted pair within a cable. Additionally, each shield layer 1405 may include electrically conductive or other shielding material, such as electrically conductive shielding material 1410 formed on a base dielectric layer 1415. Other suitable layer constructions may be utilized as desired. As shown, discontinuous sections or patches 1420A-D of electrically conductive material may be incorporated into a shield layer 1405. The patches 1420A-D may have a wide variety of suitable patterns and/or configurations. As shown in FIG. 14, spaced rectangular patches 1420A-D may be incorporated into a shield layer 1405. Other suitable arrangements of electrically conductive material may be utilized as desired, such as continuous electrically conductive material (See FIG. 15A), parallelogram patches (See FIG. 15B), trapezoidal patches (See FIG. 15C), etc. As desired, fusible elements may be utilized to connect adjacent spaced segments or patches.

With continued reference to FIG. 14, physical indicia may be incorporated into the shield layers 1405A-D to facilitate identification of twisted pairs associated with the shield layers 1405A-D. In certain embodiments, respective physical indicia 1425A-D may be formed on each of the shield layers 1405A-D. In other embodiments, physical indicia may be formed on a subset of the shield layers 1405A-D, such as two or three of the shield layers 1405A-D. In certain embodiments, the physical indicia 1425A-D may be formed as removed portions or cut outs of the shield layers. For example, portions of the electrically conductive material may be selectively removed after formation or left out during formation in order to form physical indicia. As another example, portions of both the electrically conductive material and one or more dielectric layers may be removed or cut out (e.g., stamped, etc.) in order to form physical indicia.

Physical indicia formed as removed portions of material may include a wide variety of suitable configurations. As shown in FIG. 14, the physical indicia 1425A-D may include longitudinally spaced numbers that identify corresponding twisted pairs. Other suitable physical indicia may be utilized as desired. FIGS. 15A-15D illustrate top level views of example shield layers that include different types of physical indicia, according to illustrative embodiments of the disclosure. Any of these physical indicia may be utilized in place of the physical indicia of FIG. 14. FIG. 15A illustrates an example shield layer 1500 that includes physical indicia 1505 formed as letters that correspond to a conventional color of a twisted pair (e.g., "O" for orange, etc.). Different letters corresponding to different colors may be utilized with each of a plurality of shield layers. It should also be noted that the shield layer 1500 of FIG. 15A includes longitudinally continuous electrically conductive material. FIG. 15B illustrates an example shield layer 1520 that includes physical indicia 1525 formed as longitudinally spaced dots or sections of dots. As desired, different numbers of dots may be utilized with each of a plurality of shield layers to correspond to different twisted pairs. Additionally, FIG. 15B illustrates discontinuous patches of electrically conductive material formed with parallelogram shapes. FIG. 15C illustrates an example shield layer 1540 that includes physical indicia 1545 formed as lines. A line may be formed as a longitudinally continuous line or as a line having a plurality of spaced sections of removed material. As desired, different numbers and/or types (e.g., broken, dashed, sinusoidal, zigzag, etc.) of lines may be utilized with each of a plurality of shield layers to correspond to different twisted pairs. Additionally, FIG. 15C illustrates discontinuous patches of electrically conductive material formed with trapezoidal shapes. FIG. 15D illustrates an example shield layer 1560 that includes physical indicia 1565 formed as longitudinally spaced alphanumeric characters. As desired, different alphanumeric characters may be utilized with each of a plurality of shield layers to correspond to different twisted pairs. In contrast to FIG. 14, the alphanumeric characters may not be representative of the conventional color of a twisted pair but may still be utilized to identify a twisted pair. Similar to FIG. 14, FIG. 15B illustrates discontinuous patches of electrically conductive material formed with rectangular shapes; however, the physical indicia 1465 have different longitudinal spacings (e.g., every other discontinuous patch rather than every patch) on the shield layer 1560. A wide variety of other suitable physical indicia may be formed by selectively removing portions of aa shield layer. Examples include, but are not limited to, symbols, shapes, text, alphanumeric characters, and/or other suitable indicia that facilitates identification of twisted pairs.

Physical indicia may be formed at any suitable locations along shield layer. Additionally, certain physical indicia (e.g., lines, etc.) may be longitudinally continuous along a shield layer. Other physical indicia may be formed with a plurality of longitudinally spaced sections (e.g., spaced alphanumeric characters, etc.) along a length of a shield layer. A wide variety of suitable spacings or gaps may be utilized between longitudinally spaced sections of physical indicial. Additionally, spaced sections may be arranged in accordance with a wide variety of suitable patterns or in a random or pseudo-random fashion. Physical indicia may also be formed with a wide variety of suitable dimensions. Examples of suitable spacings and/or dimensions (e.g., longitudinal lengths, diameters, etc.) are described in greater detail above with reference to FIGS. 5A-8E and are equally applicable to physical indicia formed on shield layers.

Although FIGS. 14-15D illustrate physical indicia formed by selectively removing portions of a shield layer, a wide variety of other suitable types of physical indicia may be formed on shield layer as desired in various embodiments. For example, physical indicia may be formed on the surfaces of one or more shield layers utilizing limited colorant (e.g., a single colorant, multiple colorants on different individual shield layers, etc.). As another example, physical indicia may be formed as surface variations (e.g., texturing, raised portions, embossed portions) on one or more shield layers. Indeed, any of the limited colorant and/or surface variations physical indicia described above with respect to twisted pair insulation and/or separators may be equally applicable to shield layers.

As discussed above, a tape (similar to the tapes utilized as shield layer and discussed above with reference to FIGS. 13A-13C) may also be utilized as a separator. For example, a tape having electrically conductive material formed on a dielectric layer may be folded or otherwise formed into a separator (e.g., a cross-filler separator, etc.). Alternatively, electrically conductive material may be formed on one or more surfaces of an extruded or molded separator. FIG. 16 illustrates a perspective view of an example separator 1600 formed from a folded tape. Regardless of the construction of a separator, a separator may include physical indicia formed by selectively removing portions of separator material. As shown in FIG. 16, physical indicia 1605A, 1605B may be formed by removing portions of electrically conductive material. In other embodiments, physical indicia 1605A, 1605B may be formed by removing portions of one or more separator prongs or fins. Additionally, a wide variety of suitable physical indicia may be incorporated into a separator by selectively removing portions, such as numbers, letters, text, shapes, symbols, lines, and/or any other suitable physical indicia discussed herein.

In yet other embodiments, physical indicia may be formed on one or more dielectric separators in order to facilitate identification of one or more twisted pairs in a cable. For example, physical indicia may be formed on individual dielectric separators that are helically twisted between the individual conductors of respective twisted pairs (as shown in the example cable 200 of FIG. 1). A dielectric separator may be formed with a wide variety of suitable constructions that include any number of suitable layers and/or components. As shown in FIG. 2, a dielectric separator may be formed as a relatively simple film layer that is positioned between the individual conductors of a twisted pair. As discussed in greater detail above with reference to FIG. 2, a dielectric separator may be formed with other shapes and configurations as desired (e.g., an X-shaped dielectric separator, a dielectric separator having shielding portions that wrap around a twisted pair, etc.).

A wide variety of suitable physical indicia may be incorporated into a dielectric separator as desired in various embodiments. In certain embodiments, physical indicia may be formed by selectively removing portions of a dielectric separator. For example, physical indicia may be punched through a dielectric separator. As another example, physical indicia may be formed by removing sections of electrically conductive material included in a dielectric separator (e.g., electrically conductive material that is wrapped around a twisted pair to provide shielding, etc.). FIGS. 17A-17C illustrate top level views of example dielectric separators that may be positioned between the conductors of a twisted pair and that include different types of physical indicia, according to illustrative embodiments of the disclosure. The examples dielectric separators are illustrated as film separators that may be positioned between the conductors of a twisted pair. Additionally, each of the example dielectric separators illustrate different example types of physical indicia. For example, FIG. 17A illustrates a first example dielectric separator 1700 having physical indicia 1705 formed as numbers. FIG. 17B illustrates a second example dielectric separator 1720 having physical indicia 1725 formed as letters or text (e.g., letters corresponding to conventional twisted pair colors). FIG. 17C illustrates a third example dielectric separator 1740 having physical indicia 1745 formed as shapes. Other suitable physical indicia that may be formed by removing portions of a dielectric separator include, but are not limited to, dots, lines, and/or other suitable indicia described herein with respect to other cable components.

Although FIGS. 17A-17C illustrate physical indicia formed by selectively removing portions of a shield layer, a wide variety of other suitable types of physical indicia may be formed on shield layer as desired in various embodiments. For example, physical indicia may be formed on the surfaces of one or more shield layers utilizing limited colorant (e.g., a single colorant, multiple colorants on different individual shield layers, etc.). As another example, physical indicia may be formed as surface variations (e.g., texturing, raised portions, embossed portions) on one or more shield layers. Indeed, any of the limited colorant and/or surface variations physical indicia described above with respect to twisted pair insulation and/or separators may be equally applicable to shield layers.

In addition to facilitating identification of various twisted pairs, in certain embodiments, the physical indicia formed on one or more dielectric separators may also facilitate identification of the individual conductors within one or more twisted pairs. In certain embodiments, the orientation of removed portions of a dielectric separator may facilitate identification of individual conductors. For example, conductors may be identified based on their positions relative to the orientation of removed sections (e.g., a colored conductor may be adjacent to the side of a dielectric separator having numbers or letters in a correct orientation while the white conductor may be adjacent to the side of the dielectric separator having numbers or letters in a mirrored or reversed configuration, etc.). In other embodiments, the orientation of physical indicia formed with limited colorant may be utilized to identify individual conductors of a twisted pair. In yet other embodiments, a surface of side on which physical indicia are formed (e.g., physical indicia formed with limited colorant, surface variations, etc.) may be utilized to identify individual conductors of a twisted pair.

As desired in various embodiments, any suitable combination of physical indicia illustrated and/or described herein for various cable components may be utilized. For example, a cable component (e.g., twisted pair insulation, a separator, etc.) may utilize a combination of raised, indented, textured, limited colorant, and/or other suitable physical indicia. Additionally, any suitable combination of cable components may include respective physical indicia as desired in various embodiments. The various cable components and associated physical indicia illustrated herein are provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable, comprising:
    a plurality of twisted pairs of individually insulated conductors, wherein the respective insulation formed around each conductor included in the plurality of twisted pairs comprises one or more first polymeric materials that are not blended or compounded with any colorant;
    physical indicia selectively formed on respective outer surfaces of the insulation of at least two of the plurality of twisted pairs, the physical indicia comprising colorant that occupies less than 5.0% of a surface area of the insulation on which it is formed, wherein the physical indicia facilitate identification of the plurality of twisted pairs; and
    a jacket formed around the plurality of twisted pairs, wherein the jacket comprises one or more second polymeric materials that are not blended or compounded with any colorant.

2. The cable of claim 1, wherein the physical indicia is selectively formed on only a single conductor within any given twisted pair included in the plurality of twisted pairs.

3. The cable of claim 1, wherein the physical indicia comprise one or more alphanumeric characters.

4. The cable of claim 1, wherein the physical indicia comprise one of (i) dots or (ii) stripes.

5. The cable of claim 1, wherein the physical indicia comprise:
    a first physical indicia formed from a first colorant on the insulation of a first conductor of a first twisted pair included in the plurality of twisted pairs; and
    a second physical indicia formed from the first colorant on the insulation of a second conductor of a second twisted pair included in the plurality of twisted pairs, wherein the second physical indicia is visibly distinct from the first physical indicia.

6. The cable of claim 1, wherein the physical indicia comprise:
    a first physical indicia formed from a first colorant on the insulation of a first conductor of a first twisted pair included in the plurality of twisted pairs; and
    a second physical indicia formed from a second colorant different than the first colorant on the insulation of a second conductor of a second twisted pair included in the plurality of twisted pairs.

7. The cable of claim 1, wherein the physical indicia further facilitate identification of the individual conductors included in each of the plurality of twisted pairs.

8. The cable of claim 7, wherein the physical indicia comprise physical indicia selectively formed on respective outer surfaces of the insulation of each of the plurality of twisted pairs.

9. A cable, comprising:
    a plurality of twisted pairs, each of the twisted pairs comprising:
        two individually insulated conductors, wherein the insulation formed around each of the two conductors comprises one or more first polymeric materials that are not blended or compounded with any colorant;
    physical indicia selectively formed on the insulation of at least two of the plurality of twisted pairs, the physical indicia formed on only a single conductor within any given twisted pair included in the plurality of twisted pairs and the physical indicia comprising colorant that occupies less than 5.0% of a surface area of the insulation on which it is formed, wherein the physical indicia facilitate identification of the plurality of twisted pairs; and
    a jacket formed around the plurality of twisted pairs, wherein the jacket comprises one or more second polymeric materials that are not blended or compounded with any colorant.

10. The cable of claim 9, wherein the physical indicia comprise one or more alphanumeric characters.

11. The cable of claim 9, wherein the physical indicia comprise one of (i) dots or (ii) stripes.

12. The cable of claim 9, wherein the physical indicia comprise:
    a first physical indicia formed from a first colorant on the insulation of a first conductor of a first twisted pair included in the plurality of twisted pairs; and
    a second physical indicia formed from the first colorant on the insulation of a second conductor of a second twisted pair included in the plurality of twisted pairs, wherein the second physical indicia is visibly distinct from the first physical indicia.

13. The cable of claim 9, wherein the physical indicia comprise:
    a first physical indicia formed from a first colorant on the insulation of a first conductor of a first twisted pair included in the plurality of twisted pairs; and
    a second physical indicia formed from a second colorant different than the first colorant on the insulation of a second conductor of a second twisted pair included in the plurality of twisted pairs.

14. The cable of claim 9, wherein the physical indicia further facilitate identification of the individual conductors included in each of the plurality of twisted pairs.

15. The cable of claim 9, wherein the physical indicia comprise physical indicia selectively formed on respective outer surfaces of the insulation of each of the plurality of twisted pairs.

16. A cable, comprising:
    four twisted pairs, each of the four twisted pairs comprising:
        two individually insulated conductors, wherein the insulation formed around each of the two conductors comprises one or more first polymeric materials that are not blended or compounded with any colorant;
    first physical indicia selectively formed on the insulation of a first of the four twisted pairs;

second physical indicia selectively formed on the insulation of a second of the four twisted pairs, wherein the first and second physical indicia respectively comprise colorant that occupies less than 5.0% of a surface area of the insulation on which it formed, and wherein the physical indicia facilitate identification of the four twisted pairs; and a jacket formed around the four twisted pairs, wherein the jacket comprises one or more second polymeric materials that are not blended or compounded with any colorant.

17. The cable of claim 16, wherein at least one of the first or second physical indicia comprise one or more alphanumeric characters.

18. The cable of claim 16, wherein at least one of the first or second physical indicia comprise one of (i) dots or (ii) stripes.

19. The cable of claim 16, wherein:

the first physical indicia is formed from a first colorant;

the second physical indicia is formed from the first colorant; and, the second physical indicia is visibly distinct from the first physical indicia.

20. The cable of claim 16, wherein:

the first physical indicia is formed from a first colorant; and the second physical indicia is formed from a second colorant different than the first colorant.

21. The cable of claim 16, further comprising:

third physical indicia selectively formed on the insulation of a third of the four twisted pairs; and fourth physical indicia selectively formed on the insulation of a fourth of the four twisted pairs, wherein the first, second, third, and fourth physical indicia facilitate identification of the individual conductors of the four twisted pairs.

* * * * *